(12) United States Patent
Suzuki et al.

(10) Patent No.: US 7,746,570 B2
(45) Date of Patent: Jun. 29, 2010

(54) FRESNEL OPTICAL ELEMENT AND PROJECTION DISPLAY APPARATUS

(75) Inventors: Hiroshi Suzuki, Tokyo (JP); Takao Endo, Tokyo (JP); Shinsuke Shikama, Tokyo (JP); Kohei Teramoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 260 days.

(21) Appl. No.: 11/802,544

(22) Filed: May 23, 2007

(65) Prior Publication Data

US 2009/0067062 A1      Mar. 12, 2009

Related U.S. Application Data

(62) Division of application No. 10/545,569, filed on Aug. 16, 2005, now Pat. No. 7,242,536.

(30) Foreign Application Priority Data

Dec. 17, 2003    (WO) .................. PCT/JP03/16192

(51) Int. Cl.
*G02B 3/08*    (2006.01)

(52) U.S. Cl. .................... 359/742; 359/743

(58) Field of Classification Search ............... 359/742, 359/743, 457, 449, 459
See application file for complete search history.

(56) References Cited

U.S. PATENT DOCUMENTS

| | | | | |
|---|---|---|---|---|
| 4,927,248 A * | 5/1990 | Sakakibara et al. | ......... | 359/742 |
| 5,122,903 A * | 6/1992 | Aoyama et al. | ............. | 359/565 |
| 5,779,751 A * | 7/1998 | Wong | ......................... | 65/60.3 |
| 5,818,639 A * | 10/1998 | Furuya | ....................... | 359/455 |
| 6,380,994 B1 * | 4/2002 | Iigahama et al. | .............. | 349/73 |
| 7,116,476 B2 * | 10/2006 | Suzuki et al. | ............... | 359/457 |
| 7,523,954 B2 * | 4/2009 | Dotsey et al. | ............... | 280/642 |
| 2003/0058532 A1 | 3/2003 | Suzuki et al. | | |
| 2004/0246578 A1 | 12/2004 | Shikama et al. | | |
| 2005/0105177 A1 | 5/2005 | Suzuki et al. | | |

FOREIGN PATENT DOCUMENTS

| | | | |
|---|---|---|---|
| JP | 61-277935 | A | 12/1986 |
| JP | 62-10637 | | 1/1987 |
| JP | 7-261004 | A | 10/1995 |
| JP | 9-218465 | A | 8/1997 |
| JP | 11-149124 | A | 6/1999 |
| JP | 2000-347290 | A | 12/2000 |
| JP | 3209345 | B2 | 7/2001 |
| JP | 2001-337206 | A | 12/2001 |
| JP | 2002-196413 | A | 7/2002 |
| JP | 2002-535699 | A | 10/2002 |
| JP | 2003-114481 | A | 4/2003 |
| WO | 02/08796 | | 1/2002 |

* cited by examiner

*Primary Examiner*—Timothy J Thompson
(74) *Attorney, Agent, or Firm*—Birch, Stewart, Kolasch & Birch, LLP

(57) ABSTRACT

Each of a plurality of Fresnel prisms 12 is formed so that a refractive surface 12 thereof includes a non-light incidence surface 12c upon which any light ray emitted from a projector 1 is not directly incident because it is intercepted by another Fresnel prism 12, the non-light incidence surface having an angle τ' with a reflective surface 12b which is different from the prism apex angle τ of each of the plurality of Fresnel prisms. As a result, a light ray reflected by the refractive surface 12a of each of the plurality of Fresnel prisms without passing through the refractive surface can be preventing from emerging, as unnecessary light, toward the viewer's line of sight.

12 Claims, 47 Drawing Sheets

$\Phi_3 < \Phi_1 < \Phi_2$

FIG.35

| INCIDENCE ANGLE OF 75 DEGREES | ALL-WHILE SCREEN DISPLAY | DISPLAY OF WHITE WINDOW ON BLACK BACKGROUND | YES-NO DECISION |
|---|---|---|---|
| CONVENTIONAL CASE (l=1) | NO MALFUNCTION | UNNECESSARY LIGHT (DOUBLET) | ✕ |
| Ex.2 | NO MALFUNCTION | NO MALFUNCTION | ◯ |
| Ex.1 | NO MALFUNCTION | NO MALFUNCTION | ◯ |
| Ex.0 | MONOCHROME UNEVENNESS | UNNECESSARY LIGHT (BLURRED) | ✕ |

IN CASE OF Ex.0, SINCE AVAILABLE PORTION OF TOTAL REFLECTION PRISM IS NOT FORMED SUFFICIENTLY FOR REASONS FOR PROCESS OF MANUFACTURING TOTAL REFLECTION PRISM, INCIDENT LIGHT PASSES THROUGH TOTAL REFLECTION PRISM JUST AS IT IS AND THEREFORE UNNECESSARY LIGHT WHICH APPEARS BLURRED IS OBSERVED.

FIG.36

| INCIDENCE ANGLE OF 75 DEGREES | SIGNAL LIGHT [cd m$^{-2}$] | BACK-GROUND LIGHT [cd m$^{-2}$] | UNNECESSARY LIGHT [cd m$^{-2}$] | CONTRAST RATIO [ ] |
|---|---|---|---|---|
| CONVENTIONAL CASE (l=1) | 56 | 0.19 | 0.55 | 155 : 1 |
| Ex.2 (LARGE MARGIN) | 54 | 0.20 | 0.28 (UNRECOGNIZED) | >673 : 1 |
| Ex.1 (SMALL MARGIN) | ---- | ---- | UNRECOGNIZED | ---- |
| Ex.0 (NO MARGIN) | ---- | ---- | UNRECOGNIZED | ---- |
| Ex.3 (SMALL MARGIN, NON-LIGHT INCIDENCE SURFACE: ROUGHENED SURFACE) | ---- | ---- | UNRECOGNIZED | ---- |

OBSERVATION FROM DIRECTION OF NORMAL TO SCREEN
* SINCE UNNECESSARY LIGHT CANNOT BE VISUALLY RECOGNIZED, MEASUREMENT OF BRIGHTNESS AT POSITIONS CORRESPONDING TO THOSE WHERE UNNECESSARY LIGHT IS OBSERVED IN CONVENTIONAL CASE IS CARRIED OUT.

FIG.37

| INCIDENCE ANGLE OF 75 DEGREES | SIGNAL LIGHT [cd m$^{-2}$] | BACK-GROUND LIGHT [cd m$^{-2}$] | UNNECESSARY LIGHT [cd m$^{-2}$] | CONTRAST RATIO [ ] |
|---|---|---|---|---|
| CONVENTIONAL CASE (l=1) | ---- | ---- | UNRECOGNIZED | ---- |
| Ex.2 (LARGE MARGIN) | ---- | ---- | RECOGNIZED | ---- |
| Ex.1 (SMALL MARGIN) | ---- | ---- | RECOGNIZED | ---- |
| Ex.0 (NO MARGIN) | ---- | ---- | RECOGNIZED | ---- |
| Ex.3 (SMALL MARGIN, NON-LIGHT INCIDENCE SURFACE: ROUGHENED SURFACE) | ---- | ---- | UNRECOGNIZED | ---- |

OBSERVATION FROM SLANTING DOWNWARD DIRECTION WHICH IS INCLINED AT ANGLE OF 60 DEGREES WITH RESPECT TO DIRECTION OF NORMAL TO SCREEN UNNECESSARY LIGHT, WHICH EMREGES TOWARD DIRECTION OF NORMAL TO SCREEN IN CONVENTIONAL CASE, EMERGES TOWARD SLANTING DOWNWARD DIRECTION WHERE VIEWER IS NOT LOOKING

FIG.38

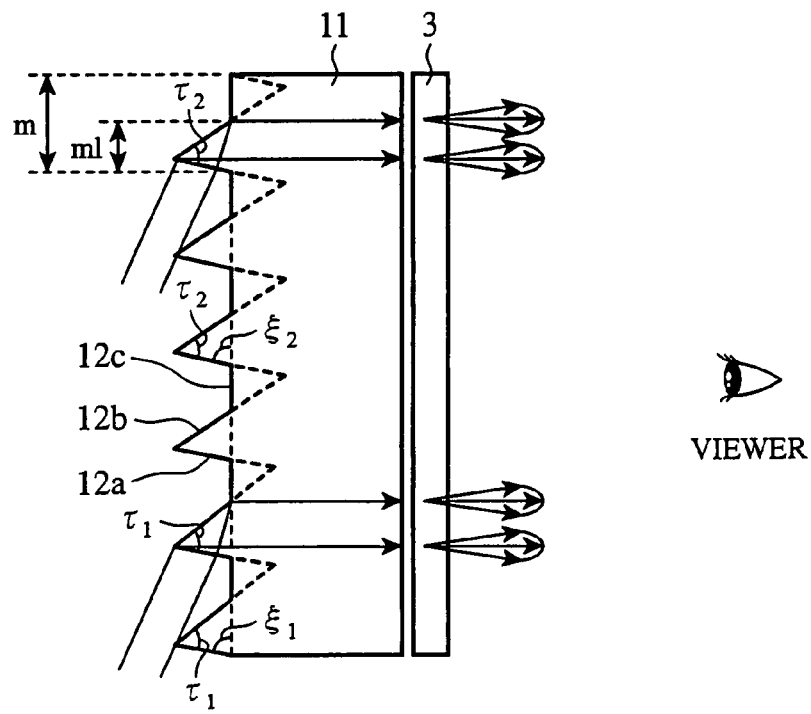

| INCIDENCE ANGLE OF 75 DEGREES | ALL-WHITE SCREEN DISPLAY | DISPLAY OF WHITE WINDOW ON BLACK BACKGROUND | YES-NO DECISION |
|---|---|---|---|
| Ex.1 | NO MALFUNCTION | NO MALFUNCTION | ◯ |
| 2% OF PRISM LEADING EDGE IS CUT OFF | NO MALFUNCTION | NO MALFUNCTION | ◯ |

VIEWER

FRESNEL OPTICAL ELEMENT AND PROJECTION DISPLAY APPARATUS

This application is a Divisional of application Ser. No. 10/545,569 filed on Aug. 16, 2005 now U.S. Pat. No. 7,242,536, and for which priority is claimed under 35 U.S.C. §120; the entire contents of all are hereby incorporated by reference.

FIELD OF THE INVENTION

The present invention relates to a Fresnel optical element that reflects rays of light emitted from a light emitting body, such as a projector, toward a predetermined direction, and a projection display apparatus that carries out image formation of the rays of light reflected by the Fresnel optical element so as to display a formed image.

BACKGROUND OF THE INVENTION

A Fresnel optical element includes a plurality of Fresnel prisms arranged on a base and in a sawtooth shape, each of the plurality of Fresnel prisms having a refractive surface for refracting a light ray emitted from a light emitting body, such as a projector, and a reflective surface for reflecting the light ray refracted by the refractive surface.

In each of the plurality of Fresnel prisms, a part of an incident light ray cannot pass through the refractive surface in which the refractive index varies between media sandwiching the surface and the light emergence surface of the base in which the refractive index varies between media sandwiching the surface according to the Fresnel law of reflection. About 5% of the incident light ray does not pass through the refractive surface and the light emergence surface of the base depending on the refractive indices at each of these surfaces.

For example, a light ray reflected by the refractive surface without passing through it and a light ray reflected by the light emergence surface of the base (referred to as unnecessary light from here on) among the rays of light emitted from the light emitting body may be made to propagate toward different places while being repeatedly refracted and reflected by the plurality of Fresnel prisms, and may emerge from positions of the Fresnel optical element which are different from those from which rays of light (referred to as signal light) reflected by the reflective surfaces of the plurality of Fresnel prisms are made to emerge.

Since a ghost image which is identical to an image provided by the signal light is recognized by the viewer when such unnecessary rays of light are made to emerge toward the viewer's line of sight, the contrast ratio of the projection display apparatus degrades remarkably.

Then, by adjusting the angle of the reflective surface of each of the plurality of Fresnel prisms so that it satisfies appropriate requirements, the related art Fresnel optical element carries out control processing so that the angle of the light ray reflected by the light emergence surface of the base which results in the generation of the ghost image is larger than the angles of the rays of light emitted from the light emitting body to prevent unnecessary rays of light from emerging toward the viewer's line of sight (refer to patent reference 1, for example).

It is known that such the related art Fresnel optical element can be replicatedly molded by pouring a resin material to a metallic mold which is machined using a large-sized lathe.

Patent reference 1: JP,2002-196413,A (see paragraph numbers [0011] to [0019] and FIG. 1)

A problem with the related art Fresnel optical element constructed as mentioned above is that although rays of light reflected by the light emergence surface of the base can be prevented from emerging, as unnecessary rays of light, toward the viewer's line of sight, rays of light reflected by the refractive surfaces of the plurality of Fresnel prisms of the Fresnel optical element without passing through them are made to emerge, as unnecessary rays of light, toward the viewer's line of sight.

The present invention is made in order to solve the above-mentioned problems, and it is therefore an object of the present invention to provide a Fresnel optical element that can prevent unnecessary rays of light, such as rays of light which are reflected by the refractive surfaces of the Fresnel optical element without passing through them, from emerging toward the viewer's line of sight.

It is another object of the present invention to provide a projection display apparatus that can prevent display of any ghost image.

DISCLOSURE OF THE INVENTION

A Fresnel optical element in accordance with the present invention includes Fresnel prisms, a refractive surface of each of the Fresnel prisms including a non-light incidence surface upon which any light ray emitted from a light emitting body is not directly incident because it is intercepted by another Fresnel prism, the non-light incidence surface having an angle with a reflective surface which is different from a prism apex angle which the refractive surface forms with the reflective surface.

The present invention thus offers an advantage of being able to prevent a light ray reflected by the refractive surface of each Fresnel prism without passing through the refractive surface from emerging, as unnecessary light, toward the viewer's line of sight.

BRIEF DESCRIPTION OF THE FIGURES

FIG. 35 is an explanatory diagram showing observation results etc.;

FIG. 36 is an explanatory diagram showing observation results when viewed from the normal to the screen;

FIG. 37 is an explanatory diagram showing observation results when viewed from a downward slanting direction of an angle of about 60 degrees with the normal to the screen;

FIG. 38 is an explanatory diagram showing an example in which measures (a) and (c) are combined;

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
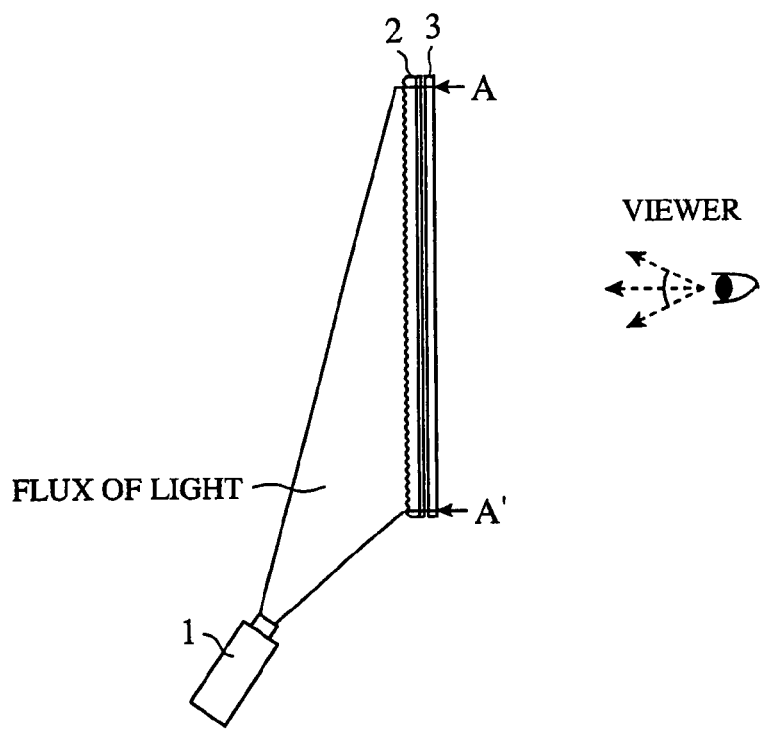
FIG. 1 is a block diagram showing a projection display apparatus in accordance with embodiment 1 of the present invention.
Figure 2:
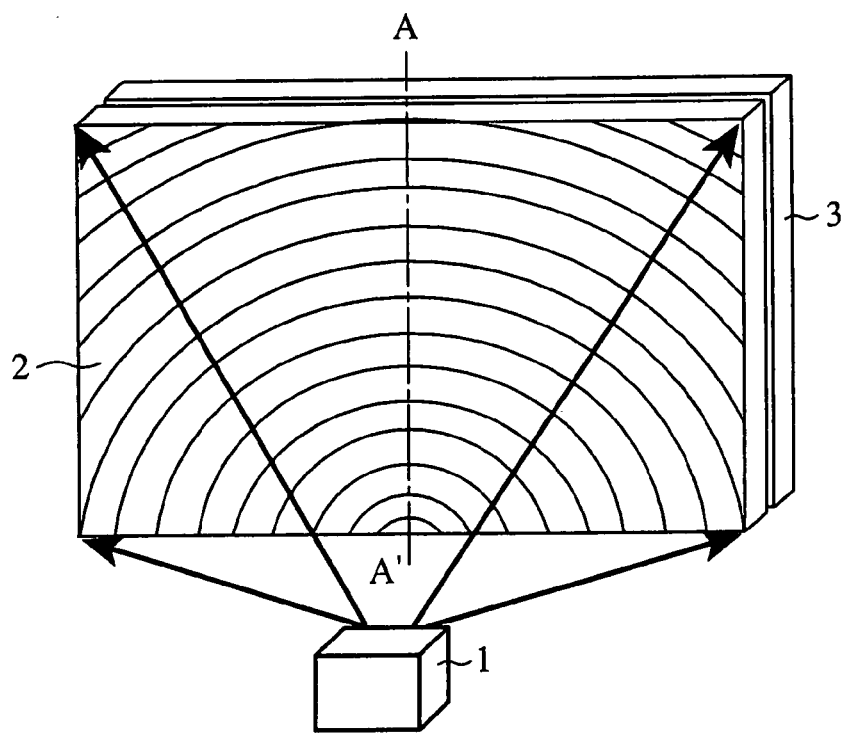
FIG. 2 is a perspective view showing the projection display apparatus in accordance with embodiment 1 of the present invention.

FIG. 1 is a block diagram showing a projection display apparatus in accordance with embodiment 1 of the present invention, and FIG. 2 is a perspective view showing the projection display apparatus in accordance with embodiment 1 of the present invention.

As shown in these figures, a projector 1 which is a light emitting body applies rays of light for image projection to a Fresnel optical element 2.

The Fresnel optical element 2 has a function of guiding the rays of light applied thereto from the projector 1 to an image formation/display plate 3. The Fresnel optical element 2 has a structure in which a plurality of Fresnel prisms each of which has a refractive surface for refracting a light ray applied thereto from the projector 1, and a reflective surface for reflecting the light ray refracted by the refractive surface are arranged on a surface of a base and in a sawtooth shape.

The image formation/display plate 3 constitutes an image formation means for carrying out image formation of rays of light reflected by the reflective surfaces of the Fresnel optical element 2. The Image formation/display plate 3 is comprised of, for example, a lenticular lens for controlling the spread of the rays of light reflected by the reflective surfaces of the Fresnel optical element 2, and a transmission type diffuser panel for scattering rays of light.

Figure 3:
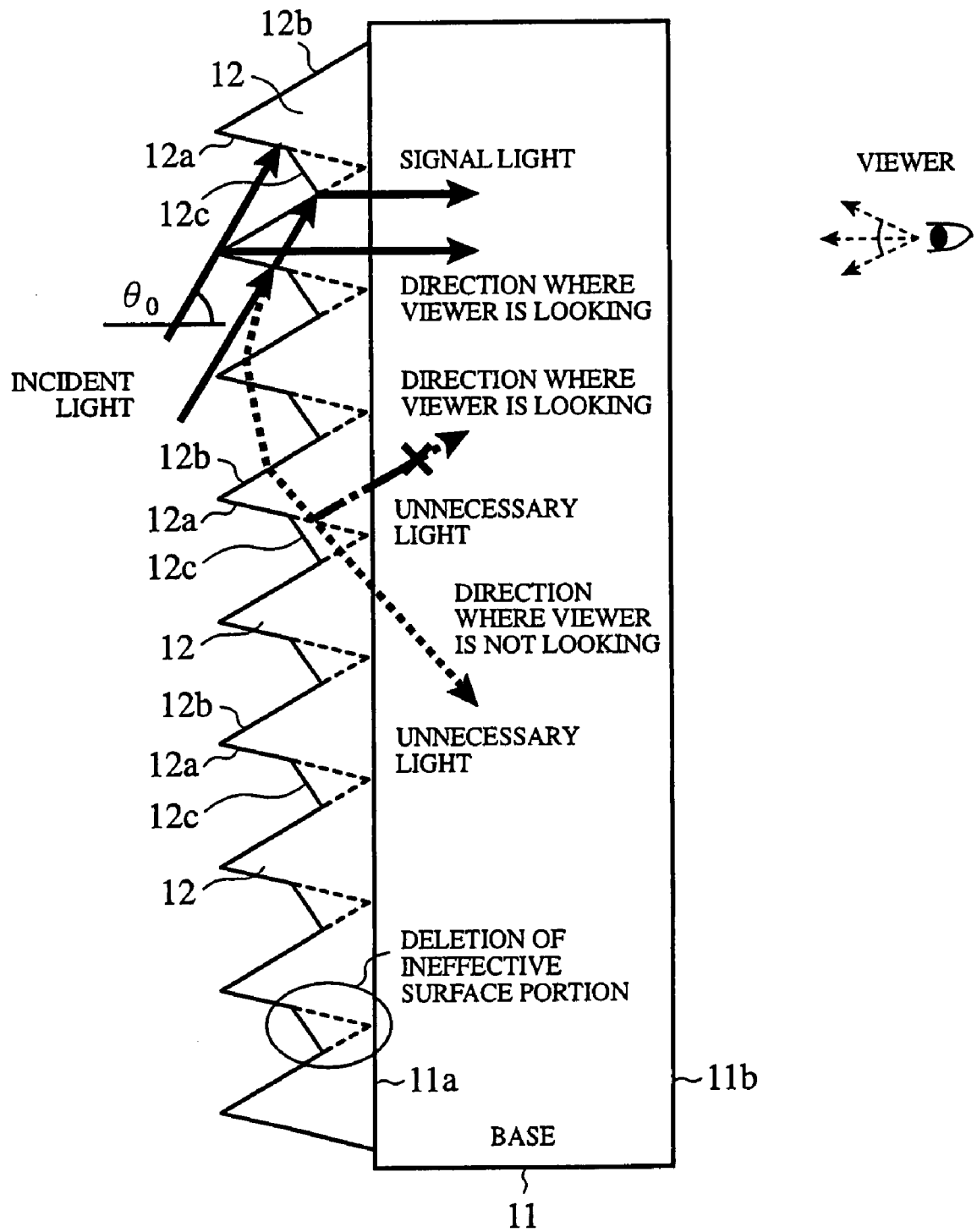
FIG. 3 is a block diagram showing a Fresnel optical element in accordance with embodiment 1 of the present invention.

FIG. 3 is a block diagram showing the Fresnel optical element in accordance with embodiment 1 of the present invention. In the figure, the base 11 is a sheet-shaped thin plate that allows rays of light incident thereupon to pass therethrough, and the plurality of Fresnel prisms 12 are arranged on the surface 11*a* of the base 11 and in a sawtooth shape.

The refractive surface 12*a* of each of the plurality of Fresnel prisms 12 refracts a light ray applied thereto from the projector 1, and the reflective surface 12*b* of each of the plurality of Fresnel prisms 12 reflects the light ray refracted by the refractive surface 12*a*. The light ray reflected by the reflective surface 12*b* of each of the plurality of Fresnel prisms 12 is made to emerge from a light emergence surface 11*b* of the base 11 toward the image formation/display plate 3.

Each of the plurality of Fresnel prisms 12 has a non-light incidence surface 12*c* which is a part of the refractive surface 12*a* thereof. Any light ray from the projector 1 is not directly applied to the non-light incidence surface 12*c* because rays of light directed toward the non-light incidence surface 12*c* are intercepted by another Fresnel prism 12. The non-light incidence surface 12*c* of each of the plurality of Fresnel prisms is formed so as to have an angle with the corresponding reflective surface 12*b* which is different from a prism apex angle which the corresponding refractive surface 12*a* forms with the corresponding reflective surface 12*b*.

Figure 4:
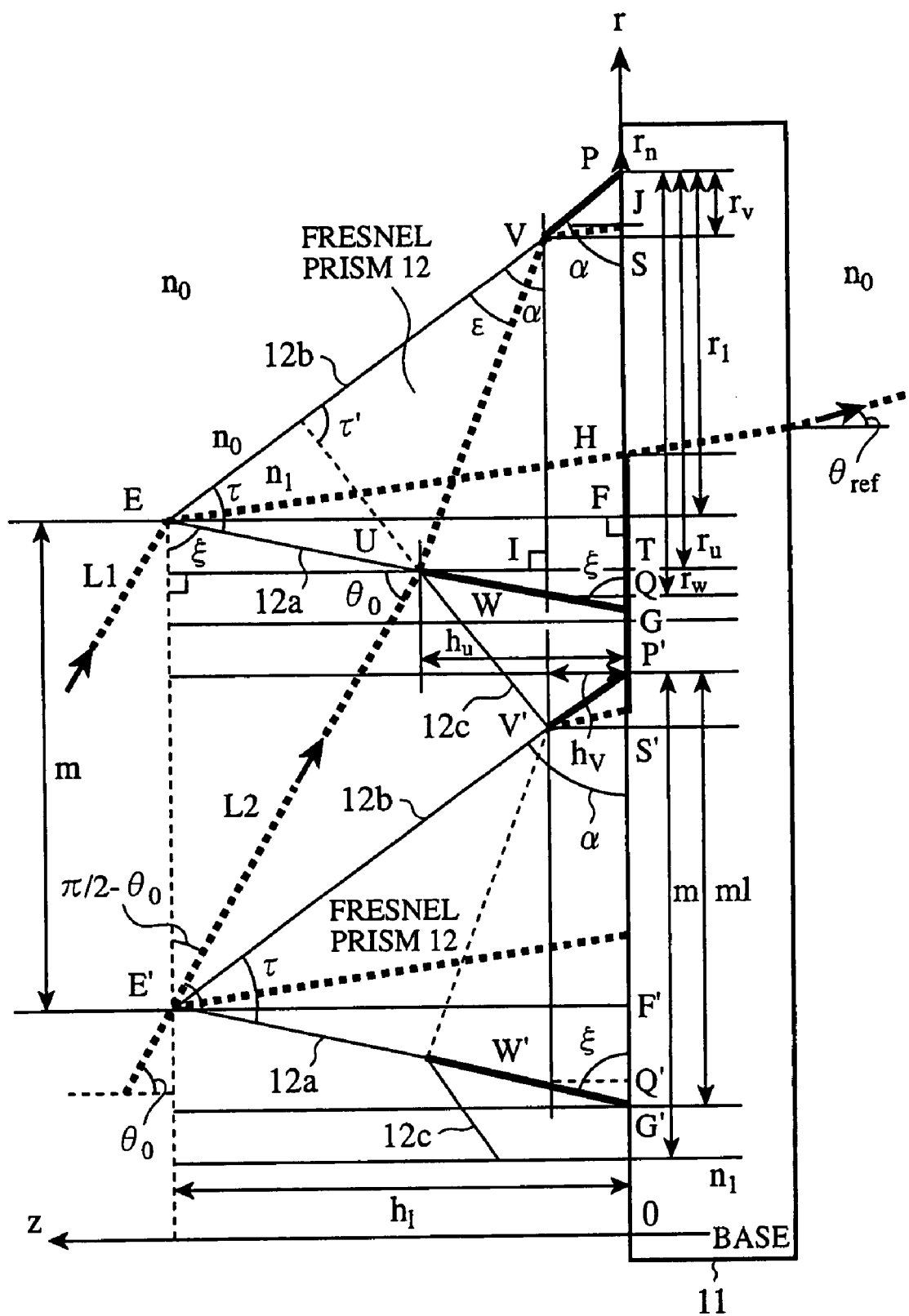
FIG. 4 is a schematic diagram showing the Fresnel optical element in accordance with embodiment 1 of the present invention.

FIG. 4 is a schematic diagram showing the Fresnel optical element in accordance with embodiment 1 of the present invention.

Next, the operation of the Fresnel optical element in accordance with this embodiment of the present invention will be explained.

Usually, a sawtooth-shaped prism module has triangular PEGs which are continuously arranged in a line at periods (or intervals) of m. For the sake of simplicity, explanation of a plurality of prisms arranged in a sawtooth shape will be made assuming that they have a ratio of similitude l (1<=1) (in the case of 1=1, the plurality of prisms are continuously arranged in a line).

Rays of light L1 and L2 which are emitted from the projector 1 are incident to each of the plurality of Fresnel prisms from a left-hand side of the figure, and a light ray (referred to as signal light from here on) reflected by the reflective surface 12*b* is made to emerge from a right-hand side in the figure of the Fresnel optical element, as shown in FIG. 4. Assume that the light ray L1 is incident upon a leading end E of one Fresnel prism 12 in question, and the light ray L2 grazes a leading end E' of another Fresnel prism 12 which is located just below the Fresnel prism 12 in question, as shown in the figure, and is then incident upon a right end U of the refractive surface 12*a* of the Fresnel prism 12 in question.

When the prism apex angle PEG of each of the plurality of Fresnel prisms 12 is τ, the inclination angle GPE of the reflective surface 12*b* is α, the refractive index of the interior of each of the plurality of Fresnel prisms 12 is $n_1$, and the refractive index of the exterior of each of the plurality of Fresnel prisms 12 is $n_0$, the emergence angle $\theta_{refl}$ of the signal light is given by the following relational expression:

$$\theta_{refl}(\theta_0; \alpha, \tau, n_0, n_1) = \sin^{-1}[(n_1/n_0)\sin\{\tau - \alpha + \sin^{-1}((n_1/n_0)\sin(\tau + \alpha + \theta_0))\}] \quad (1)$$

Solving equation (1) for the angle α yields the following relational expression:

$$\alpha(\theta_0; \theta_{refl}, \tau, n_0, n_0) = \tan^{-1}\{[\sin(\theta_0 + \tau) + (n_1/n_0)\sin(\tau - \sin^{-1}((n_1/n_0)\sin\theta_{refl}))]/\{-\cos(\theta_0 + \tau) + (n_1/n_0)\cos(\tau - \sin^{-1}(n_1/n_0)\sin\theta_{refl}))\} \quad (2)$$

Since the refractive index $n_1$ of each of the plurality of Fresnel prisms 12 at the refractive surface 12*a* is decided by a medium of which the plurality of Fresnel prisms 12 are made and it is actually impossible to change the medium for every place, it is assumed that the refractive index $n_1$ is kept constant. On the other hand, the refractive index $n_0$ of the exterior of each of the plurality of Fresnel prisms is usually that of the air, and it is understood that this refractive index $n_0$ is unchangeable. As a result, the function α showing the inclination of the reflective surface 12*b* of each of the plurality of Fresnel prisms becomes a function of the incidence angle which is decided by two degrees of freedom, the emergence angle $\theta_{refl}$ and the prism apex angle τ.

However, since the viewer cannot see any image displayed on the screen of the image formation/display plate and therefore the screen loses its original functionality when the emergence angle $\theta_{refl}$ of the signal light is not in agreement with the direction of the normal to the screen (i.e., the viewer's line of sight), there is almost no degree of freedom in fact (there is at most a few degrees of freedom).

Similarly, since the prism apex angle τ is usually equal to the point angle of a cutting tool which is used for mold machining and which is a master mold of the plurality of Fresnel prisms 12, most of the plurality of Fresnel prisms which constitute the screen have a certain prism apex angle τ.

Figure 5:
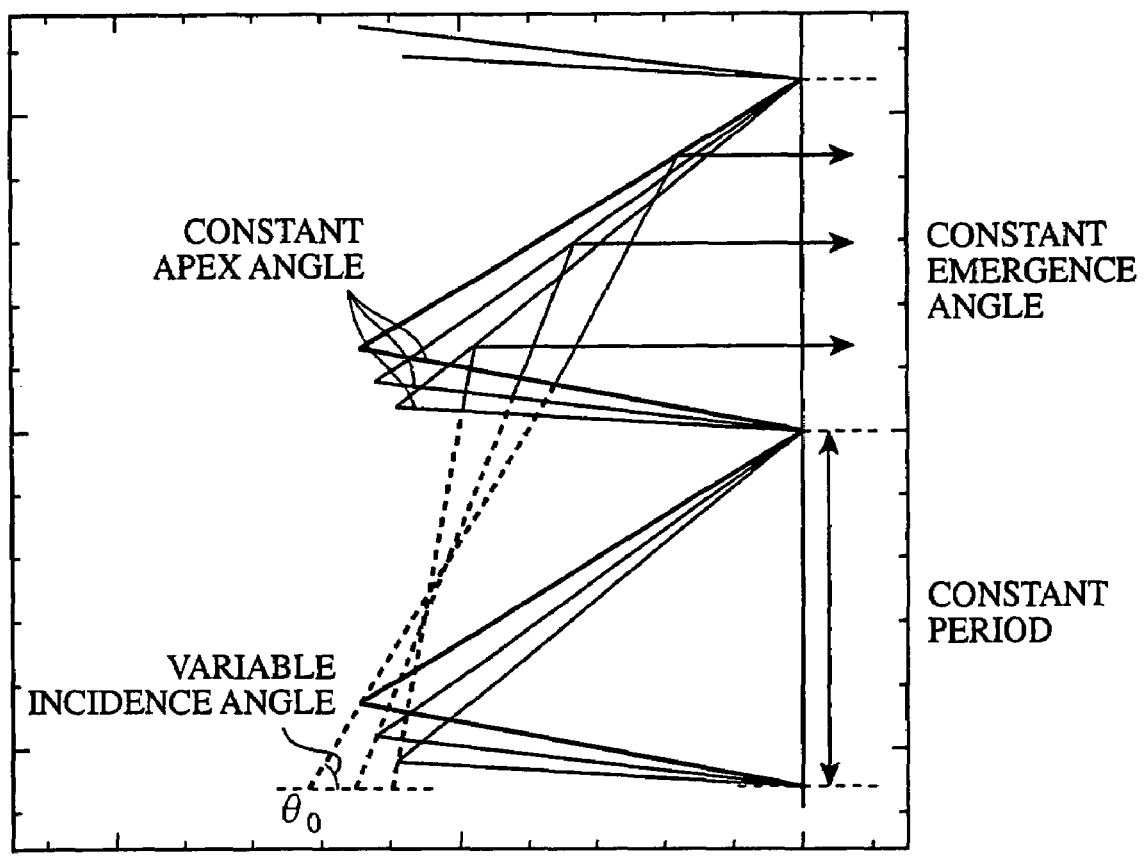
FIG. 5 is an explanatory diagram showing the incidence angle of a light ray incident upon a Fresnel prism 12.

FIG. 5 shows three possibilities of the incidence angle of a light ray incident upon each of the plurality of Fresnel prisms 12, and, when τ which is the point angle PEG and the emergence angle $\theta_{refl}$ of the signal light are kept constant for the above-mentioned reason, the angle α is represented by a function of the incidence angle given by equation (2) and is uniquely determined.

As a result, since the two angles α and τ of the triangle which represents each of the plurality of Fresnel prisms 12 are determined, the remaining angle of the triangle is also determined from the sum of the interior angles of the triangle.

Therefore, the shape of each of the plurality of Fresnel prisms 12 is determined uniquely (except for the size in the case of a similar transformation).

Considering all the factors involved, since the two degrees of freedom of the function a showing the inclination of the reflective surface 12b are the equivalent of almost no degree of freedom and the prism apex angle τ is usually constant, it is actually difficult to control the angles of unnecessary rays of light which result in a ghost image by controlling "the inclination of the surface."

Focusing attention on the optical paths of rays of light of FIG. 3, it can be understood that for each of the rays of light emitted from the projector 1 which enters each of the plurality of Fresnel prisms 12 and then emerges from each of the plurality of Fresnel prisms 12, each of the surfaces which constitute each of the plurality of Fresnel prisms 12 has a portion which contributes to the optical paths (the refractive surface 12a and the reflective surface 12b contribute to the optical paths), and another portion which does not contribute to the optical paths (since the non-light incidence surface 12c of each of the plurality of Fresnel prisms is in the shade of another Fresnel prism 12, any light ray from the projector 1 is not incident directly upon the non-light incidence surface 12c and therefore the non-light incidence surface 12c does not contribute to the optical paths. Furthermore, since the light ray refracted by the non-light incidence surface 12c is not applied to a surface portion VP which is a part of the reflective surface 12b, the surface portion VP does not contribute to the optical paths, either).

When the former portion that contributes to the optical paths is defined as an effective surface portion and the latter portion which does not contribute to the optical paths is defined as an ineffective surface portion, the effective surface portion is certainly needed, whereas whether or not the ineffective surface portion should be disposed in each prism is a matter of indifference.

Therefore, since there is almost no degree of freedom in "the angle of the surface" from the viewpoint of design, the Fresnel optical element in accordance with this embodiment 1 controls the direction of unnecessary light by adding a degree of freedom to "the shape of each prism."

To be more specific, in case where the refractive surface 12a of each of the plurality of Fresnel prisms 12 is not formed so as to partially include the non-light incidence surface 12c, but the refractive surface 12a is formed so as to be shaped like a portion EUG shown in FIG. 4 (see a dotted line of FIG. 3), when a part of the light ray applied to the refractive surface 12a of a Fresnel prism 12 which is the second from the top of the Fresnel optical element is reflected by the refractive surface 12a, unnecessary light which is the reflected light propagates while being refracted by the reflective surface 12b and refractive surface 12a of one or more Fresnel prisms 12 located just below the former Fresnel prism, and may be reflected by a portion (i.e., a surface portion UG), as shown by a dotted line, of the refractive surface 12a of another Fresnel prism 12, which is the fourth from the top, and may emerge toward a direction where the viewer is looking, for example.

In contrast, in accordance with this embodiment 1, the non-light incidence surface 12c is formed so that the right end U of the refractive surface 12a of each of the plurality of Fresnel prisms 12 is connected to a left end V' of a surface portion V'P' which is an ineffective surface portion, and so as to have an angle τ' which is larger than the prism apex angle τ with the reflective surface 12b. As a result, since the unnecessary light as mentioned above passes through the fourth Fresnel prism 12 without being incident upon the refractive surface 12a and non-light incidence surface 12c of the fourth Fresnel prism, just as it is, and then enters another Fresnel prism 12 which is the fifth from the top, the unnecessary light is not reflected by the refractive surface 12a and non-light incidence surface 12c of the fourth Fresnel prism 12, but is made to emerge toward a direction where the viewer is not looking (i.e., emerge toward a right downward direction in the example of FIG. 3).

As can be seen from the above description, in accordance with this embodiment 1, each of the plurality of Fresnel prisms 12 is formed so that the refractive surface 12a thereof includes a non-light incidence surface 12c upon which any light ray from the projector 1 is directly incident because it is intercepted by another Fresnel prism 12, the angle τ' which the non-light incidence surface 12c forms with the reflective surface 12b being different from the prism apex angle τ of each of the plurality of Fresnel prisms 12. The present embodiment thus offers an advantage of being able to prevent unnecessary light, such as a light ray reflected by the refractive surface 12a of each of the plurality of Fresnel prisms without passing through the refractive surface 12a, from emerging toward the viewer's line of sight.

Therefore, the projection display apparatus in which the above-mentioned Fresnel optical element 2 is mounted offers an advantage of being able to prevent display of any ghost image.

Figure 6:
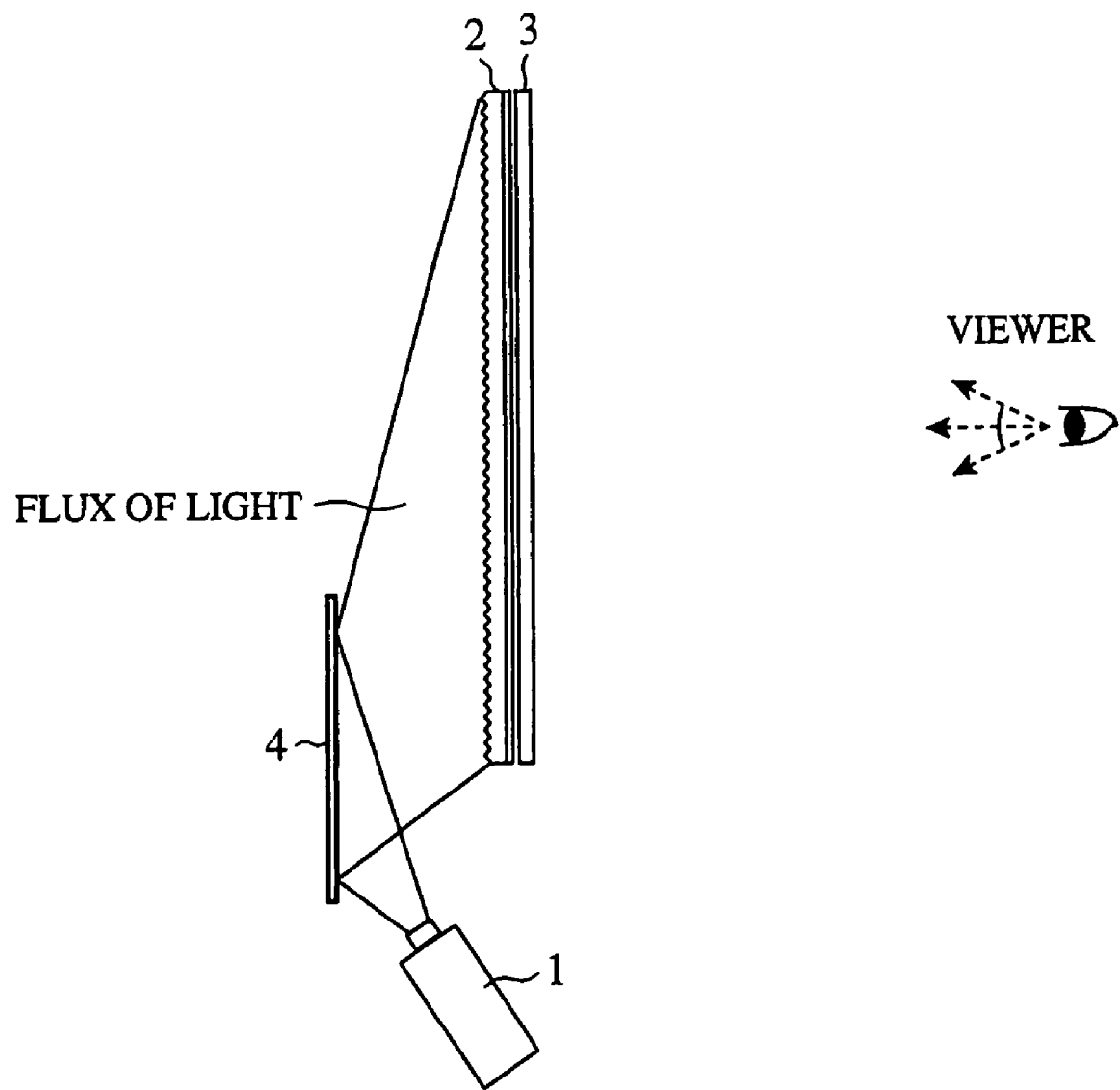
FIG. 6 is a block diagram showing another example of the projection display apparatus in accordance with embodiment 1 of the present invention.

In accordance with this embodiment 1, rays of light emitted from the projector 1 are incident upon the Fresnel optical element 2, as mentioned above. In order to reduce the depth of the projection display apparatus, the projection display apparatus can include a reflecting flat mirror 4 for reflecting the rays of light emitted from the projector 1 so as to make the rays of light reflected thereby enter the Fresnel optical element 2, as shown in FIG. 6. In this case, the projector 1 and the reflecting flat mirror 4 constitute the light emitting body.

Embodiment 2

Figure 7:
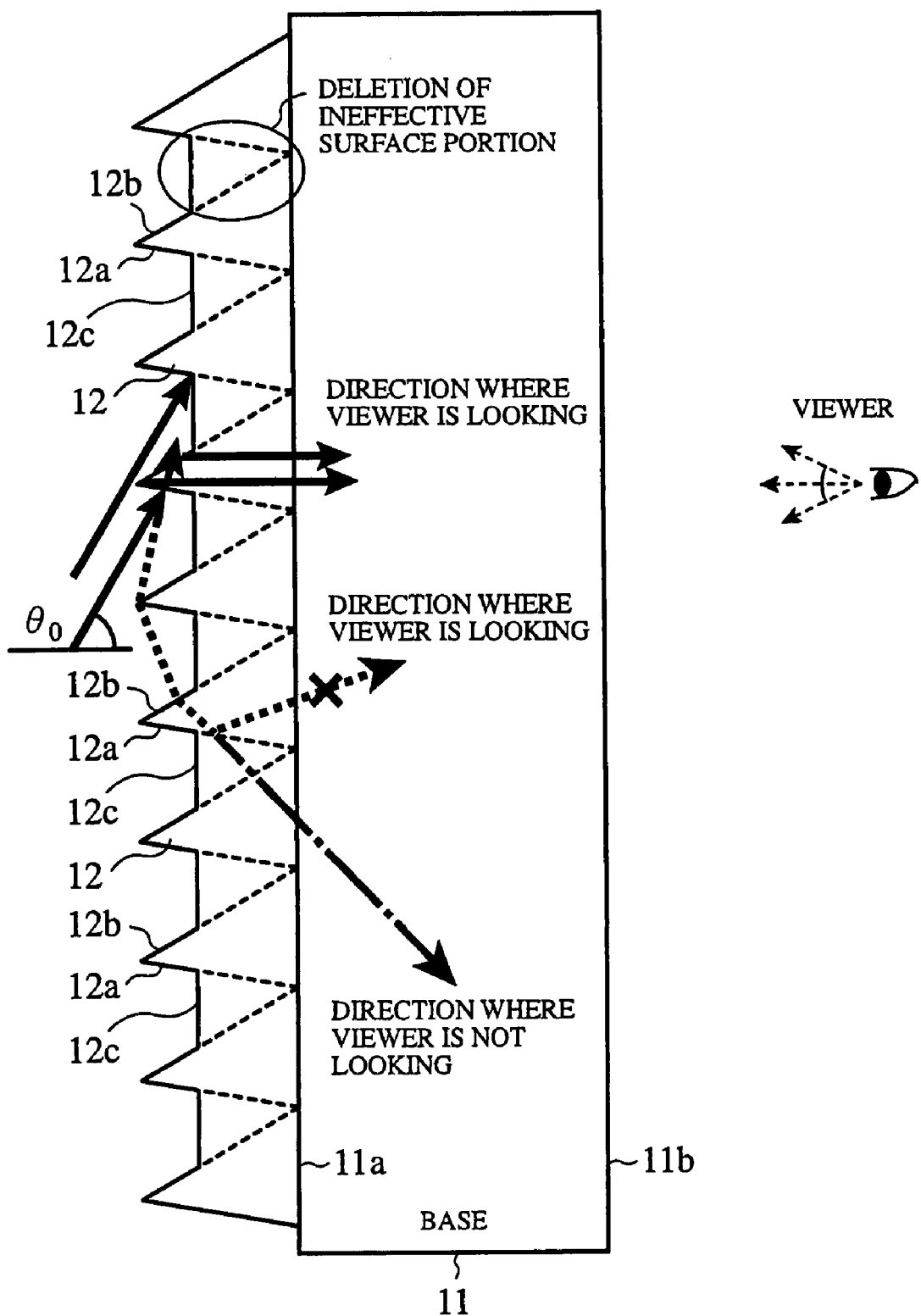
FIG. 7 is a block diagram showing a Fresnel optical element in accordance with embodiment 2 of the present invention.

In accordance with above-mentioned embodiment 1, the non-light incidence surface 12c of each of the plurality of Fresnel prisms 12 is formed so that the right end U of the refractive surface 12a of each of the plurality of Fresnel prisms 12 is connected to the left end V' of the surface portion V'P' which is an ineffective surface portion, and so as to have an angle τ' which is larger than the prism apex angle τ with the reflective surface 12b, as previously mentioned. In contrast, in accordance with this embodiment 2, each of the plurality of Fresnel prisms 12 is formed so as to have a non-light incidence surface 12c which is parallel to the surface 11a of the base on which the plurality of Fresnel prisms 12 are arranged, as shown in FIG. 7.

In a case where a part of the refractive surface 12a of each the plurality of Fresnel prisms 12 is not formed so as to be a non-light incidence surface 12c, but the refractive surface 12a is formed so as to be shaped like a portion EUG shown in FIG. 4 (see a dotted line of FIG. 7), if a part of a light ray incident upon the refractive surface 12a of a Fresnel prism 12 which is the fourth from the top of the Fresnel optical element is reflected by the refractive surface 12a, unnecessary light which is the reflected light may propagate while being repeatedly refracted by the reflective surface 12b and refractive surface 12a of another Fresnel prism 12 located just below the fourth Fresnel prism, and may be reflected by a portion (i.e., a surface portion UG), shown by a dotted line, of the refractive surface 12a of another Fresnel prism 12, which is the sixth from the top, and may emerge toward a direction where the viewer is looking, for example.

In contrast, in accordance with this embodiment 2, the non-light incidence surface 12c of each of the plurality of Fresnel prisms is formed so as to be parallel to the surface 11a of the base on which the plurality of Fresnel prisms 12 are arranged, and have an angle τ' which is larger than the prism apex angle τ with the reflective surface 12b. As a result, since the unnecessary light as mentioned above passes through the sixth Fresnel prism 12 without being incident upon the refractive surface 12a and non-light incidence surface 12c of the sixth Fresnel prism, just as it is, and then enters another Fresnel prism 12 which is the seventh from the top, the unnecessary light is not reflected by the refractive surface 12a and non-light incidence surface 12c of the sixth Fresnel prism 12, but is made to emerge toward a direction where the viewer is not looking (i.e., emerge toward a right downward direction in the example of FIG. 7).

As can be seen from the above description, in accordance with this embodiment 2, each of the plurality of Fresnel prisms 12 is formed so as to have a non-light incidence surface 12c which is parallel to the surface 11a of the base on which the plurality of Fresnel prisms 12 are arranged. The present embodiment thus offers an advantage of being able to prevent unnecessary light, such as a light ray reflected by the refractive surface 12a of each of the plurality of Fresnel prisms without passing through the refractive surface 12a, from emerging toward the viewer's line of sight.

Embodiment 3

Figure 8:
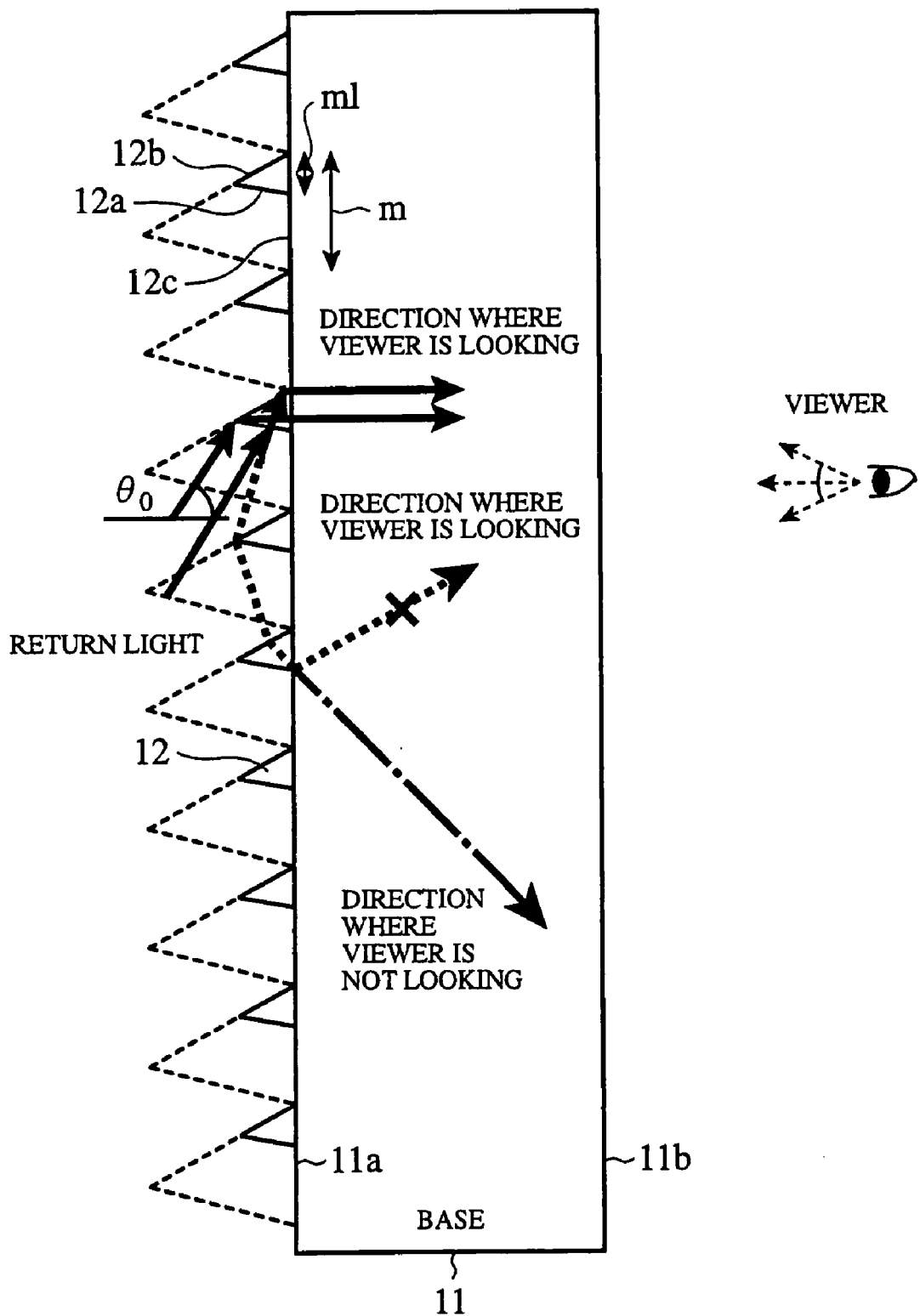
FIG. 8 is a block diagram showing a Fresnel optical element in accordance with embodiment 3 of the present invention.

In accordance with above-mentioned embodiment 2, each of the plurality of Fresnel prisms 12 is formed so as to have a non-light incidence surface 12c which is parallel to the surface 11a of the base on which the plurality of Fresnel prisms 12 are arranged. However, each of the plurality of Fresnel prisms 12 does not need to be formed so as to include all portions (shown by a dotted line), as shown in FIG. 8. Each of the plurality of Fresnel prisms 12 can be alternatively formed so as to include only portions shown by a solid line. These Fresnel prisms 12 are geometrically similar to those shown in FIG. 7.

Figure 9:
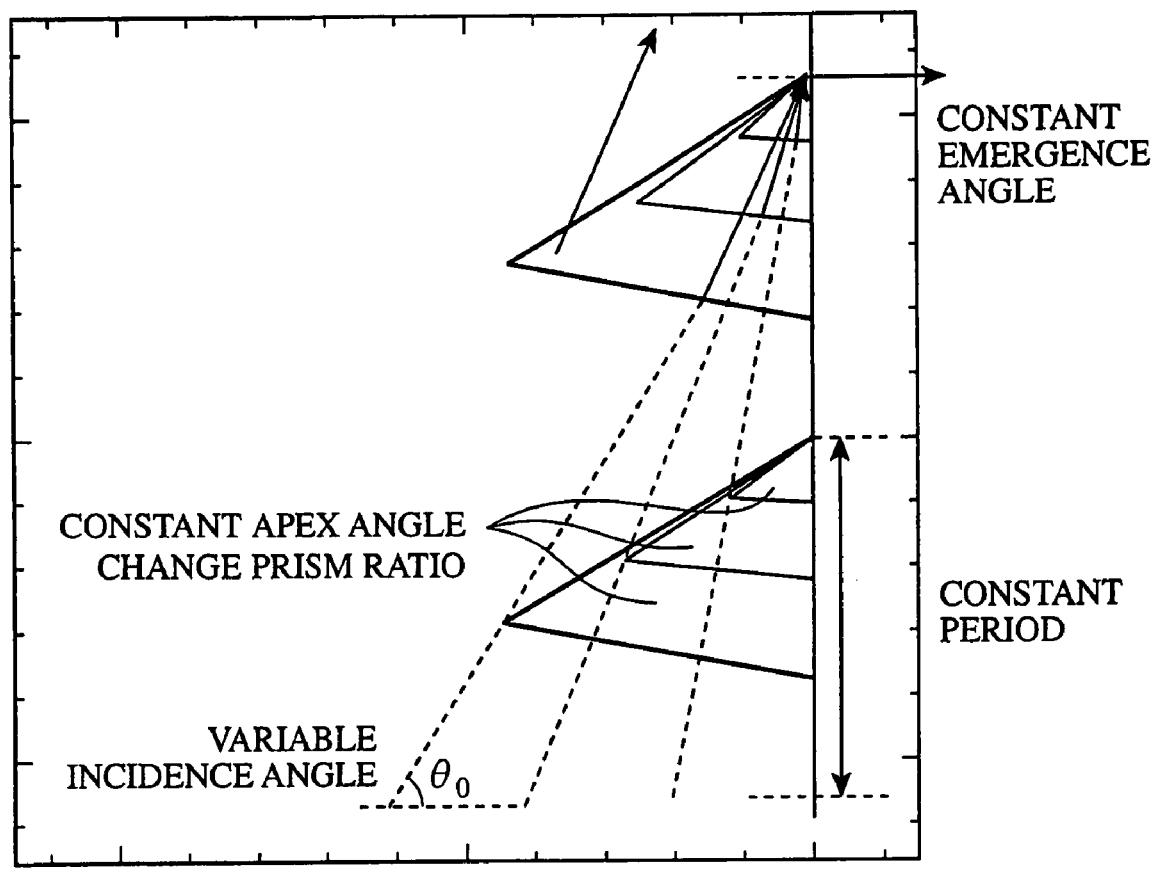
FIG. 9 is a diagram showing the incidence angle of a light ray incident upon a Fresnel prism 12.

FIG. 9 shows three possibilities of the incidence angle of a light ray incident upon each of the plurality of Fresnel prisms 12 when each of the plurality of Fresnel prisms 12 is similarly reduced (the ratio of similitude 1<1) without changing the period (i.e., the interval) of the plurality of Fresnel prisms 12 (i.e., when each of the plurality of Fresnel prisms 12 is similarly reduced while the prism apex angle τ is kept at 45 degrees and the light emergence angle $\theta_{refl}$ is kept at 0 degrees). It is apparent from this figure that the plurality of Fresnel prisms 12 of this embodiment has the same functionality as those shown in FIG. 5 even though each of the plurality of prisms is similarly reduced.

Figure 10:
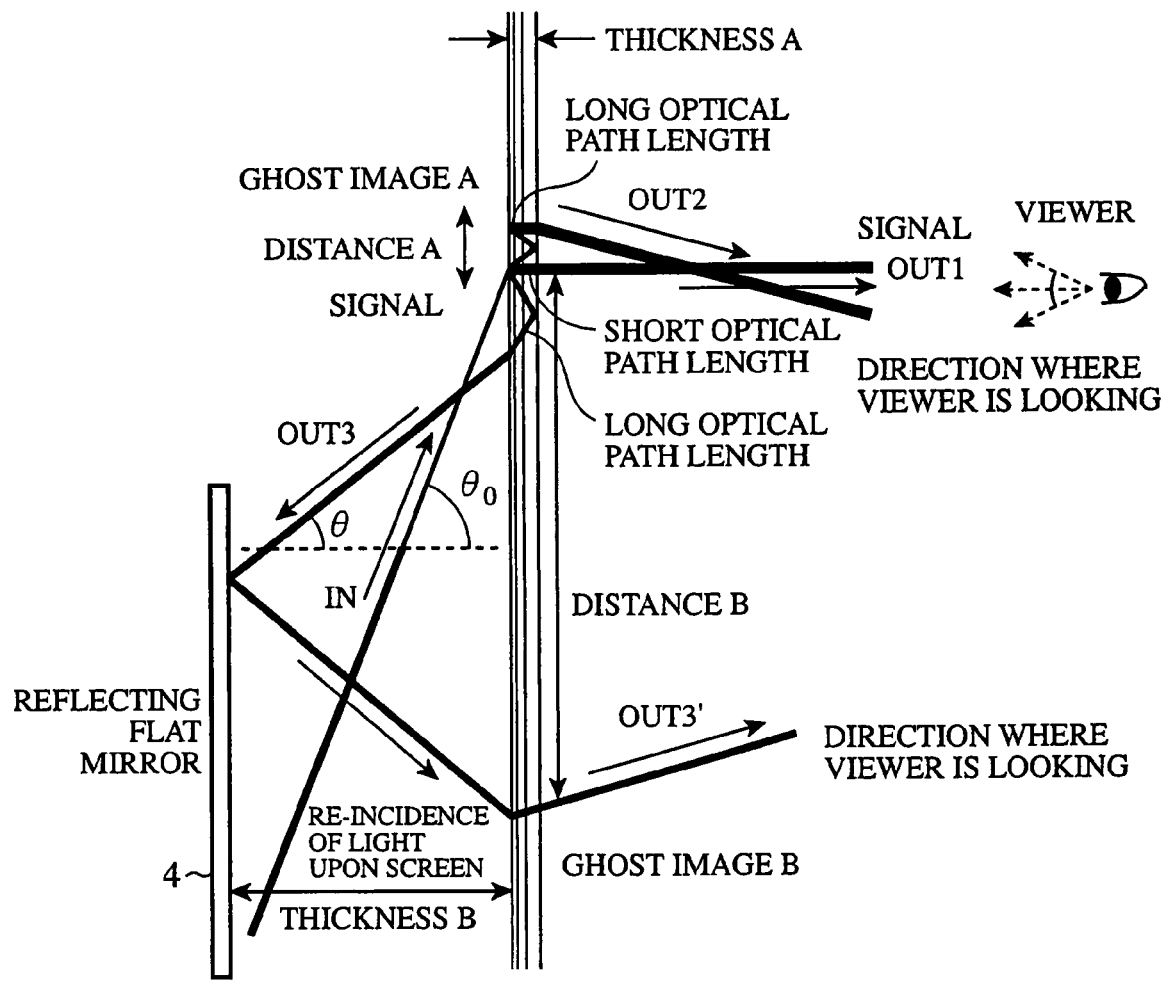
FIG. 10 is a diagram showing a ghost reduction effect (i.e., results of ray tracing numerical calculation)
Figure 11:
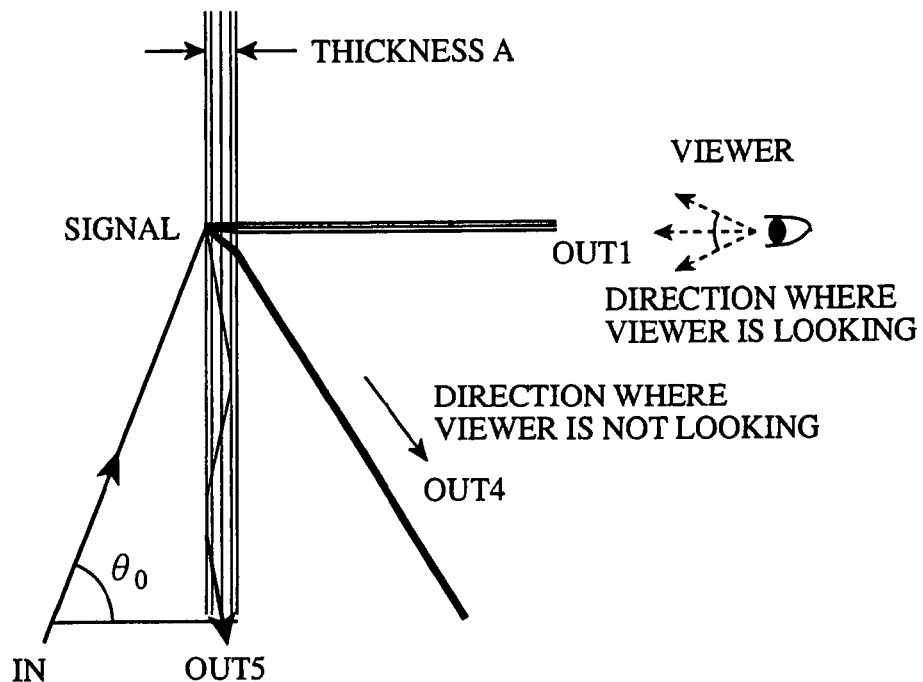
FIG. 11 is a diagram showing a ghost reduction effect (i.e., results of ray tracing numerical calculation)

FIGS. 10 and 11 are diagrams showing a ghost reduction effect (i.e., results of light ray tracing numerical calculation). Especially, FIG. 10 shows a case where no non-light incidence surface 12c is formed in each of the plurality of prisms (i.e., when each of the plurality of prisms is formed as shown by the dotted line of FIG. 8), and FIG. 11 shows a case where the non-light incidence surface 12c is formed in each of the plurality of prisms.

A ghost image results from unnecessary light which emerges toward a direction where the viewer is looking, and a position from which the ghost image emerges is substantially decided by the thicknesses of media which constitute the optical path of the unnecessary light, such as the thickness of the base 11 and the thickness of the reflecting flat mirror 4 located in the back of the Fresnel optical element (refer to FIG. 6). A light ray incident upon each of the plurality of Fresnel prisms 12 travels along an optical path extending from IN to OUT1 and emerges as signal light.

However, if any absorber does not exist in the optical path, remaining Fresnel-reflected components that cannot pass through the light emergence surface and remaining Fresnel-reflected components that cannot pass through the light incidence surface certainly appear according to the law of energy conservation.

A ghost image A emerges from a position at a distance (i.e. a distance A) which is proportional to a thickness A corresponding to the thickness of the screen base, toward a direction OUT2 where the viewer is looking (refer to FIG. 10).

Another ghost image B also emerges from a position at a distance (i.e., a distance B) which is proportional to a length B between the reflecting flat mirror 4 located in the back of the Fresnel optical element and the Fresnel optical element, toward a direction OUT3' where the viewer is looking (refer to FIG. 10).

On the other hand, when the non-light incidence surface 12c is formed in each of the plurality of prisms, as shown in FIG. 11, the signal light is made to emerge toward OUT1 without changing its optical path, whereas the position from which the unnecessary light emerges changes and the unnecessary light is made to emerge toward a direction OUT4 where the viewer is not looking.

To be more specific, the unnecessary light is made to emerge as follows.

Figure 12:
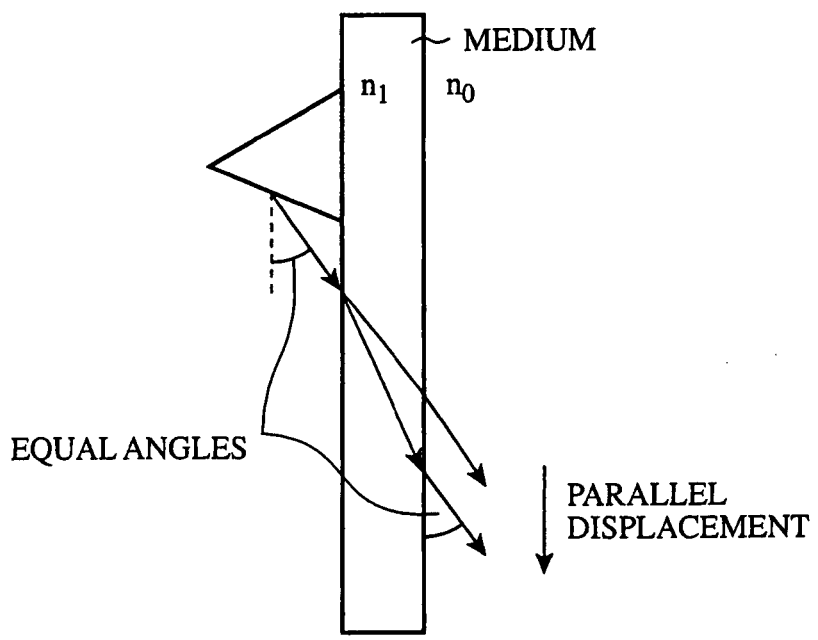
FIG. 12 is a diagram showing the optical path of an incident light ray.

As shown in FIG. 12, a light ray which is incident upon one of parallel planes which face each other is refracted by a medium placed between the planes according to Snell's law and changes its angle with respect to the planes, and is further refracted at the other one of the planes via which the light ray emerges and is therefore made to emerge at the same angle as the incidence angle with respect to the planes after all.

Since it can be assumed that a light ray which is incident upon one of parallel planes is made to emerge from the planes while being translated, the remaining Fresnel-reflected components which cannot pass through the light incidence surface of the Fresnel optical element and are incident upon the parallel planes of the Fresnel optical element are made to emerge from the screen surface (those remaining Fresnel-reflected components correspond to OUT4 of FIG. 11).

Figure 13:
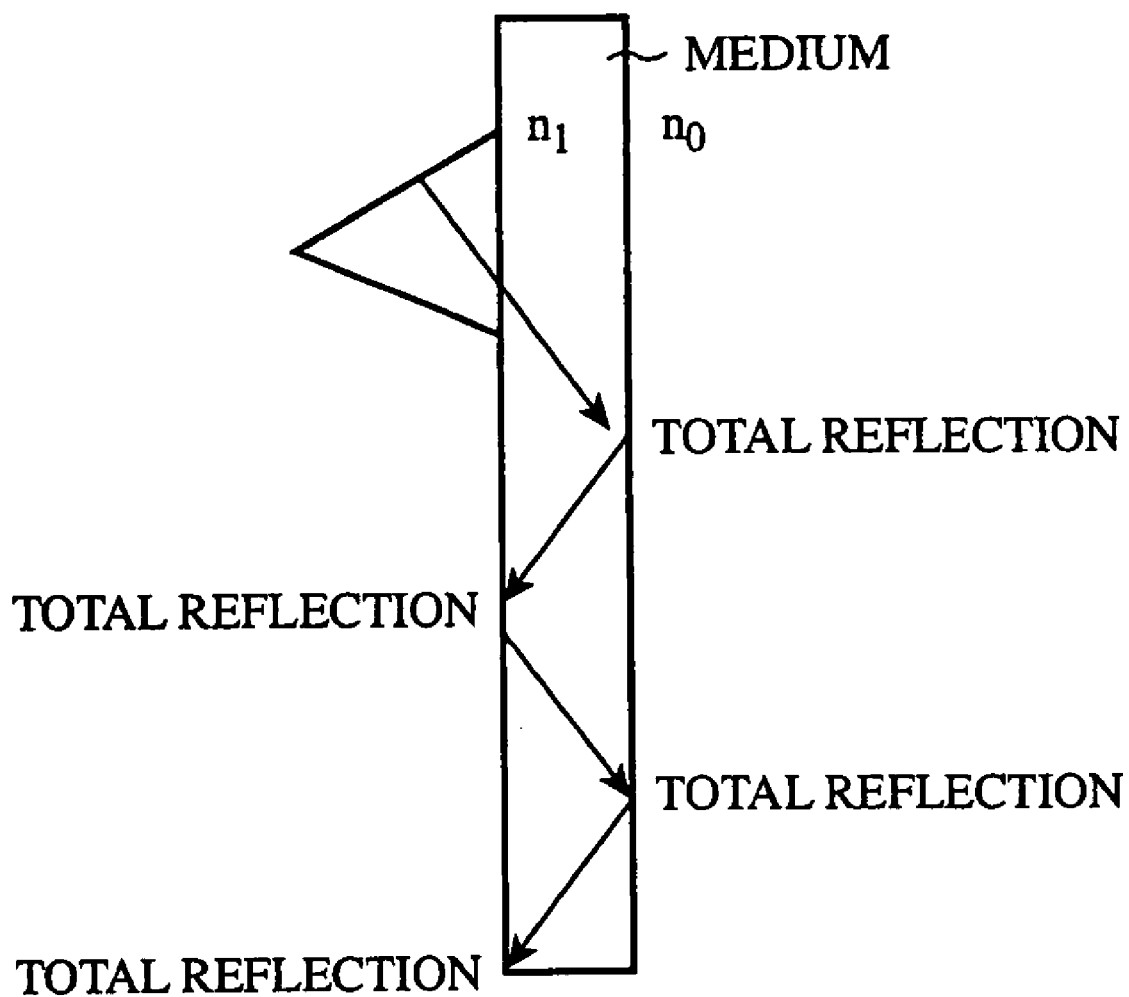
FIG. 13 is a diagram showing the optical path of an incident light ray.

In a case where the remaining Fresnel-reflected components which cannot pass through the light emergence surface and the remaining Fresnel-reflected components that cannot pass through the light incidence surface propagate a plurality of Fresnel prisms 12 and then enter the screen surface, when these components satisfy the total reflection condition at the parallel planes of the Fresnel optical element which face each other, the flux of light is confined within the medium between the parallel planes (the flux of light corresponds to OUT5 of FIG. 11), as shown in FIG. 13.

The ratio of similitude l of each of the plurality of total reflection prisms can be set to be a bit larger so as to have a little margin such that signal light which should be incident upon another prism in front thereof can be relieved in preparation for a case where the front prism is missing from the plurality of total reflection prisms due to manufacture tolerance etc.

Since the height of each of the plurality of total reflection prisms can be reduced by reducing the ratio of similitude l of each of the plurality of total reflection prisms, the present embodiment offers an advantage of reducing the length of time required for machining a metallic mold for the plurality of total reflection prisms.

Furthermore, since the height of each of the plurality of total reflection prisms can be reduced by reducing the ratio of similitude l of each of the plurality of total reflection prisms, the present embodiment offers another advantage of reducing the wear of the end portion of a cutting tool which is used for machining the metallic mold which is a master mold of the plurality of Fresnel prisms, thereby improving the accuracy of mold machining.

The crest portions of the metallic mold (i.e., the trough of each of the plurality of prisms) may be bent under the influence of manufacture tolerance at the time of machining. This may result in occurrence of streaks in the plurality of Fresnel prisms when the plurality of Fresnel prisms are released from the metallic mold.

In contrast, in accordance with this embodiment, since the ratio of similitude l of each of the total reflection prisms is reduced such that the plurality of prisms are arranged at a planar gap between any two of them, no crest portion exists in the metallic mold used for manufacturing the plurality of Fresnel prisms. Therefore, the present embodiment offers a further advantage of being able to prevent occurrence of streaks in the plurality of Fresnel prisms.

In addition, since the height of each of the plurality of total reflection prisms can be reduced by reducing the ratio of similitude l of each of the plurality of total reflection prisms, the present embodiment offers a still further advantage of making it easy to remove the plurality of Fresnel prisms from the metallic mold, thereby improving yields.

As can be seen from the above description, since the machining time, yields, etc. are improved and malfunctions are reduced, the manufacturing cost can be reduced.

Embodiment 4

Figure 14:
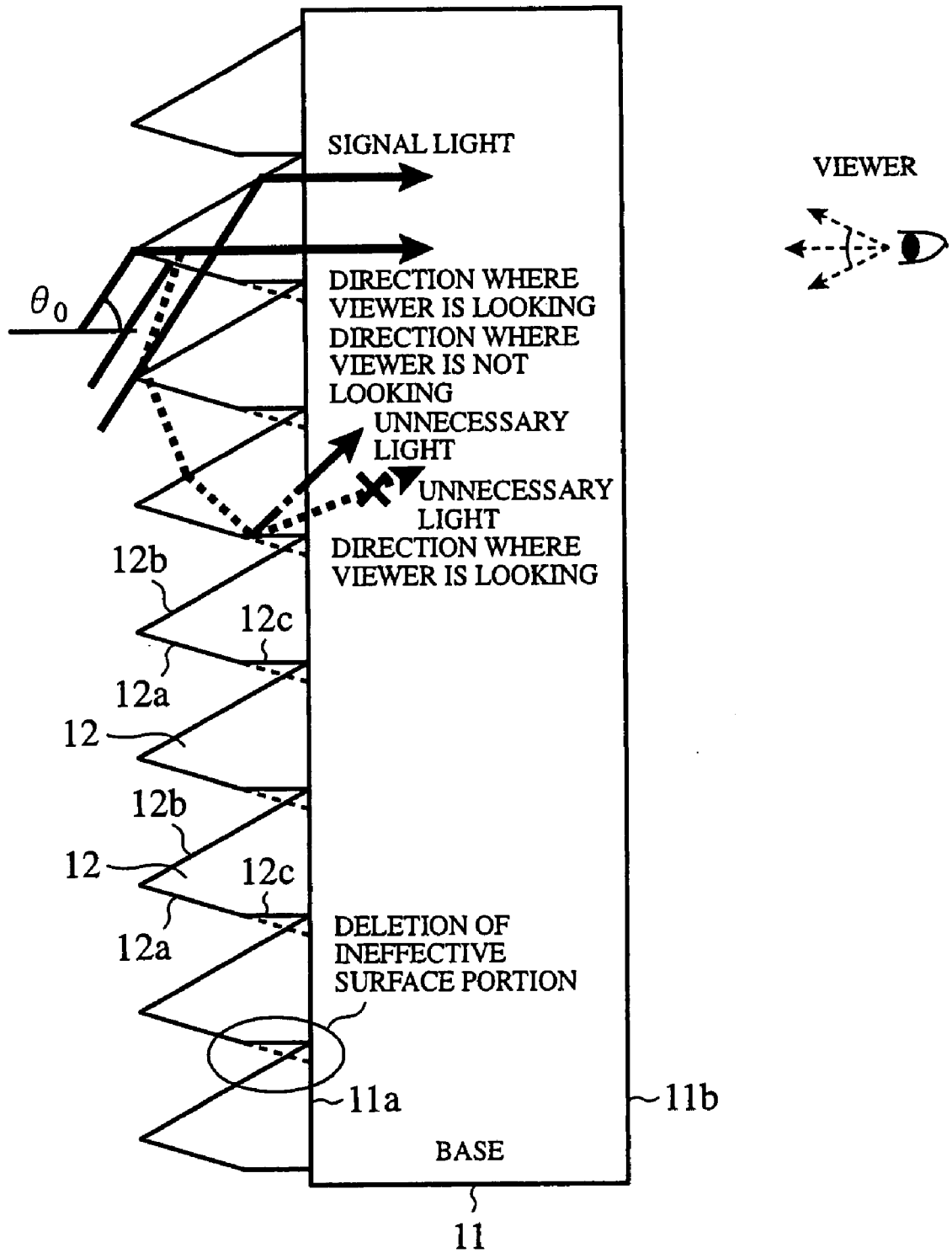
FIG. 14 is a block diagram showing a Fresnel optical element in accordance with embodiment 4 of the present invention.

In accordance with above-mentioned embodiment 1, the non-light incidence surface 12c of each of the plurality of Fresnel prisms 12 is formed so that the right end U of the refractive surface 12a of each of the plurality of Fresnel prisms 12 is connected to the left end V' of the surface portion V'P' which is an ineffective surface portion, and so as to have an angle τ' which is larger than the prism apex angle τ with the reflective surface 12b, as previously mentioned. In contrast, in accordance with this embodiment, the non-light incidence surface 12c of each of the plurality of Fresnel prisms 12 is formed so as to have an angle τ' which is smaller than the prism apex angle τ with the reflective surface 12b, as shown in FIG. 14.

Specifically, the refractive surface 12a and non-light incidence surface 12c which are an undersurface of each of the plurality of Fresnel prisms 12 is formed in the shape of a surface portion EUT of FIG. 4.

In a case where a part of the refractive surface 12a of each of the plurality of Fresnel prisms 12 is not formed so as to be a non-light incidence surface 12c, but the refractive surface 12a is formed in the shape of a surface portion EUG shown in FIG. 4 (see a dotted line of FIG. 14), if a part of a light ray incident upon the refractive surface 12a of a Fresnel prism 12 which is the second from the top of the Fresnel optical element is reflected by the refractive surface 12a, unnecessary light which is the reflected light may propagate while being repeatedly refracted by the reflective surface 12b and refractive surface 12a of another Fresnel prism 12 located just below the second Fresnel prism, and may be reflected by a portion (i.e., a surface portion UG), shown by a dotted line, of the refractive surface 12a of another Fresnel prism 12, which is the fourth from the top, and may emerge toward a direction where the viewer is looking, for example.

In contrast, in accordance with this embodiment 4, the undersurface of each of the plurality of Fresnel prisms 12 is formed in the shape of the surface portion EUT of FIG. 4 so that the non-light incidence surface 12c of each of the plurality of Fresnel prisms 12 has an angle τ' which is smaller than the prism apex angle τ with the reflective surface 12b. The unnecessary light as mentioned above is reflected by the non-light incidence surface 12c of the fourth Fresnel prism 12, and is made to emerge toward a direction where the viewer is not looking (i.e., emerge toward a right upward direction in the example of FIG. 14). Therefore, in accordance with this embodiment 4, the unnecessary light can be made to emerge toward a further upward direction by further reducing the angle τ' which the non-light incidence surface 12c forms with the reflective surface 12b.

As can be seen from the above description, in accordance with this embodiment 4, the non-light incidence surface 12c of each of the plurality of Fresnel prisms 12 is formed so as to have an angle τ' which is smaller than the prism apex angle τ with the reflective surface 12b. The present embodiment thus offers an advantage of being able to prevent unnecessary light, such as a light ray reflected by the refractive surface 12a of each of the plurality of Fresnel prisms without passing through the refractive surface 12a, from emerging toward the viewer's line of sight.

Embodiment 5

In accordance with above-mentioned embodiment 1, the non-light incidence surface 12c of each of the plurality of Fresnel prisms 12 is formed so that the right end U of the refractive surface 12a of each of the plurality of Fresnel prisms 12 is connected to the left end V' of the surface portion V'P' which is an ineffective surface portion, and so as to have an angle τ' which is larger than the prism apex angle τ with the reflective surface 12b, as previously mentioned. In contrast, in accordance with this embodiment, an auxiliary prism 12d is formed in the non-light incidence surface upon which any light ray from both the projector 1 and the reflecting flat mirror 4 is not incident directly.

Figure 15:
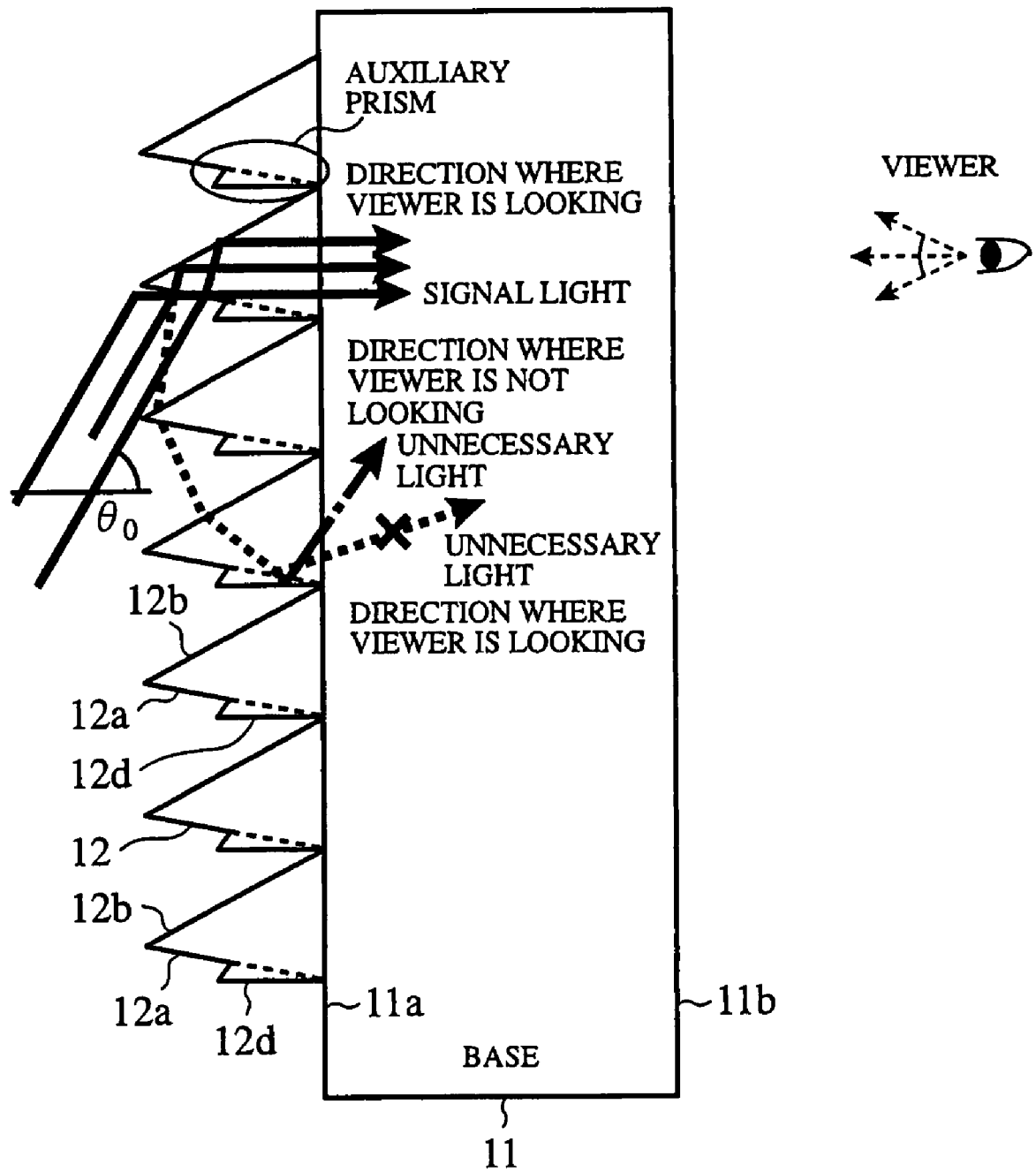
FIG. 15 is a block diagram showing a Fresnel optical element in accordance with embodiment 5 of the present invention.

Specifically, an auxiliary prism is newly added to an ineffective surface portion (i.e., UGP'V' of FIG. 4) of each of the plurality of Fresnel prisms 12 so as not to intercept signal light E'U. FIG. 15 shows an example of the auxiliary prism which rises steeply at a right angle with respect to the screen base 11.

Thus, a degree of freedom can be added to the shape of each of the plurality of Fresnel prisms 12 by newly adding the auxiliary prism 12d to the ineffective surface portion of each of the plurality of Fresnel prisms 12. Therefore, even if a Fresnel-reflected component from the refractive surface 12a of a Fresnel prism 12 is incident upon the reflective surface 12b of another Fresnel prism 12 in the front of the former Fresnel prism and is then made to propagate toward a distant position while being repeatedly refracted, for example, the Fresnel-reflected component can be diverted from the direction where the viewer is looking.

However, in order to add the auxiliary prism 12d to the ineffective surface portion of each of the plurality of Fresnel prisms 12, it is necessary to carry out two-times machining using metallic molds. When the auxiliary prism 12d is carved on each of the plurality of Fresnel prisms 12 after all the Fresnel prisms 12 are carved, since displacements of the auxiliary prism 12d take place easily due to manufacture tolerance, it is desirable to alternately carve the plurality of Fresnel prisms 12 and the plurality of auxiliary prisms 12d. The alternately carving of the plurality of Fresnel prisms 12 and the plurality of auxiliary prisms 12d makes it possible to remove fins from the molded Fresnel optical element at the time of machining of the trough of the plurality of Fresnel prisms 12, and makes it easy to carry out mold transfer with resin.

As can be seen from the above description, in accordance with this embodiment 5, the auxiliary prism 12d is formed on the non-light incidence surface upon which any light ray from both the projector 1 and the reflecting flat mirror 4 is not incident directly. The present embodiment thus offers an advantage of being able to prevent unnecessary light, such as a light ray reflected by the refractive surface 12a of each of the plurality of Fresnel prisms without passing through the refractive surface 12a, from emerging toward the viewer's line of sight.

Embodiment 6

In accordance with above-mentioned embodiment 1, the non-light incidence surface 12c of each of the plurality of Fresnel prisms 12 is formed so as to have an angle $\tau'$ which is larger than the prism apex angle $\tau$ with the reflective surface 12b, as previously mentioned. In contrast, in accordance with this embodiment, a plurality of Fresnel prisms 12 having a prism apex angle of $\tau_1$ are arranged in regions 1 on the surface 11a of the base, and a plurality of Fresnel prisms 12 having a prism apex angle of $\tau_2$ are arranged in a region 2 on the surface 11a of the base, as shown in FIG. 16.

Although there are many cases where the prism apex angle $\tau$ is kept constant over the whole of the screen surface since the prism apex angle $\tau$ is usually determined by the point angle of a cutting tool for mold machining which is the master mold of the plurality of Fresnel prisms 12, it is possible to change the prism apex angle $\tau$ for every place by devising a method of digging the metallic mold, for example, digging the metallic mold twice, or changing the inclination of the cutting tool between to-and-fro movements of the cutting tool.

Figure 17:
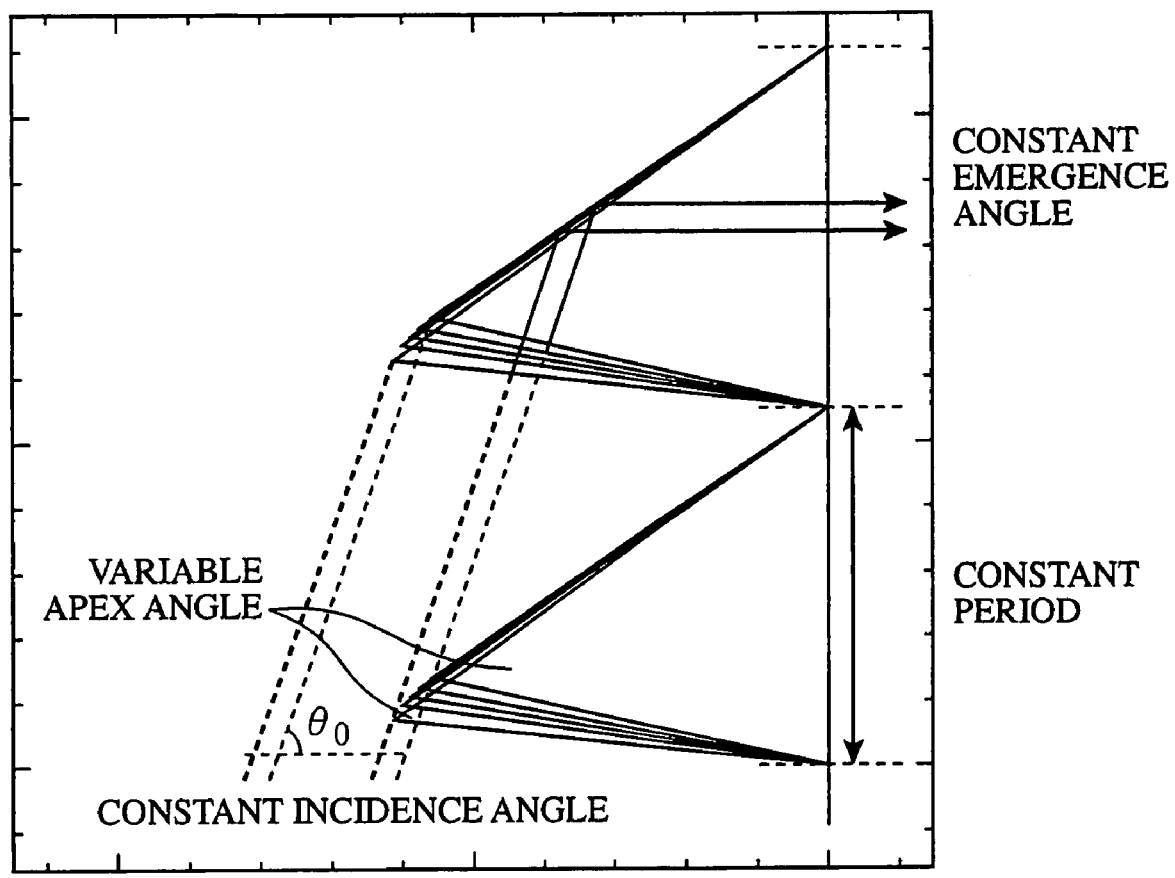
FIG. 17 is an explanatory diagram showing the prism apex angle of a Fresnel prism 12.

FIG. 17 shows examples in which the prism apex angle $\tau$ ranges from 45 to 51 degrees when rays of light incident upon the prisms have the same incidence angle and emergence angle with the period of the prisms being kept constant. It is apparent from the figure that the inclination and size of each of the surfaces of each of the plurality of Fresnel prisms 12 can be varied by changing the apex angle of each of the plurality of Fresnel prisms 12 with the incidence angle of incident rays of light being kept constant.

Figure 16:
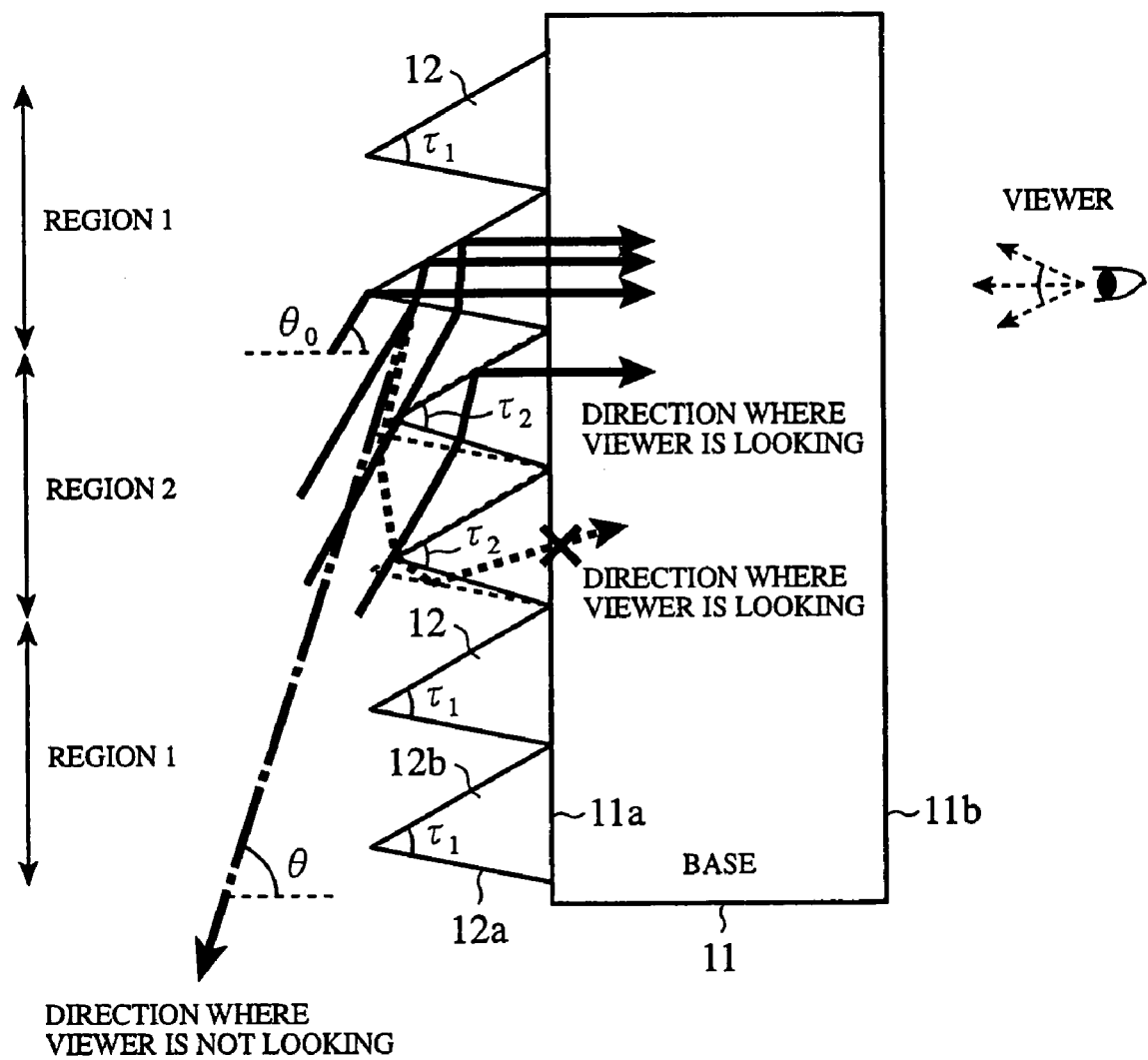
FIG. 16 is a block diagram showing a Fresnel optical element in accordance with embodiment 6 of the present invention.

Therefore, since Fresnel prisms 12 having a prism apex angle of $\tau_1$ are arranged in regions 1 on the base surface 11a and Fresnel prisms 12 having a prism apex angle of $\tau_2$ are arranged in a region 2 on the base surface 11a, as shown in FIG. 16, the optical path of unnecessary light varies. As shown in FIG. 16, the unnecessary light is controlled so as to travel toward a direction where the viewer is not looking by changing the apex angle of each of the plurality of Fresnel prisms 12 arranged in the region 2 to $\tau_2$.

Thus, since a degree of freedom can be added to the shape of each of the plurality of Fresnel prisms 12 by changing the prism apex angle $\tau$ of each of the plurality of Fresnel prisms 12 so that it varies from region to region, it is possible to control the direction of the unnecessary light without affecting the signal light.

Figure 18:
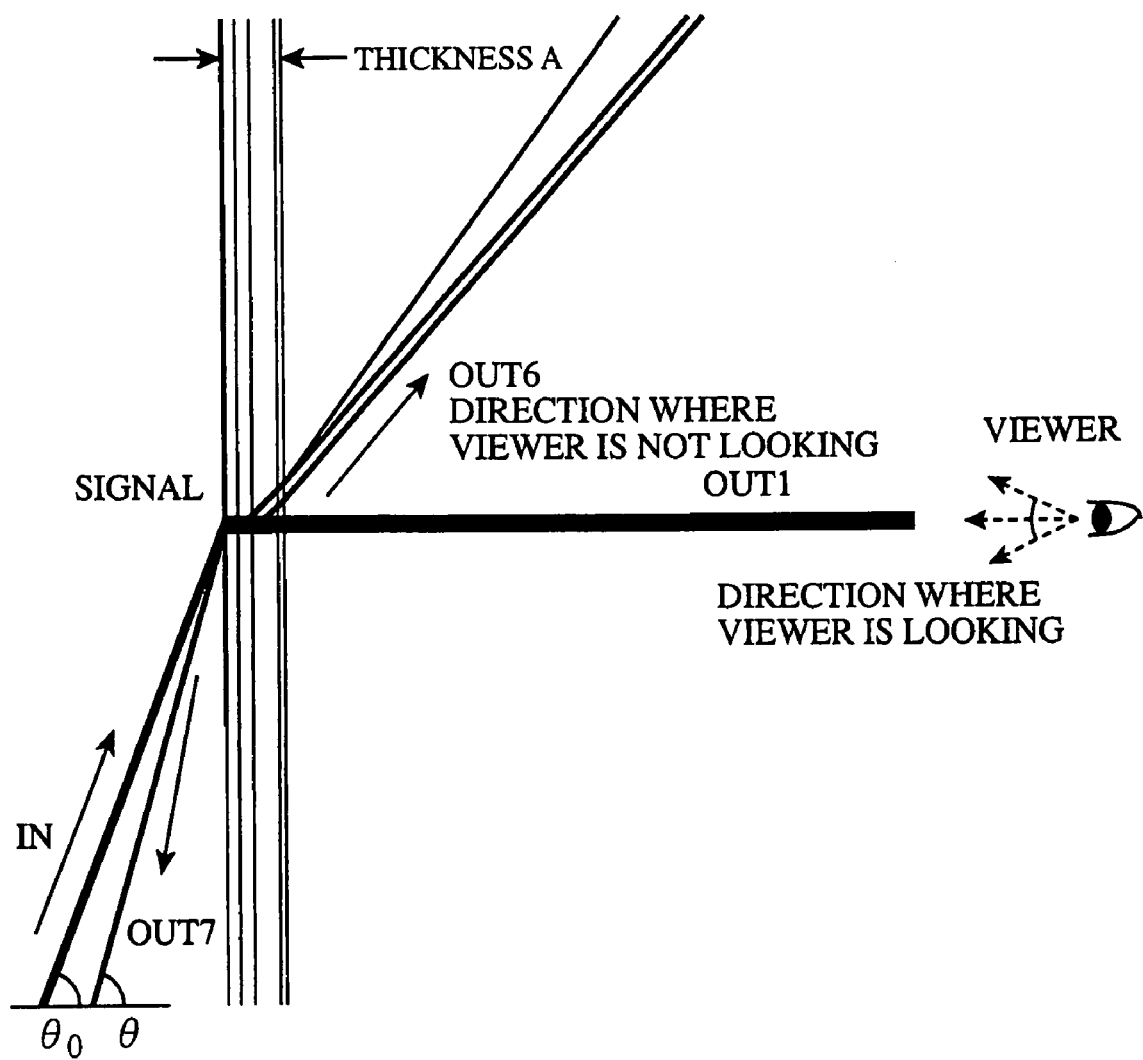
FIG. 18 is an explanatory diagram showing a ghost reduction effect (i.e., results of ray tracing numerical calculation)

FIG. 18 shows results of ray tracing numerical calculation, which indicate a ghost reduction effect and which are an example of ray tracing numerical calculation in which the prism apex angle $\tau$ is changed to 53 degrees.

As shown in FIG. 18, a ray of unnecessary light is made to emerge toward a direction OUT6 where the viewer is not looking. Although a ray of unnecessary light is also made to emerge from OUT7, this unnecessary light is returned to the reflecting flat mirror 4 at an angle which is larger than the angle of the incident light. Therefore, occurrence of any ghost image is suppressed.

As can be seen from the above description, in accordance with this embodiment 6, Fresnel prisms 12 having a prism apex angle $\tau$ which the refractive surface 12a forms with the reflective surface 12b in each thereof and other Fresnel prisms 12 having a prism apex angle $\tau$ different from that of the former Fresnel prisms coexist on the base surface 11a. The present embodiment thus offers an advantage of being able to prevent unnecessary light, such as a light ray reflected by the refractive surface 12a of each of the plurality of Fresnel prisms without passing through the refractive surface 12a, from emerging toward the viewer's line of sight.

While the Fresnel optical element has the structure in accordance with this embodiment 6 in which Fresnel prisms 12 having a prism apex angle $\tau$ which the refractive surface 12a forms with the reflective surface 12b in each thereof and other Fresnel prisms 12 having a prism apex angle $\tau$ different from that of the former Fresnel prisms coexist on the base surface 11a, the Fresnel optical element can be formed so that the non-light incidence surface 12c of each of the plurality of Fresnel prisms 12 has an angle $\tau'$ which is larger than the prism apex angle $\tau$ with the reflective surface 12b, like that of above-mentioned embodiment 1.

Embodiment 7

In accordance with above-mentioned embodiment 6, Fresnel prisms 12 having a prism apex angle $\tau$ which the refractive surface 12a forms with the reflective surface 12b in each thereof and other Fresnel prisms 12 having a prism apex angle $\tau$ different from that of the former Fresnel prisms coexist on the base surface 11a, as previously mentioned. In contrast, in accordance with this embodiment, Fresnel prisms having chipped leading end portions (i.e., chipped Fresnel prisms) and Fresnel prism 12 having leading end portions which are not chipped are alternately arranged on the base surface 11a, as shown in FIG. 19.

When only Fresnel prisms 12 having leading end portions which are not chipped are arranged on the whole of the base surface 11a (see dotted lines of FIG. 19), if a part of a light ray incident upon the refractive surface 12a of a Fresnel prism 12 which is the third from the top of the Fresnel optical element is reflected by the refractive surface 12a, unnecessary light which is the reflected light may propagate while being repeatedly refracted by the reflective surface 12b and refractive surface 12a of another Fresnel prism 12 located just below the third Fresnel prism, and may be reflected by the refractive surface 12*a* of another Fresnel prism 12 which is the fifth from the top, and may emerge toward the direction where the viewer is looking, for example.

Figure 19:
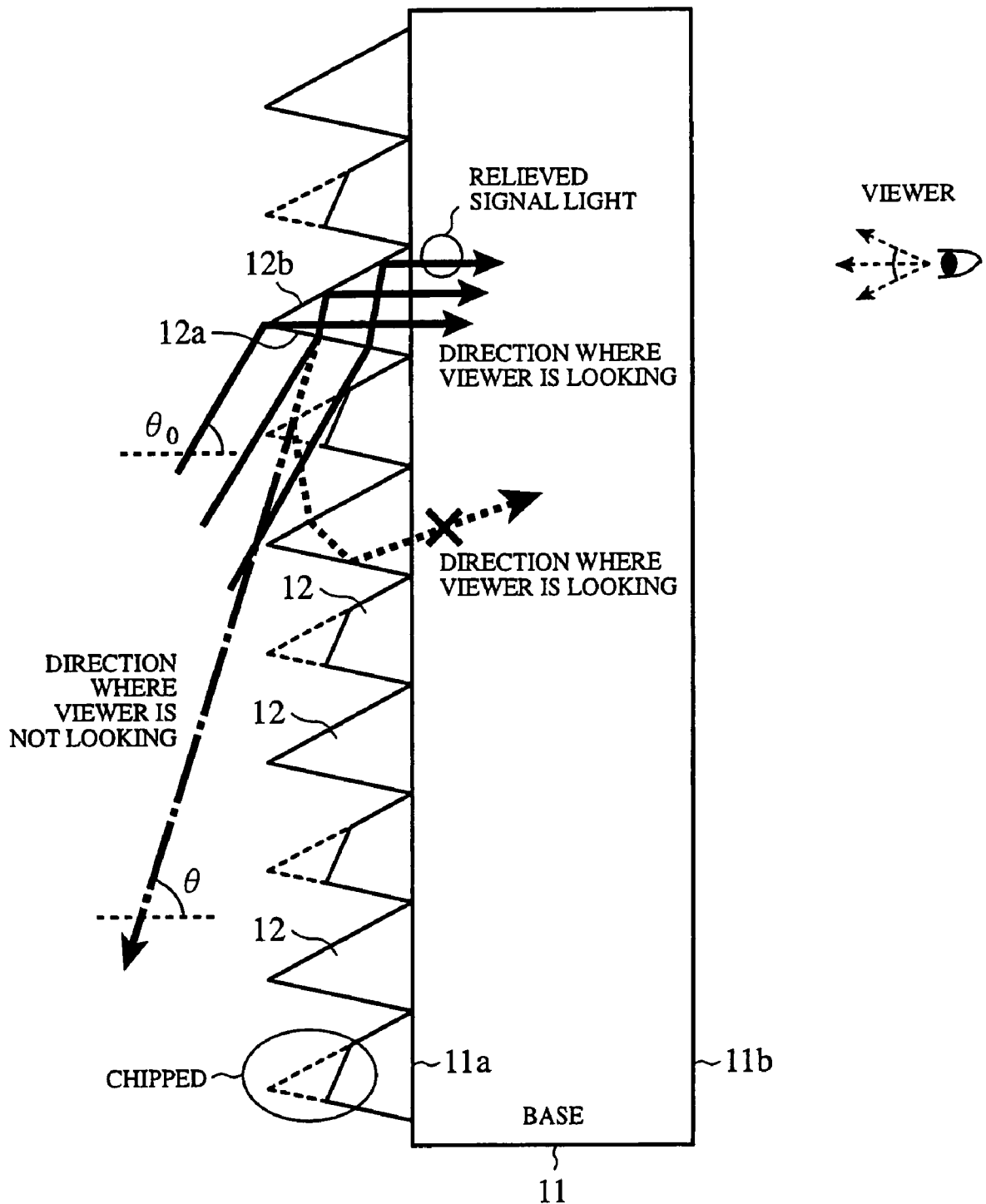
FIG. 19 is a block diagram showing a Fresnel optical element in accordance with embodiment 7 of the present invention.

In contrast, in accordance with this embodiment 7, since chipped Fresnel prisms 12 and Fresnel prism 12 having leading end portions which are not chipped are alternately arranged on the base surface 11*a*, the above-mentioned unnecessary light does not enter a chipped Fresnel prism 12 arranged at the fourth position from the top of the Fresnel optical element, but is made to emerge toward a direction where the viewer is not looking, just as it is (in the example of FIG. 19, it is made to emerge toward a left downward direction).

Since the leading end portion of each of the chipped Fresnel prisms 12 is on the optical path of signal light incident thereupon and is broken, the signal light may not enter each of the chipped Fresnel prisms 12. In this case, the signal light must enter a Fresnel prism 12 located just above each of the chipped Fresnel prisms and can be relieved. Therefore, the leading end portions of the chipped Fresnel prisms 12 are chipped to the extent that the signal light incident thereupon can be relieved.

The chipped Fresnel prisms 12 are alternately arranged on the base surface, as shown in FIG. 19. As an alternative, the chipped Fresnel prisms 12 can be arranged on every two, three or more line of the Fresnel optical element as long as the above-mentioned signal light can be relieved.

As can be seen from the above description, in accordance with this embodiment 7, the Fresnel optical element is constructed so that Fresnel prisms having chipped leading end portions (i.e., chipped Fresnel prisms) and Fresnel prism 12 having leading end portions which are not chipped coexist on the base surface 11*a*. The present embodiment thus offers an advantage of being able to prevent unnecessary light, such as a light ray reflected by the refractive surface 12*a* of each of the plurality of Fresnel prisms without passing through the refractive surface 12*a*, from emerging toward the viewer's line of sight.

Embodiment 8

Figure 20:
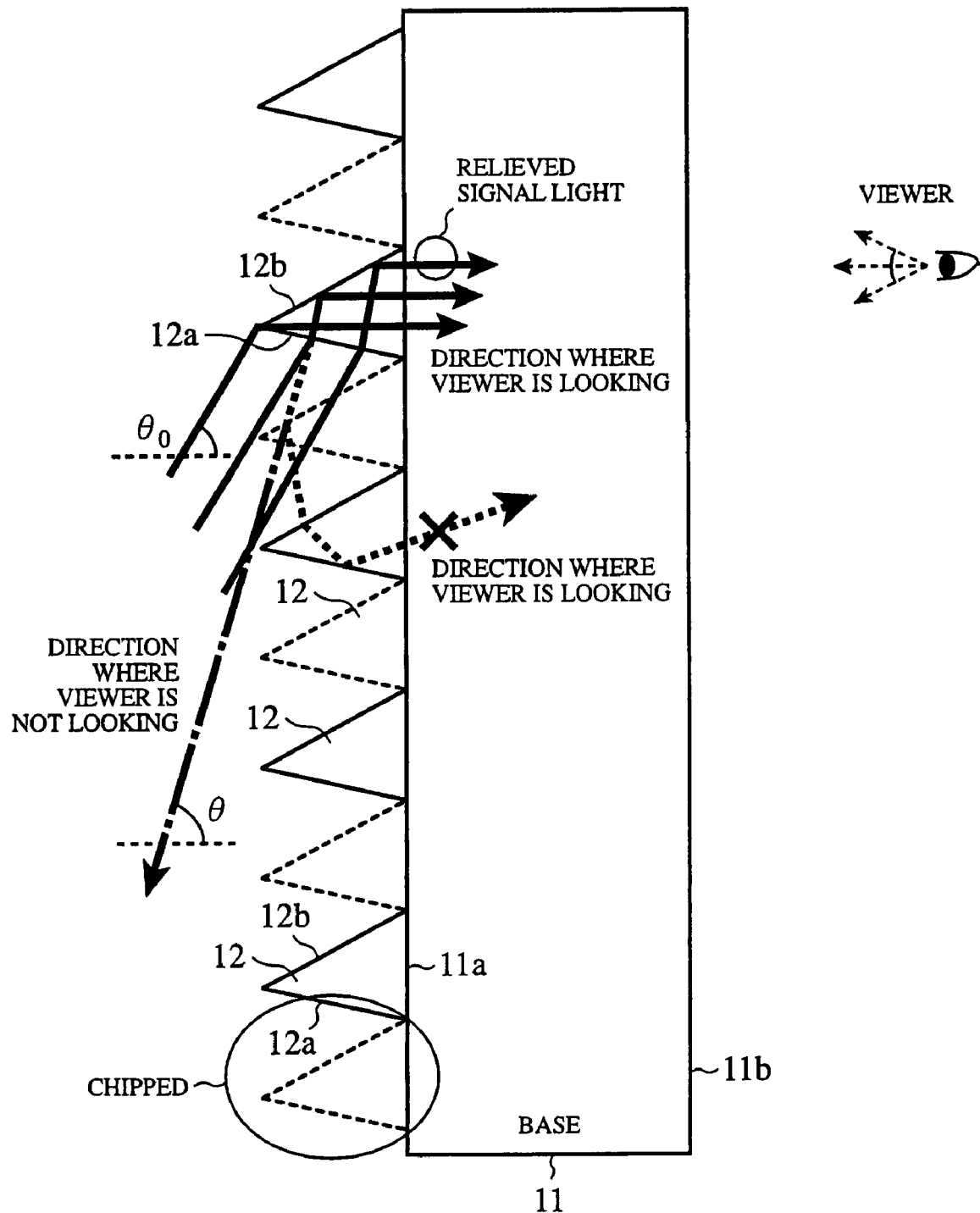
FIG. 20 is a block diagram showing a Fresnel optical element in accordance with embodiment 8 of the present invention.

In accordance with above-mentioned embodiment 7, chipped Fresnel prisms 12 having partially-chipped leading end portions and Fresnel prism 12 having leading end portions which are not chipped are alternately arranged on the base surface 11*a*, as previously mentioned. In contrast, in accordance with this embodiment, Fresnel prisms 12 having totally-chipped leading end portions and Fresnel prism 12 having leading end portions which are not chipped are alternately arranged on the base surface 11*a*, as shown in FIG. 20. In other words, Fresnel prisms 12 are thinned out every other piece so that Fresnel prisms 12 having leading end portions which are not chipped are arranged at intervals.

When only Fresnel prisms 12 having leading end portions which are not chipped are continuously arranged on the whole of the base surface (see dotted lines of FIG. 20), if a part of a light ray incident upon the refractive surface 12*a* of a Fresnel prism 12 which is the third from the top of the Fresnel optical element (i.e., which is the third of the Fresnel prisms 12 including Fresnel prisms shown by the dotted lines from the top of the Fresnel optical element) is reflected by the refractive surface 12*a*, unnecessary light which is the reflected light may propagate while being repeatedly refracted by the reflective surface 12*b* and refractive surface 12*a* of another Fresnel prism 12 located just below the third Fresnel prism, and may be reflected by the refractive surface 12*a* of another Fresnel prism 12 which is the fifth from the top, and may emerge toward the direction where the viewer is looking, for example.

In contrast, in accordance with this embodiment 8, since the plurality of Fresnel prisms 12 are thinned out every other piece, the above-mentioned unnecessary light does not enter the chipped Fresnel prism 12 arranged at the fourth position from the top of the Fresnel optical element (i.e., the fourth Fresnel prism 12 shown by a dotted line), but is made to emerge toward a direction where the viewer is not looking, just as it is (in the example of FIG. 20, it is made to emerge toward a left downward direction).

If the leading end portion of each of the plurality of Fresnel prisms 12 is on the optical path of signal light incident thereupon and any Fresnel prism 12 is not thinned out, the signal light incident upon the Fresnel prism 12 in question enters another Fresnel prism 12 located just above the Fresnel prism in question and is relieved when the prism apex angle τ is sufficiently small with respect to the incidence angle θ of the signal light. Therefore, the leading end portions of the chipped Fresnel prisms 12 are chipped to the extent that the signal light incident thereupon can be relieved.

As shown in FIG. 20, the plurality of Fresnel prism 12 is thinned out alternately. As an alternative, the plurality of Fresnel prism 12 can be thinned out every two, three or more pieces.

The shape of each of the plurality of Fresnel prism 12 shown in FIG. 20 can be included in the shape shown in FIG. 7 or 8, except for the ratio of similitude of each of the prisms (i.e., with the exception that the period m differs).

As can be seen from the above description, in accordance with this embodiment 8, Fresnel prisms 12 having totally-chipped leading end portions and Fresnel prisms 12 having leading end portions which are not chipped are alternately arranged on the base surface 11*a*. The present embodiment thus offers an advantage of being able to prevent unnecessary light, such as a light ray reflected by the refractive surface 12*a* of each of the plurality of Fresnel prisms without passing through the refractive surface 12*a*, from emerging toward the viewer's line of sight.

Embodiment 9

In accordance with above-mentioned embodiment 7, chipped Fresnel prisms 12 having partially-chipped leading end portions and Fresnel prism 12 having leading end portions which are not chipped are alternately arranged on the base surface 11*a*, as previously mentioned. In contrast, in accordance with this embodiment, Fresnel prisms 12 having a prism height of H1 (i.e., a first height) with respect to the base surface 11*a* and Fresnel prisms 12 having a prism height of H2 (i.e., a second height) which is lower than H1 are alternately arranged on the base surface 11*a*, as shown in FIG. 21.

When only Fresnel prisms 12 having the prism height of H1 are continuously arranged on the whole of the base surface (see dotted lines of FIG. 21), if a part of a light ray incident upon the refractive surface 12*a* of a Fresnel prism 12 which is the second from the top of the Fresnel optical element is reflected by the refractive surface 12*a*, unnecessary light which is the reflected light may propagate while being repeatedly refracted by the reflective surface 12*b* and refractive surface 12*a* of another Fresnel prism 12 located just below the second Fresnel prism, and may be reflected by the refractive surface 12*a* of another Fresnel prism 12 which is the fourth from the top, and may emerge toward the direction where the viewer is looking, for example.

Figure 21:
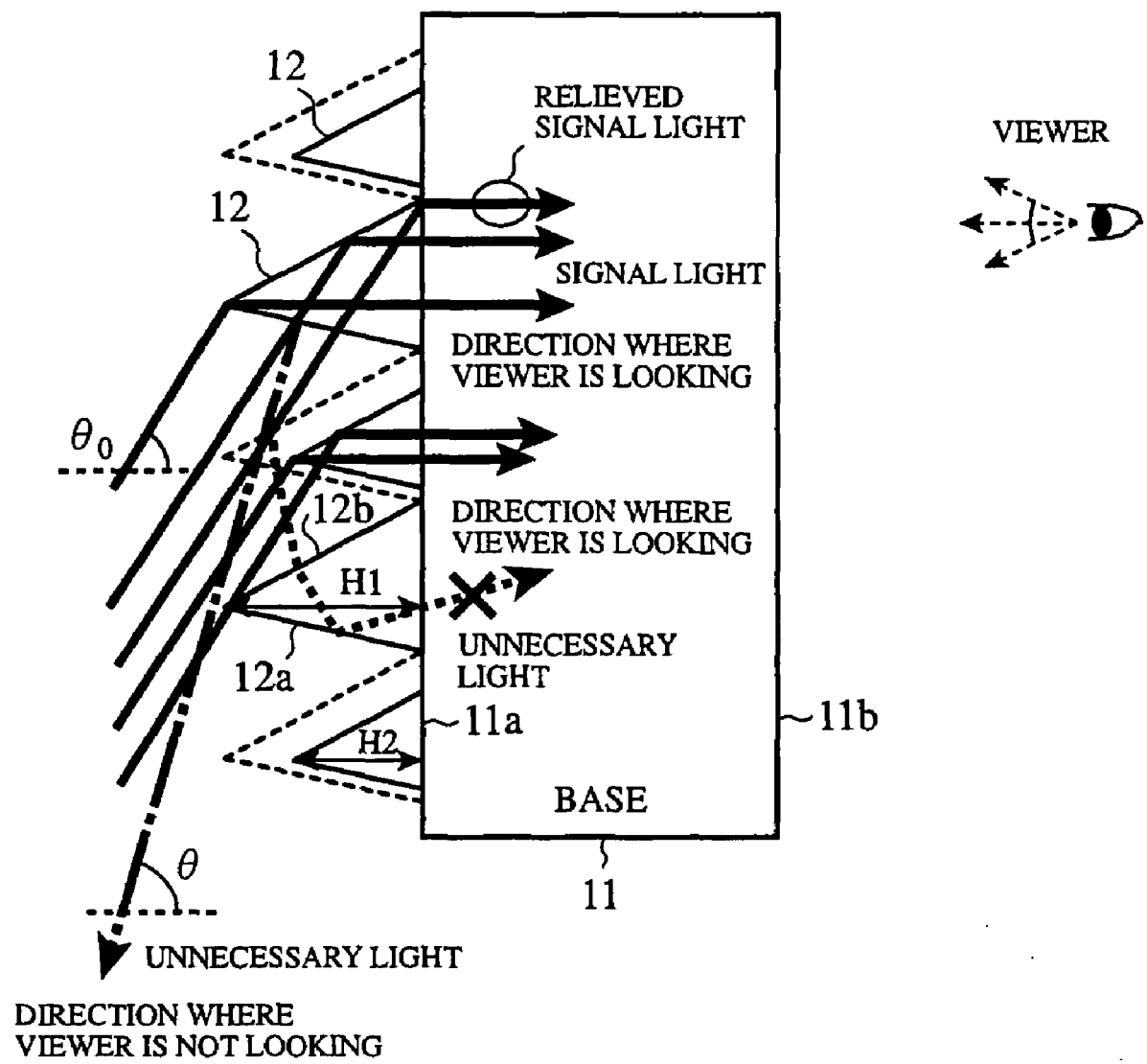
FIG. 21 is a block diagram showing a Fresnel optical element in accordance with embodiment 9 of the present invention.

In contrast, in accordance with this embodiment 9, since Fresnel prisms 12 having the prism height of H1 and Fresnel prisms 12 having the prism height of H2 are alternately arranged on the base surface 11a, the above-mentioned unnecessary light does not enter the Fresnel prism 12 arranged at the third position from the top of the Fresnel optical element, but is made to emerge toward a direction where the viewer is not looking, just as it is (in the example of FIG. 21, it is made to emerge toward a left downward direction).

As can be seen from the above description, in accordance with this embodiment 9, the Fresnel optical element is constructed so that Fresnel prisms 12 having the prism height of H1 and Fresnel prisms 12 having the prism height of H2 are alternately arranged on the base surface 11a. The present embodiment thus offers an advantage of being able to prevent unnecessary light, such as a light ray reflected by the refractive surface 12a of each of the plurality of Fresnel prisms without passing through the refractive surface 12a, from emerging toward the viewer's line of sight.

Embodiment 10

In accordance with above-mentioned embodiment 9, Fresnel prisms 12 having the prism height of H1 and Fresnel prisms 12 having the prism height of H2 are alternately arranged on the base surface 11a, as previously mentioned. In contrast, in accordance with this embodiment, a plurality of Fresnel prisms 12 having different angles of inclination with respect to the base surface 11a coexist and are arranged on the base surface 11a, as shown in FIG. 22.

In other words, as shown in FIG. 10, there is a difference in the length of the optical path in a medium through which rays of light are passed between signal light and unnecessary light, and they have a feature that the optical path of the unnecessary light is long as compared with that of the signal light.

Therefore, the longer the optical path of either of them, the more the light ray is influenced by variations in the surfaces of each of the plurality of prisms. Since change in the direction of reflected light is represented by $2 \times \Delta\theta$ with respect to change $\Delta\theta$ in the angle of a reflective surface that reflects the light, the unnecessary light is influenced twice as much as the signal light. By diffusing the unnecessary light at a larger angle than that for the signal light by using this difference in the optical path length and then extending the flux of the unnecessary light having a longer optical path length than the signal light, the contrast ratio of an image displayed on the screen can be raised.

Figure 22:
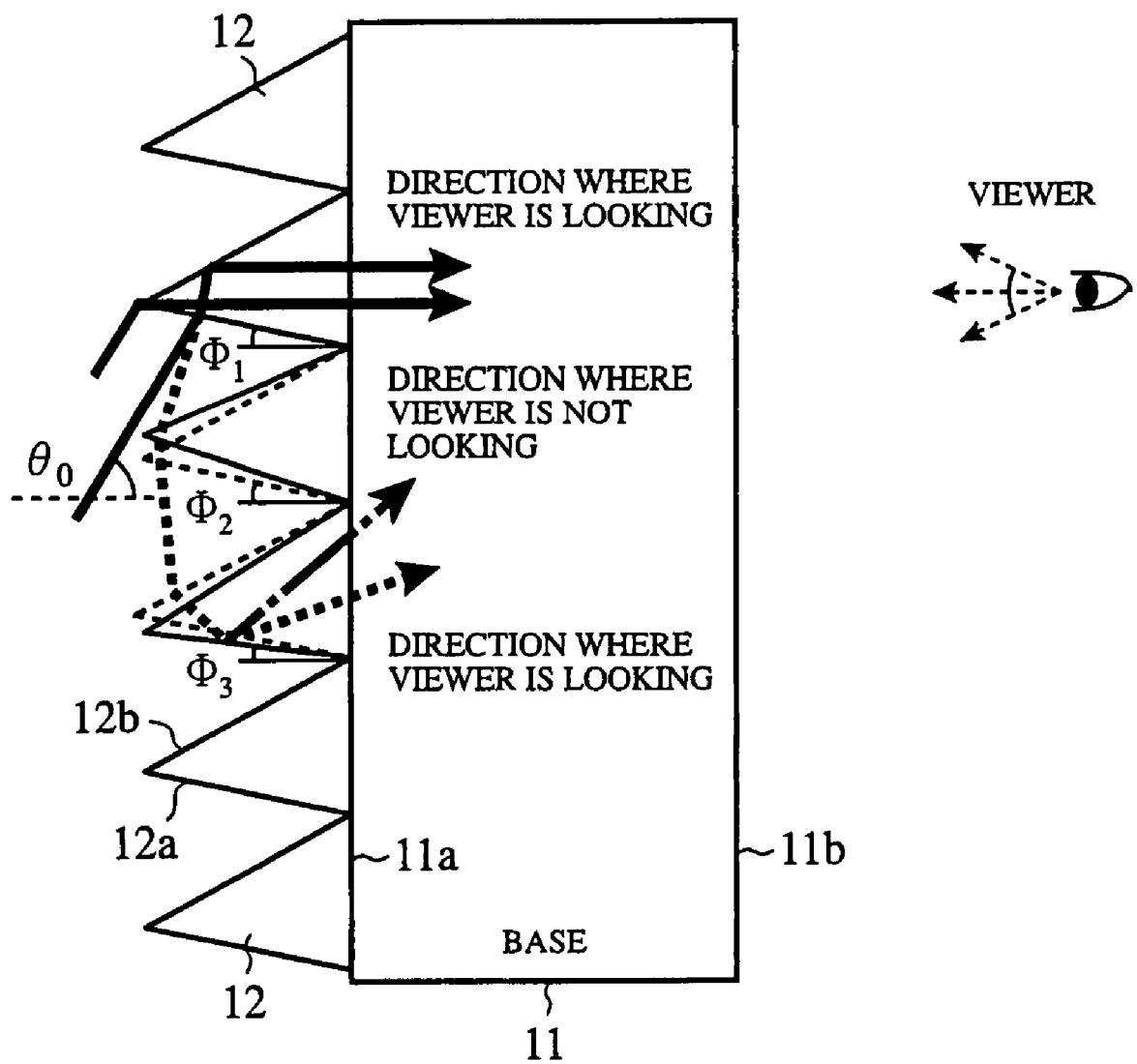
FIG. 22 is a block diagram showing a Fresnel optical element in accordance with embodiment 10 of the present invention.

In the example of FIG. 22, the Fresnel optical element includes a plurality of sets each including a Fresnel prism 12 having an angle of inclination $\phi 1$ with respect to the normal to the base surface 11a, a Fresnel prism 12 having an angle of inclination $\phi 2$, and a Fresnel prism 12 having an angle of inclination $\phi 3$ which are arranged in this order. In the example of FIG. 22, the following relationship: $\phi 3 < \phi 1 < \phi 2$ is established.

When only Fresnel prisms 12 having an angle of inclination $\phi 1$ are continuously arranged on the base surface (see dotted lines of FIG. 22), if a part of a light ray incident upon the refractive surface 12a of a Fresnel prism 12 which is the second from the top of the Fresnel optical element is reflected by the refractive surface 12a, unnecessary light which is the reflected light may propagate while being repeatedly refracted by the reflective surface 12b and refractive surface 12a of another Fresnel prism 12 located just below the second Fresnel prism, and may be reflected by the refractive surface 12a of another Fresnel prism 12 which is the fourth from the top, and may emerge toward the direction where the viewer is looking, for example.

In contrast, in accordance with this embodiment 10, the plurality of Fresnel prisms 12 having different angles of inclination with respect to the base surface 11a coexist and are arranged on the base surface 11a, the above-mentioned unnecessary light can be made to emerge toward a direction where the viewer is not looking (in the example of FIG. 22, it can be made to emerge toward a right upward direction) even though it is reflected by the refractive surface 12a of the Fresnel prism 12 arranged at the fourth position from the top of the Fresnel optical element. The above-mentioned unnecessary light can be made to emerge toward a further upward direction with decrease in the angle of inclination $\phi 3$ with respect to the base surface 11a.

As can be seen from the above description, in accordance with this embodiment 10, the plurality of Fresnel prisms 12 having different angles of inclination with respect to the base surface 11a coexist and are arranged on the base surface 11a. The present embodiment thus offers an advantage of being able to prevent unnecessary light, such as a light ray reflected by the refractive surface 12a of each of the plurality of Fresnel prisms without passing through the refractive surface 12a, from emerging toward the viewer's line of sight.

Embodiment 11

Figure 23:
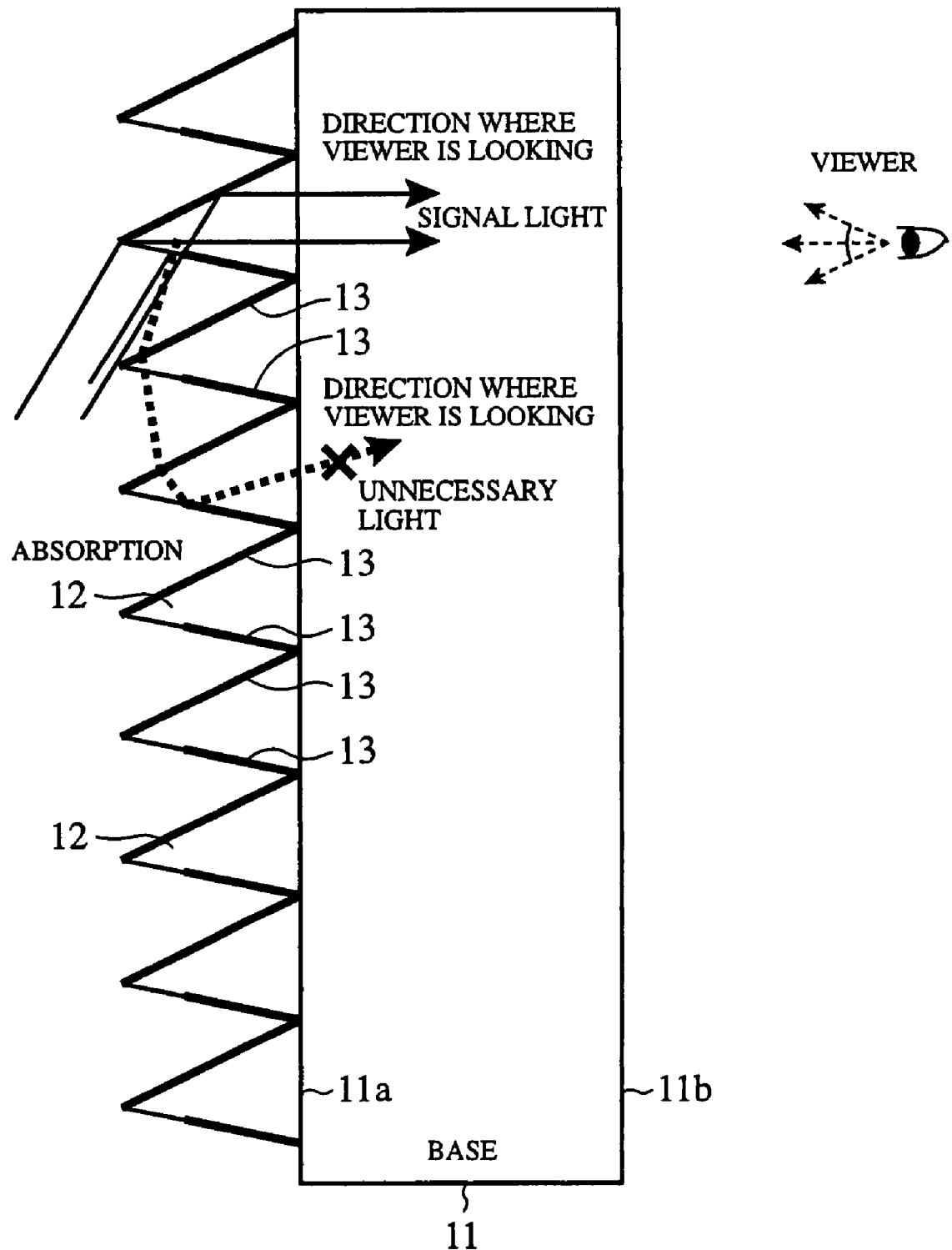
FIG. 23 is a block diagram showing a Fresnel optical element in accordance with embodiment 11 of the present invention.

In accordance with above-mentioned embodiment 1, each of the plurality of Fresnel prisms 12 has an effective surface portion which contributes to the optical path of signal light and an ineffective surface portion which does not contribute to the optical path of the signal light (e.g., a surface portion VP of FIG. 4 and a non-light incidence surface 12c, etc.). In accordance with this embodiment, a light absorption layer 13 that absorbs rays of light incident thereupon is added to the ineffective surface portion, which does not contribute to the optical path, and reflective surface 12b of each of the plurality of Fresnel prisms, as shown in FIG. 23. For example, a black dye (VALIFAST BLACK 3810 or an azine auriferous dye) or pigment which is used as a material of which crayons or the like are made is used and added, as the optical absorber, to the ineffective surface portion and reflective surface of each of the plurality of Fresnel prisms.

Thus, when a light absorption layer 13 is added to the ineffective surface portion of each of the plurality of Fresnel prisms, which does not contribute to the optical path, as shown in FIG. 23, even if unnecessary light enters the refractive surface 12a of each of the plurality of Fresnel prisms, it is absorbed by the light absorption layer 13 of the refractive surface 12a and is therefore not made to emerge toward the direction where the viewer is looking.

When a light absorption layer 13 is added to the refractive surface 12a through which incident light can pass, the intensity of the light decreases while there is no influence of optical absorption at the reflective surface 12b because the total reflection by the reflective surface 12b depends upon only the difference in refractive index between two media at the boundary even if the light absorption layer 13 is added to the reflective surface 12b. Therefore, the light absorption layer 13 can be added to the reflective surface 12b of each of the plurality of Fresnel prisms. Since the intensity of unnecessary light decreases because of the light absorption layer 13 when the unnecessary light passes through the reflective surface 12b of each of the plurality of Fresnel prisms, it is noted that the light absorption layer 13 added to the reflective surface 12b contributes to control of ghost images.

A method of adding a light absorption layer 13 to the ineffective surface portion and reflective surface of each of the plurality of Fresnel prisms includes the steps of applying glue which gets dry when light is applied thereto to the whole of the inclined surfaces of each of the plurality of Fresnel prisms 12, then applying signal light to the plurality of Fresnel prisms 12, and drying the glue added to the effective surface portion of each of the plurality of Fresnel prisms, which contributes to the optical path, for example.

After that, the light absorption layer 13 is fixed to only the ineffective surface portion of each of the plurality of Fresnel prisms, to which the not-drying glue is added, by applying a light absorption layer 13 to the ineffective surface portion.

There is provided another method of adding a light absorption layer 13 to the ineffective surface portion and reflective surface of each of the plurality of Fresnel prisms, the other method including the steps of, for example, forming the light-shielding layers by immersing the edge portions of the plurality of Fresnel prism in an optical absorption material, then filling the valley portions of the Fresnel prisms 12 with the optical absorption material using capillary action, drying and hardening it, because what is necessary is just to add the light absorption layer 13 to the valley portions of the Fresnel prisms 12.

No light absorption layer needs to be added to only the refractive surface 12a which is a light incidence surface portion of each of the plurality of Fresnel prisms 12. Therefore, after applying a light absorption layer 13 to the whole of the inclined surfaces of the plurality of Fresnel prisms 12, the light absorption layer 13 added to the inclined surfaces can be partially scrubbed away with a knife-like jig so that the light absorption layer 13 is partially wiped off.

Figure 24:
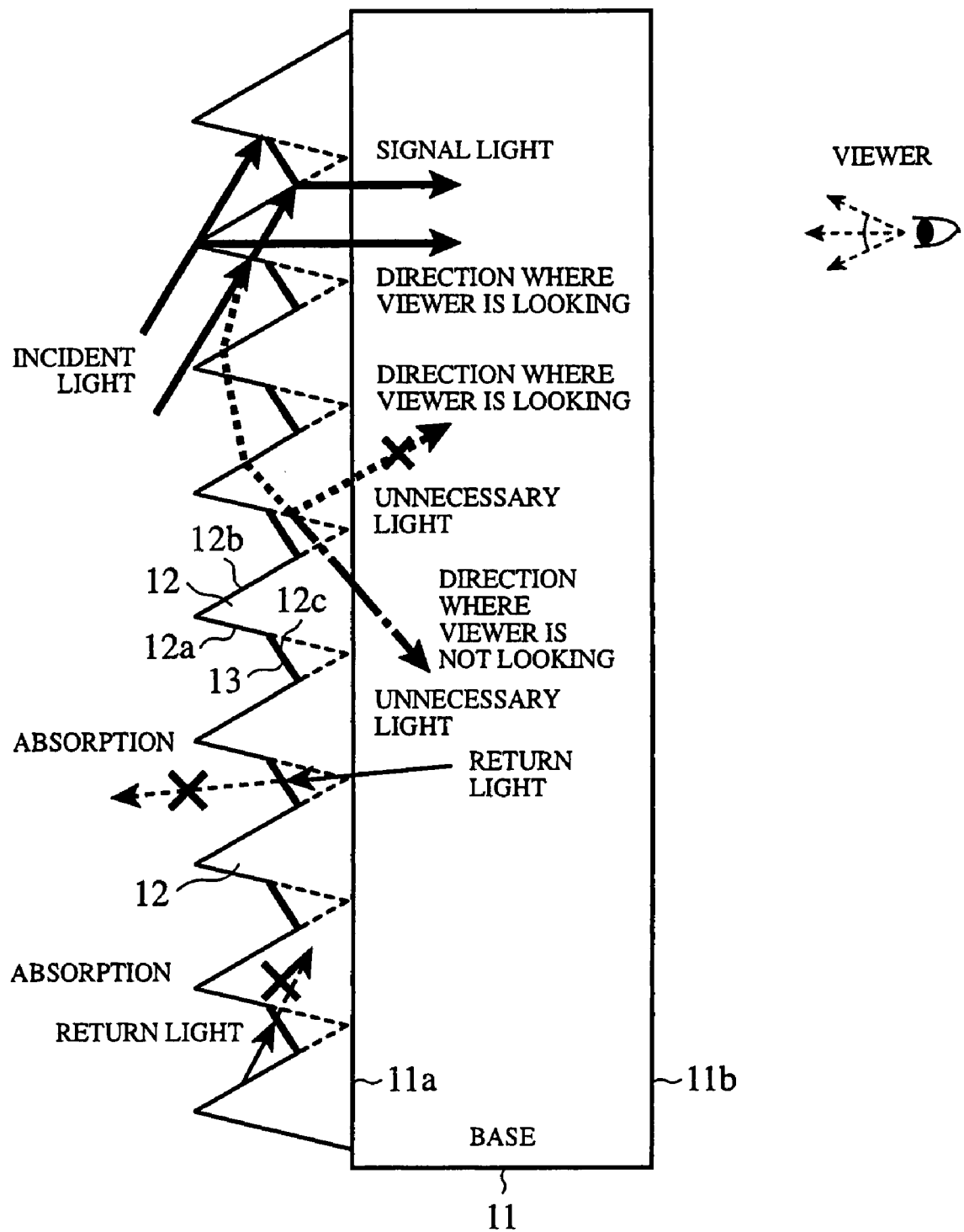
FIG. 24 is a block diagram showing another example of the Fresnel optical element in accordance with embodiment 11 of the present invention.

The effect of suppressing ghost images can be improved when the technology in accordance with this embodiment 11 of adding a light absorption layer 13 to the ineffective surface portion and reflective surface of each of the plurality of Fresnel prisms is applied to either of above-mentioned embodiments 1 to 10. FIG. 24 shows a case where the technology in accordance with this embodiment 11 is applied to above-mentioned embodiment 1 (refer to FIG. 3).

In the example of FIG. 24, by adding a light absorption layer 13 to the non-light incidence surface 12c of each of the plurality of Fresnel prisms, return light reflected by the light emergence surface 11b of base 11, return light reflected by the reflective surface 12b, etc. can be absorbed by the light absorption layer 13 added to the non-light incidence surface 12c, and the effect of suppressing ghost images can be therefore improved.

Figure 25:
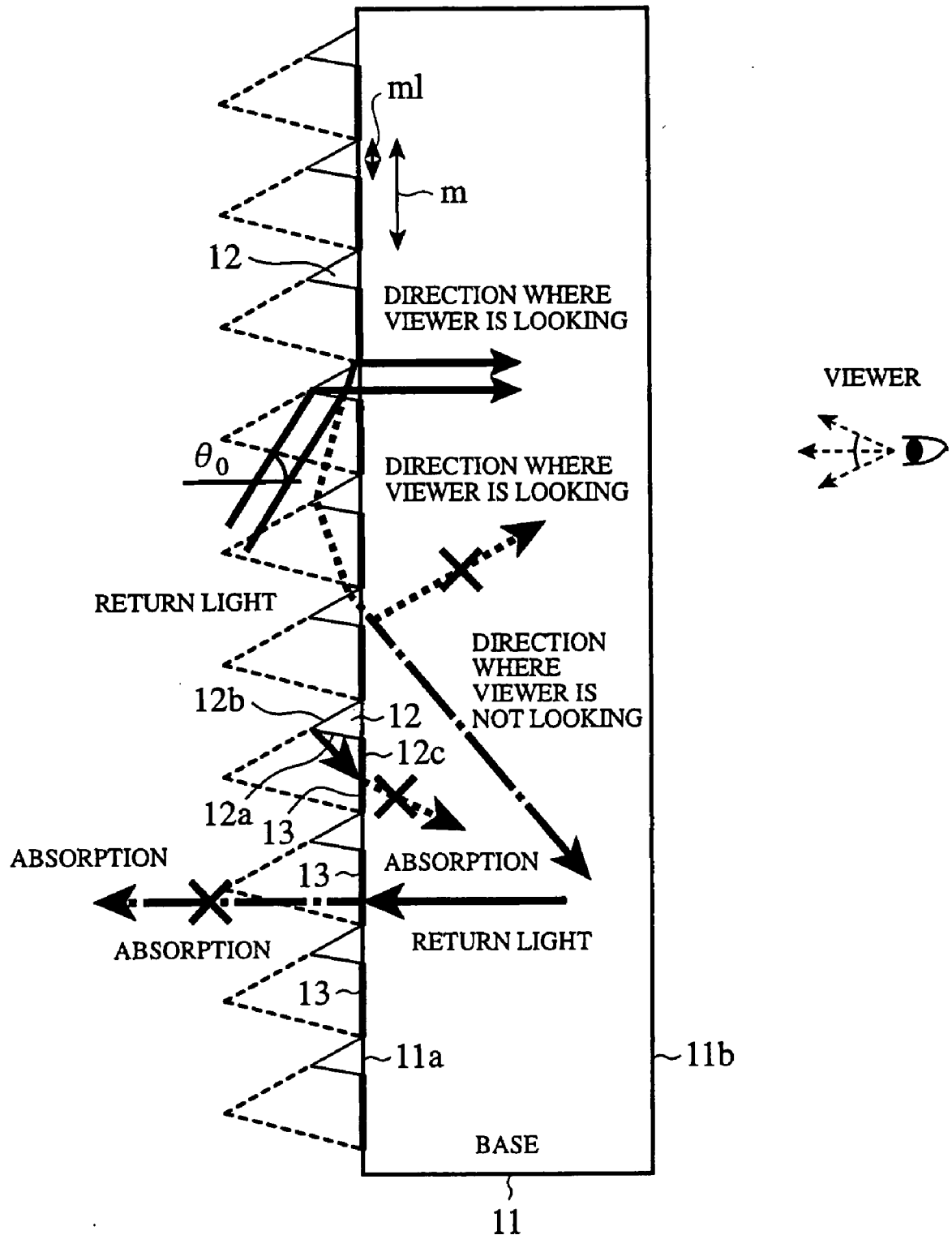
FIG. 25 is a block diagram showing another example of the Fresnel optical element in accordance with embodiment 11 of the present invention.

FIG. 25 shows a case where this embodiment 11 is applied to either of above-mentioned embodiments 2 and 3 (refer to FIGS. 7 and 8).

In the example of FIG. 25, by adding a light absorption layer 13 to the base surface 11a and the non-light incidence surface 12c of each of the plurality of Fresnel prisms which is parallel to the base surface, return light reflected by the light emergence surface 11b of the base 11, a light ray reflected by the refractive surface 12a, etc. can be absorbed by the light absorption layer 13 added to the non-light incidence surface 12c, and the effect of suppressing ghost images can be therefore improved.

Embodiment 12

Figure 26:
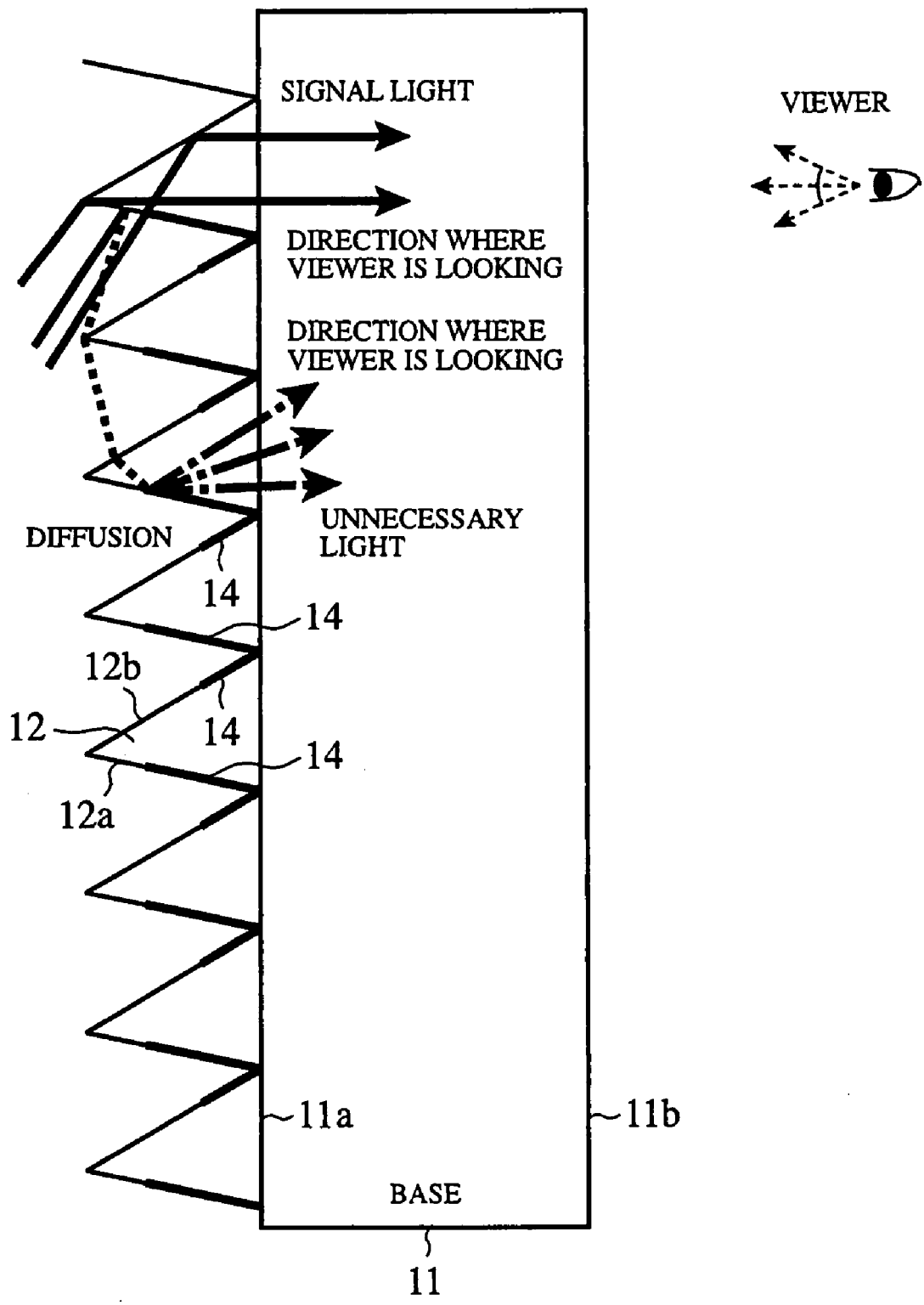
FIG. 26 is a block diagram showing a Fresnel optical element in accordance with embodiment 12 of the present invention.

In accordance with above-mentioned embodiment 11, the light absorption layer 13 which absorbs rays of light is added to the ineffective surface portion of each of the plurality of Fresnel prisms, which does not contribute to the optical path of signal light, as previously mentioned. In contrast, in accordance with this embodiment, a light diffusion layer 14 which diffuses rays of light incident thereupon is added to the ineffective surface portion (e.g., a surface portion VP of FIG. 4, a non-light incidence surface 12c, etc.) of each of the plurality of Fresnel prisms, which does not contribute to the optical path of signal light, as shown in FIG. 26. For example, the light diffusion layer 14 is added to the ineffective surface portion by performing surface roughening by using a known sandblast method or the like.

When a light diffusion layer 14, instead of a light absorption layer 13, is added to the ineffective surface portion which does not contribute to the optical path, since unnecessary light is diffused by the light diffusion layer 14, the intensity of the unnecessary light per unit direction can be reduced (i.e., the light intensity in the direction where the viewer is looking is reduced), and the effect of suppressing ghost images can be therefore improved.

The technology of adding a light absorption layer 13 which absorbs rays of light incident thereupon to the ineffective surface portion which does not contribute to the optical path of signal light can be applied to either of above-mentioned embodiments 1 to 11.

Embodiment 13

Figure 27:
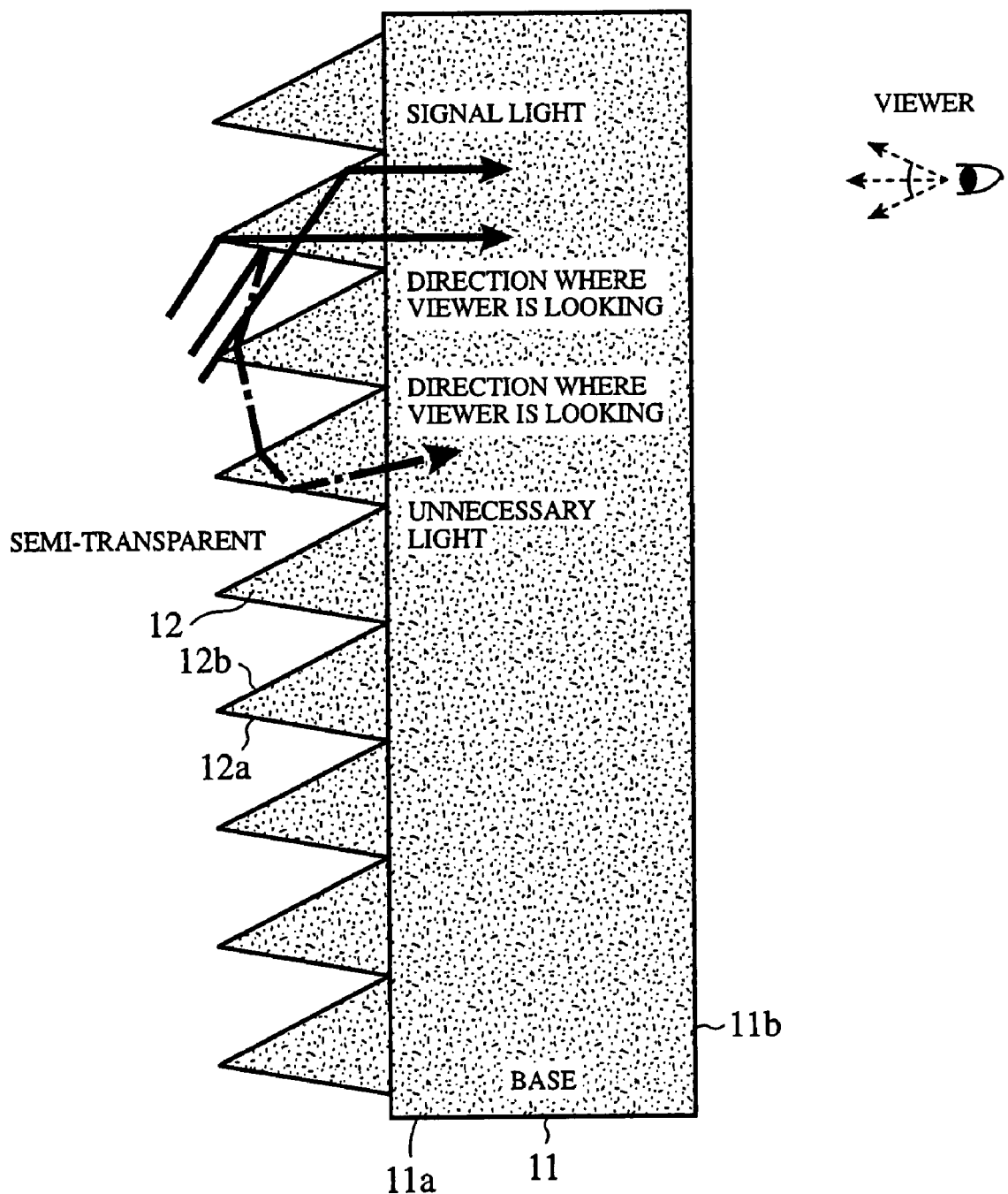
FIG. 27 is a block diagram showing a Fresnel optical element in accordance with embodiment 13 of the present invention.

In accordance with above-mentioned embodiment 11, the light absorption layer 13 which absorbs rays of light is added to the ineffective surface portion of each of the plurality of Fresnel prisms, which does not contribute to the optical path of signal light, as previously mentioned. In contrast, in accordance with this embodiment, an optical absorption substance which absorbs rays of light incident thereupon is added to a medium of which the plurality of Fresnel prisms 12 are made, as shown in FIG. 27. For example, the plurality of Fresnel prisms 12 are made of a semi-transparent material, such as plastic.

As shown in FIG. 10, there is a difference in the length of an optical path in a medium through which rays of light are passed between signal light and unnecessary light, and they have a feature that the optical path of the unnecessary light is long as compared with that of the signal light.

Therefore, since the intensity of the unnecessary light decreases more than the intensity of the signal light when an optical absorption substance which absorbs rays of light incident thereupon is added to the medium of which the plurality of Fresnel prisms 12 are made, it becomes possible to raise the contrast ratio.

The technology of adding an optical absorption substance to the medium of which the plurality of Fresnel prisms 12 are made can be applied to either of above-mentioned embodiments 1 to 12.

Embodiment 14

Figure 28:
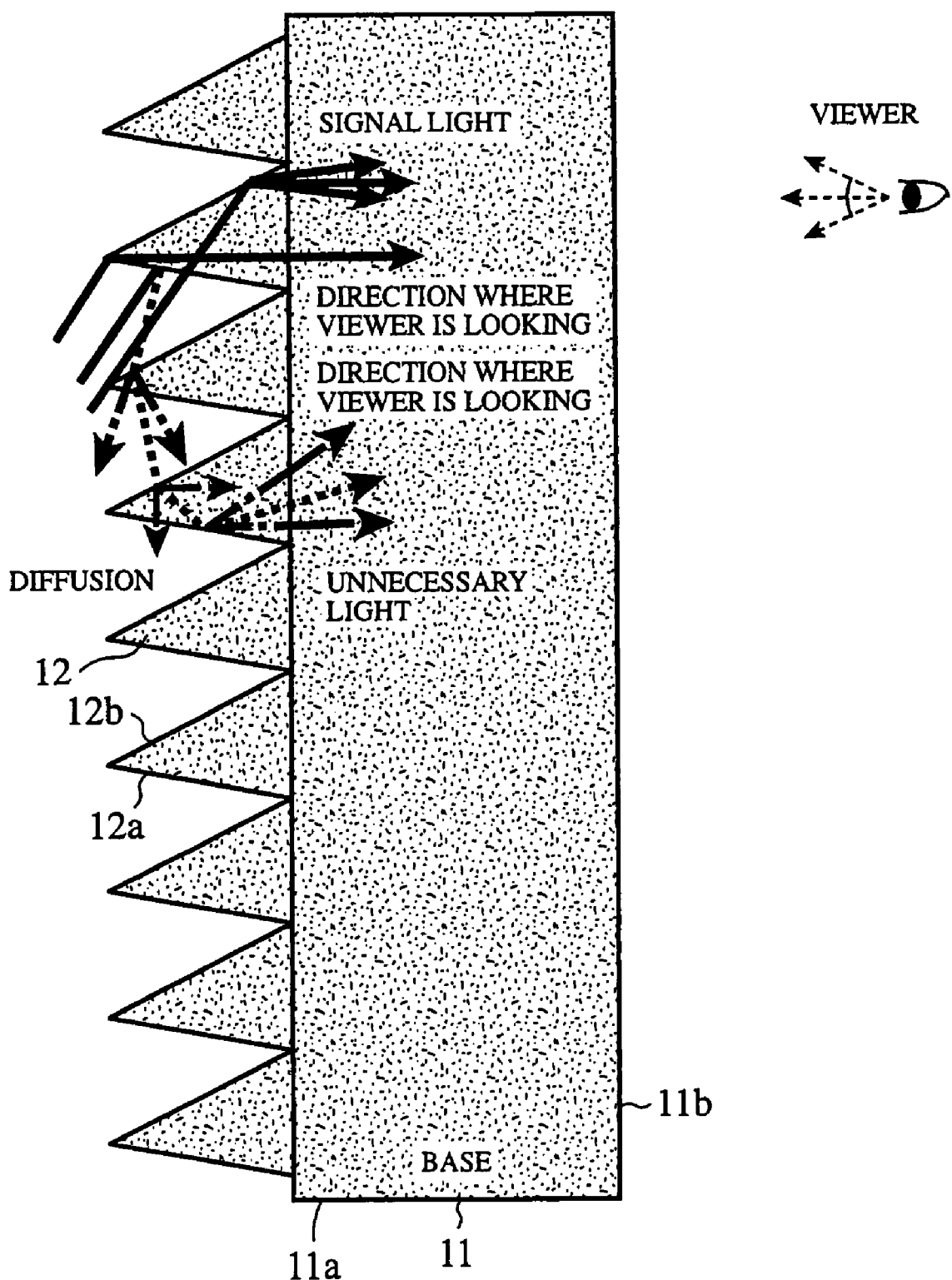
FIG. 28 is a block diagram showing a Fresnel optical element in accordance with embodiment 14 of the present invention.

In accordance with above-mentioned embodiment 12, a light diffusion layer 14 which diffuses rays of light incident thereupon is added to the ineffective surface portion of each of the plurality of Fresnel prisms which does not contribute to the optical path of incident signal light, as previously mentioned. In contrast, in accordance with this embodiment, an optical diffuser which diffuses rays of light incident thereupon is added to a medium of which the plurality of Fresnel prisms 12 are made, as shown in FIG. 28. Polyester resin particles, such as polyethylene terephthalate (PET), styrene or acrylics bridge formation particles, or silicon resin particles can be used as the diffusion material, for example.

As shown in FIG. 10, there is a difference in the length of an optical path in a medium through which rays of light are passed between signal light and unnecessary light, and they have a feature that the optical path of the unnecessary light is long as compared with that of the signal light.

Therefore, since the unnecessary light diffuses more than the signal light when the optical diffuser which diffuses rays of light incident thereupon is added to the medium of which the plurality of Fresnel prisms 12 are made, it becomes possible to raise the contrast ratio.

The technology of adding an optical diffuser to the medium of which the plurality of Fresnel prisms 12 are made can be applied to either of above-mentioned embodiments 1 to 12.

Embodiment 15

In accordance with above-mentioned embodiment 11, a light absorption layer 13 which absorbs rays of light is added to the ineffective surface portion of each of the plurality of Fresnel prisms, which does not contribute to the optical path of incident signal light, as previously mentioned. In accordance with this embodiment, an AR (Anti-Reflection) coating treatment can be provided to at least one of the refractive surface 12a of each of the plurality of Fresnel prisms and the light emergence surface 11b.

In other words, since incident rays of light satisfy the Fresnel law of reflection at both the light incidence surface and light emergence surface of the Fresnel optical element, there are some rays of light which cannot pass through each of the two surfaces, as mentioned above. Since these reflected rays of light result in a ghost image, raising the transmissivity of the signal light at any boundary improves the efficiency of the signal light and therefore reduces ghost images.

To this end, in accordance with this embodiment 15, a single-layer or multilayer AR coating treatment is provided to the refractive surface 12a of each of the plurality of Fresnel prisms, the light emergence surface 11b, or both of them. As a result, the phases of rays of light incident upon the refractive surface 12a of each of the plurality of Fresnel prisms, the light emergence surface 11b, or both of them are controlled so that the amount of rays reflected by the refractive surface 12a of each of the plurality of Fresnel prisms, the light emergence surface 11b, or both of them is reduced and therefore the amount of rays of light passing through the refractive surface 12a of each of the plurality of Fresnel prisms, the light emergence surface 11b, or both of them increases. Thus, the amount of unnecessary light resulting in ghost images can be reduced.

The AR coating treatment is carried out by using an overnight immersion method of immersing the screen in a tank which is filled with a coating solution, and controlling the thickness of the formed AR coating film by controlling the speed of raising the screen, or a method of performing vacuum evaporation in a vacuum chamber.

The technology in accordance with this embodiment 15 of performing AR coating treatment can be applied to either of above-mentioned embodiments 1 to 14.

Embodiment 16

As already mentioned above, the position from which a ghost image emerges is proportional to the optical thickness of the optical path which it travels.

In the optical path including only the screen base, the position from which a ghost image emerges is proportional to the thickness of the screen base, whereas in the optical path including a route passing through the reflecting flat mirror 4 located in the back of the screen base, the position from which a ghost image emerges is proportional to the distance between the screen and the reflecting flat mirror 4.

In at least the former case, if the base 11 is thinned to a minimum (d->0), since the amount of displacement of the position from which a ghost image emerges is proportional to 2d·tan θ, the amount of displacement approaches 0.

In fact, if the base 11 is thinned to one half of a light valve (i.e., a pixel) expanded on the screen, or less, since a ghost image is displayed on the screen while it is superimposed upon pixels, any ghost image is not recognized by the viewer, but can be reused as a signal.

The technology in accordance with this embodiment 16 of reducing the thickness of the base 11 to one half of a pixel can be applied to either of above-mentioned embodiments 1 to 15.

Embodiment 17

In accordance with either of above-mentioned embodiments, a measure for reducing unnecessary light is described.

To be more specific, reduction of unnecessary light is carried out by installing any one of measures (a), (b), (c), or (d) which will be mentioned below. It is understood that the measure (a) serves as a basis on which to reduce unnecessary light and is combined with either of the other measures (b), (c), and (d) or all of them.

Figure 29:
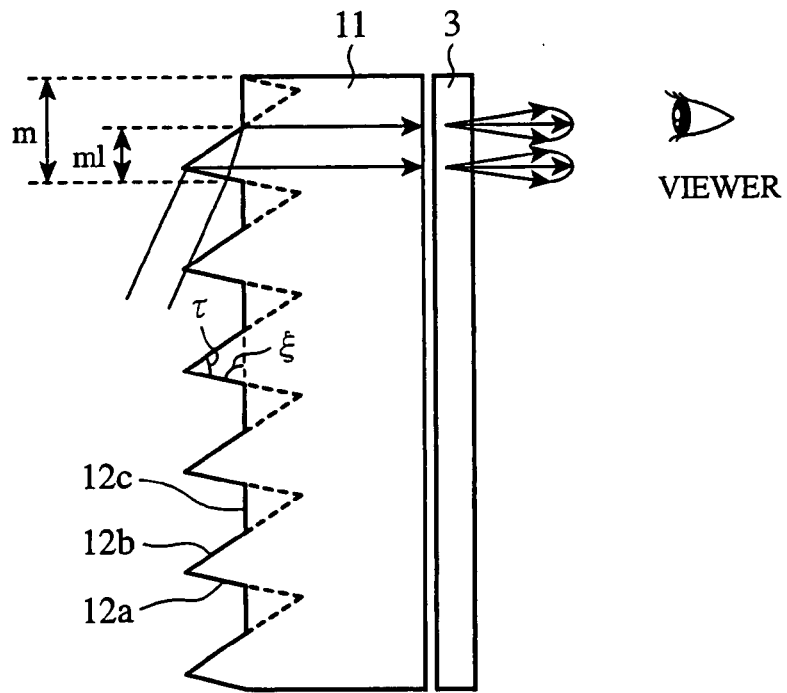
FIG. 29 is an explanatory diagram showing an example in which a plurality of total reflection prisms are similarly reduced so that the non-light incidence surface of each of the plurality of total reflection prisms is parallel with a screen surface.

(a) Each of the plurality of total reflection prisms is similarly reduced, and the non-light incidence surface 12c of each of the plurality of total reflection prisms is made parallel with the screen surface (refer to FIG. 29).

(b) The non-light incidence surface 12c is formed into a roughened one. As an alternative, an optical diffusing function is added to the non-light incidence surface 12c.

(c) The prism apex angle τ of each of the plurality of total reflection prisms is varied from location to location on the screen surface.

(d) A part of the prism leading end of each of the plurality of total reflection prisms is chipped.

The measure (a) which is a basis of the possible combinations will be explained first.

Figure 30:
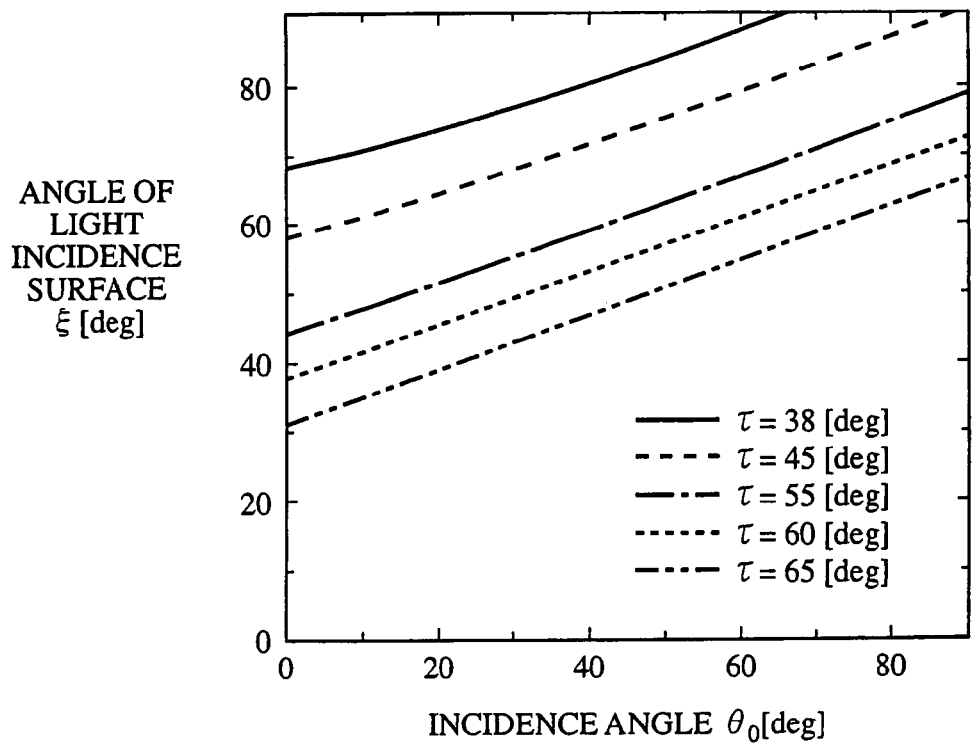
FIG. 30 is an explanatory diagram showing a relationship between the incidence angle $\theta_0$ of a light ray incident upon each of the plurality of total reflection prisms, and the angle $\xi$ of the light incidence surface of each of the plurality of total reflection prisms.

FIG. 30 is an explanatory diagram showing a relationship between the incidence angle $\theta_0$ of a light ray incident upon a total reflection prism, and the angle ξ of the light incidence surface of the total reflection prism (i.e., the angle ξ of the refractive surface 12b of each of the plurality of Fresnel prisms 12).

In other words, FIG. 30 shows examples of computation in a case where the emergence angle is $\theta_{refl}=0$ (i.e., the direction of the normal to the screen), the refractive index of the air is $n_0=1.0$, and the refractive index of the medium of which the total reflection prism is made is $n_1=1.55$, where the horizontal axis shows the incidence angle $\theta_0$, and the vertical axis shows the angle ξ ($=\pi-\tau-\alpha$) of the light incidence surface.

It is apparent from equation (2) that the degree of freedom of each of the plurality of total reflection Fresnel prisms is only the prism apex angle τ, and FIG. 30 shows examples of the prism apex angle τ ranging from 38 to 65 degrees.

It is seen from FIG. 30 that the angle t of the light incidence surface and the incidence angle $\theta_0$ have proportionality with each other regardless of the prism apex angle τ. That is, it is seen from the figure that on the condition that the prism apex angle τ is kept constant, the angle ξ of the light incidence surface of each of the plurality of prisms increases as it is distant from the vicinity of the center of the screen having a small incidence angle $\theta_0$ (in the example of FIG. 2, the central lower portion of the Fresnel optical element 2) toward a far side having a large incidence angle $\theta_0$ (in the example of FIG. 2, each of the four corners of the Fresnel optical element 2).

For reasons for performing the process of manufacturing the plurality of Fresnel prisms 12, if each of the plurality of Fresnel prisms 12 is formed so as to be bent backward, it is impossible to pour light-curing resin represented by ultraviolet-curing resin into the above-mentioned metallic mold and pull out the resin hardened by ultraviolet irradiation etc.

In a case where each of the plurality of prisms is a total reflection Fresnel prism, for example, when the angle t of the light incidence surface becomes larger than $\pi/2$, it becomes difficult to release the light-curing resin poured into the metallic mold from the metallic mold.

Generally, in the case of a total reflection prism, since the angle of the light incidence surface $\xi$ is proportional to the incidence angle $\theta_0$ (refer to FIG. 30), the critical angle of prism apex $\tau_{max}$ can be decided based on the maximum of the incidence angle $\theta_0$.

The following equation (3) shows this condition. Actually, in order to release each of the plurality of prisms from the metallic mold, the following equation (3) needs to be satisfied:

$$\tau_{max}(\theta_0, \theta_{refl}) \geq [\sin^{-1}((n_0/n_1)\sin_{refl}) + \cos^{-1}(n_0/n_1)\cos\theta_0)]/2 \quad (3)$$

Figure 31:
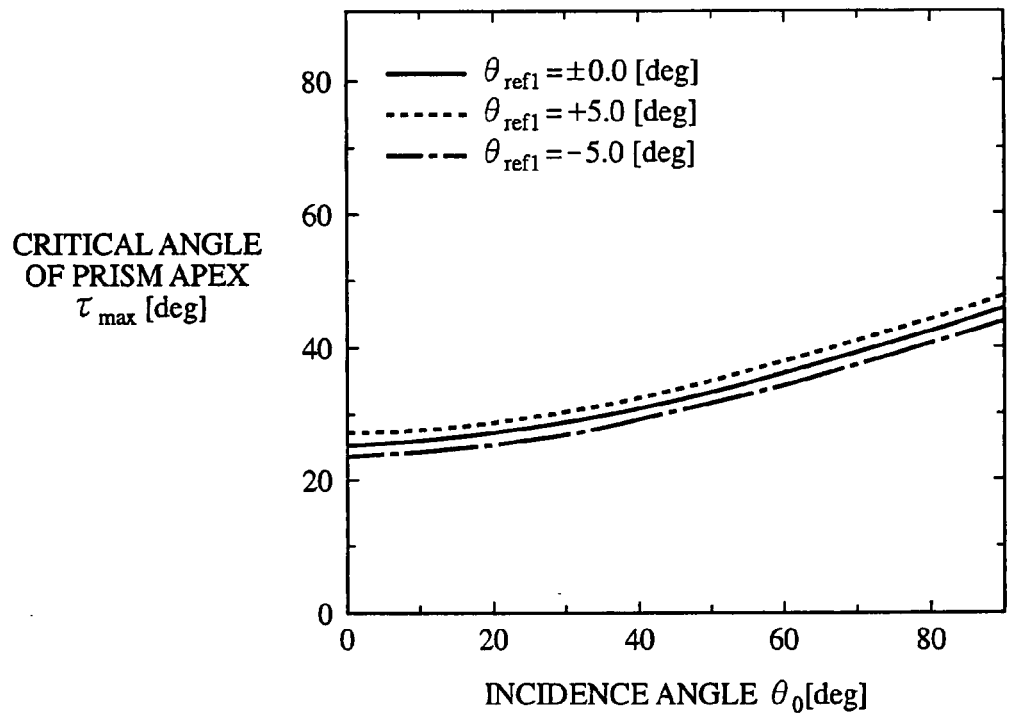
FIG. 31 is an explanatory diagram showing a relationship between the incidence angle $\theta_0$ of the light ray incident upon each of the plurality of total reflection prisms, and a critical angle of prism apex $\tau_{max}$.

FIG. 31 is an explanatory diagram showing a relationship between the incidence angle $\theta_0$ of a light ray incident upon a total reflection prism, and the critical angle of prism apex $\tau_{max}$ of the total reflection prism.

In other words, FIG. 31 shows examples of computation in a case where the emergence angle is $\theta_{refl}=0$ (i.e., the direction of the normal to the screen)$\pm 5$ degrees, the refractive index of the air is $n_0=1.0$, and the refractive index of the medium of which the total reflection prism is made is $n_1=1.55$, where the horizontal axis shows the incidence angle $\theta_0$, and the vertical axis shows the critical angle of prism apex $\tau_{max}$. For example, when the incidence angle $\theta_0$ has a maximum of 60 degrees, the critical angle of prism apex is $T_{max}=35.6$ degrees at the emergence angle $\theta_{refl}=0$ degrees. Similarly, when the incidence angle $\theta_0$ has a maximum of 70 degrees, the critical angle of prism apex is $T_{max}=38.6$ degrees at the emergence angle $\theta_{refl}=0$ degrees.

Figure 32:
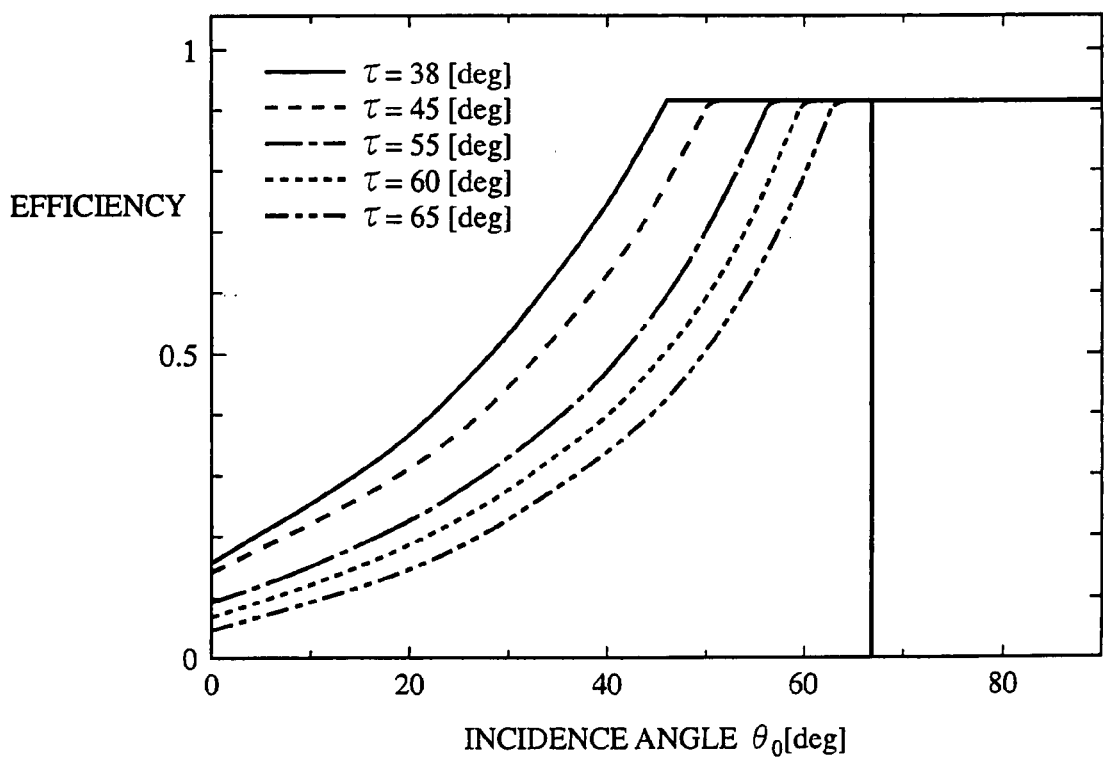
FIG. 32 is an explanatory diagram showing a relationship between the incidence angle $\theta_0$ of the light ray incident upon each of the plurality of total reflection prisms, and the efficiency of each of the plurality of total reflection prisms.

FIG. 32 is an explanatory diagram showing a relationship between the incidence angle $\theta_0$ of a light ray incident upon a total reflection prism, and the efficiency of the total reflection prism.

In other words, FIG. 32 shows examples of computation in a case where the emergence angle is $\theta_{refl}=0$ (i.e., the direction of the normal to the screen), the refractive index of the air is $n_0=1.0$, and the refractive index of the medium of which the total reflection prisms is made is $n_1=1.55$, where the horizontal axis shows the incidence angle $\theta_0$, and the vertical axis shows the ideal efficiency of the total reflection Fresnel prism (i.e., the ratio of the energy of light which emerges in the direction of the normal to the screen to that of the incident light).

In this case, it is apparent from equation (2) that the degree of freedom of the total reflection Fresnel prism is only the prism apex angle $\tau$, and FIG. 32 shows examples in the case of the prism apex angle $\tau=38$ to 65 degrees.

It is clear from this figure that Fresnel prisms 12 arranged at positions where the incidence angle $\theta_0$ is small have an efficiency that increases with decrease in their prism apex angles $\tau$.

In a case where the prism apex angle is $\tau=38$ degrees, equation (3) representing the condition on which the prism can be released from the metallic mold is not satisfied when the incidence angle $\theta_0$ is equal to or larger than 68 degrees.

In other words, since the difficulty level of the manufacturing process is high and it is therefore hard to manufacture the prism actually, the efficiency is intentionally expressed as 0 in this case.

That is, it is apparent that Fresnel prisms 12 arranged at positions where the incidence angle $\theta_0$ is large have an efficiency that increases with increase in their prism apex angles $\tau$, unlike Fresnel prisms 12 arranged at positions where the incidence angle $\theta_0$ is small.

As can be seen from the above description, a total reflection Fresnel prism has a degree of freedom which is its prism apex angle $\tau$ as long as it satisfies the efficiency (FIG. 32) of the total reflection Fresnel prism and equation (3) which represents the condition on which the prism can be released from the metallic mold. The apex angle $\tau$ of the prism can be arbitrarily selected according to the incidence angle $\theta_0$ to be used so as to fall within the range of 38 to 65 degrees. When the available incidence angle range is 45 degrees$<\theta_0<60$ degrees, the prism apex angle $\tau=38$ degrees is selected. When the available incidence angle range is 60 degrees$<\theta_0<80$ degrees, any value ranging from 42 to 65 degrees can be selected as the prism apex angle $\tau$.

Usually, in most cases, the plurality of prisms are processed with their prism apex angles $\tau$ being kept constant. As an alternative, the prism apex angle $\tau$ of each of the plurality of prisms can be varied for an arbitrary incidence angle $\theta_0$ so t as to fall within the above-mentioned range.

For example, the prism apex angle $\tau$ of each of the plurality of prisms can be varied according to whether it is located in an upper or lower portion of the screen. Alternatively, the prism apex angles $\tau$ of some prisms located in a middle portion of the screen can be changed.

There is a tendency that only the leading end portion of a total reflection prism is used when the incidence angle $\theta_0$ of the total reflection prism increases. Then, assume that only an available portion of each of the plurality of total reflection prisms is formed.

Figure 33:
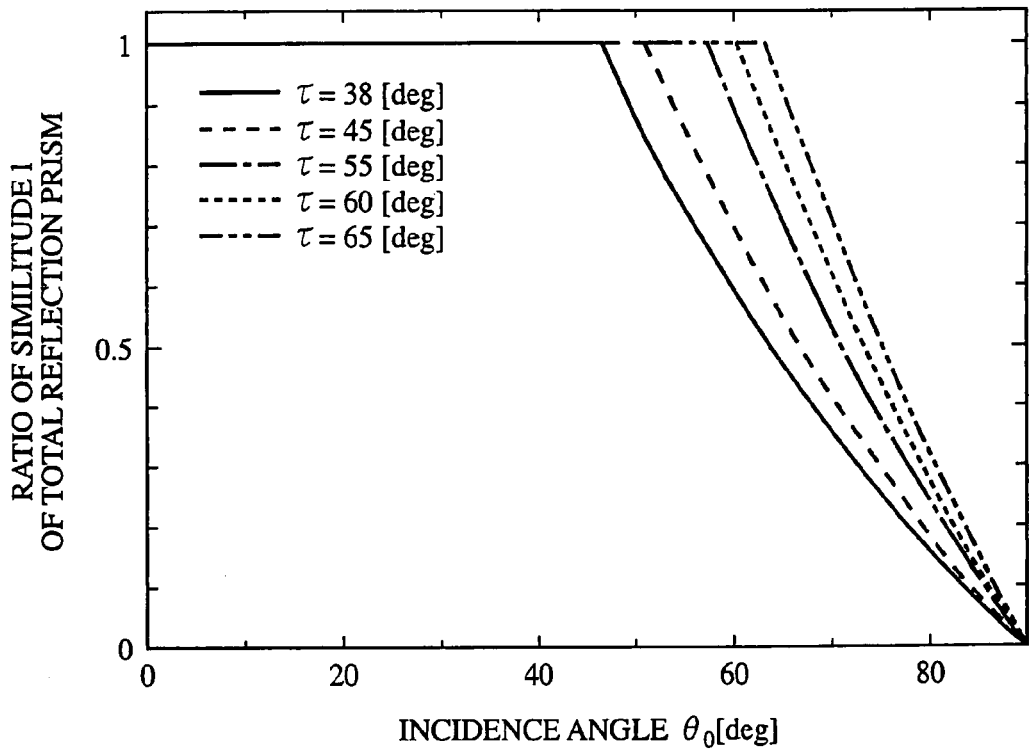
FIG. 33 is an explanatory diagram showing a relationship between the incidence angle $\theta_0$ of the light ray incident upon each of the plurality of total reflection prisms, and a ratio of similitude l of each of the plurality of total reflection prisms.

FIG. 33 is an explanatory diagram showing a relationship between the incidence angle $\theta_0$ of a light ray incident upon a total reflection prism and the ratio of similitude l of the total reflection prism.

In other words, FIG. 33 shows examples of computation in a case where the emergence angle is $\theta_{refl}=0$ (i.e., the direction of the normal to the screen), the refractive index of the air is $n_0=1.0$, and the refractive index of the medium of which the total reflection prism is made is $n_1=1.55$, where the horizontal axis shows the incidence angle $\theta_0$, and the vertical axis shows the ratio of similitude l of the total reflection prism. The meaning of the ratio of similitude l is defined as follows. When the entire prism is formed (i.e., when each of the plurality of prisms is not reduced similarly), l=1.0, whereas when each of the plurality of prisms is similarly reduced to the half, l=0.5. FIG. 33 shows examples in a case where the prism apex angle is $\tau=38$ to 65 degrees.

As can be seen from FIG. 33, the ratio of similitude of the total reflection prism is set to l=0.4 when the prism apex angle is T=45 degrees and the incidence angle is $\theta_0=70$ degrees.

The ratio of similitude l of a total reflection prism located at a position where the incidence angle $\theta_0$ is small is large, whereas the ratio of similitude l of a total reflection prism located at a position where the incidence angle $\theta o$ is large is small.

That is, it is seen from the figure that on the condition that the prism apex angle $\tau$ is kept constant, the ratio of similitude l of each of the plurality of total reflection prisms of the Fresnel optical element decreases as it is distant from the vicinity of the center of the screen having a small incidence angle $\theta_0$ (in the example of FIG. 2, the central lower portion of the Fresnel optical element 2) toward a far side having a large incidence angle $\theta_0$ (in the example of FIG. 2, each of the four corners of the Fresnel optical element 2).

Actually, since each of the plurality of total reflection prisms is not formed to design specifications for reasons for the process of manufacturing the total reflection prism, manufacturing tolerances need to be provided.

Then, assume that each of the plurality total reflection prism is formed more largely so as to include a margin for manufacturing tolerances in addition to the available portion thereof.

Figure 34:
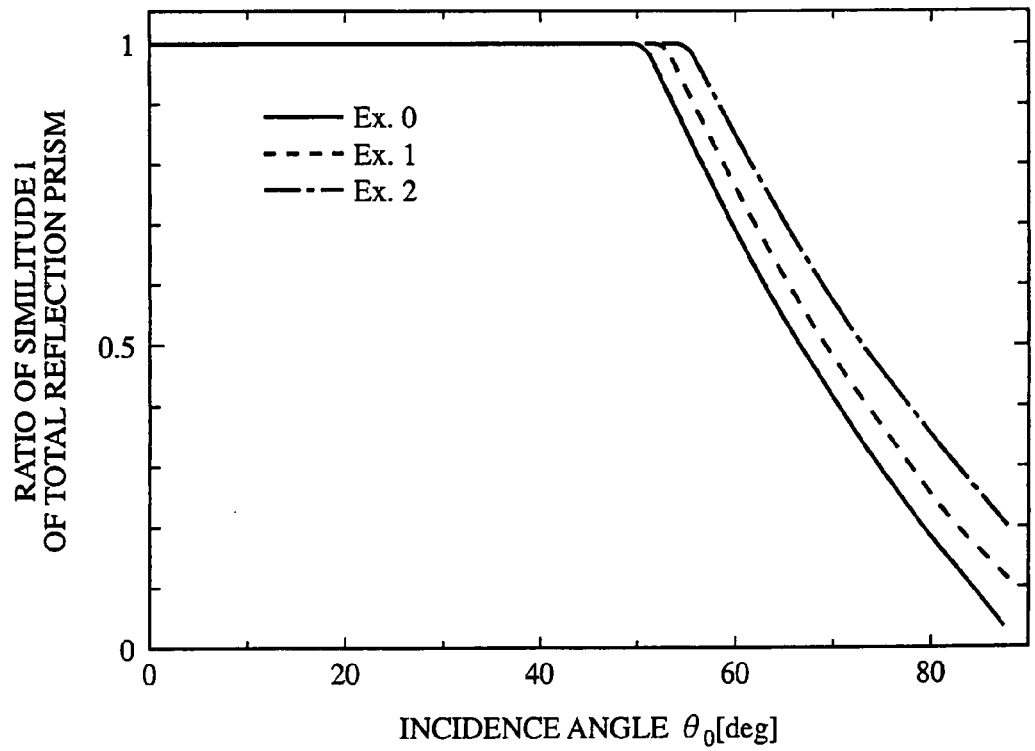
FIG. 34 is an explanatory diagram showing a relationship between the incidence angle $\theta_0$ of the light ray incident upon each of the plurality of total reflection prisms, and the ratio of similitude l of each of the plurality of total reflection prisms.

FIG. 34 is an explanatory diagram showing a relationship between the incidence angle $\theta_0$ of a light ray incident upon a total reflection prism and the ratio of similarity reduction l of the total reflection prism.

In other words, FIG. 34 shows examples of computation in a case where the emergence angle is $\theta$refl=0 (i.e., the direction of the normal to the screen), the refractive index of the air is $n_0$=1.0, the refractive index of the medium of which the total reflection prism is made is $n_1$=1.55, and the prism apex angle is $\tau$=45 degrees, where the horizontal axis shows the incidence angle $\theta_0$, and the vertical axis shows the ratio of similitude l of the total reflection prism.

In this figure, Ex.0 shows an example having no margin, Ex.1 shows an example having a small margin, and Ex.2 shows an example having a large margin.

Actually, prototypes of the above-mentioned plurality of total reflection Fresnel prisms have been formed with the incidence angle $\theta_0$ being set to about 75 degrees. Concretely, two types of the plurality of total reflection Fresnel prisms have been formed with their periods (i.e., the pitches m) of the prisms being set to 112 μm and 156 μm, respectively.

Since the actual height of each of the prisms is proportional to the pitch of the prisms, the two prototypes of the plurality of total reflection Fresnel prisms are distinguished with a value normalized by the pitch (i.e., the ratio of similitude l of total reflection prisms). Now, we have formed some prototypes of the plurality of total reflection Fresnel prisms so that each formed set of prisms has ratios of similitude l which fall within the range of 1.0 to 0.2.

Since the incidence angle $\theta_0$ of each of the plurality of total reflection prisms varies from location to location on the screen, the angle and ratio of similitude of each of the plurality of total reflection prisms varies from location to location on the screen.

Measurements have been carried out with visual observations and a luminance meter by using a projection optical system, the plurality of total reflection Fresnel prisms, and a lenticular lens screen. FIG. 35 shows the results of the measurements.

Observations of a known plurality of total reflection Fresnel prisms on each of which is not reduced similarly (i.e., l=1.0) in the direction of the normal to the screen have seen that, when displaying a white window on a black background, unnecessary light (corresponds to the unnecessary light OUT2 of FIG. 10) appears at a location which is distant by about twice the thickness of the screen from the original image.

In the case where no margin is provided (Ex.0), since the available portion of each of the plurality of total reflection prisms is not formed sufficiently, each of the plurality of total reflection Fresnel prisms functions inadequately, and this results in monochrome stripes which appear over the whole of an all-while screen when viewed from the direction of the normal to the screen.

Furthermore, the observations in the direction of the normal to the screen have seen that, when displaying a white window on a black background, unnecessary light which is a part of incident light which passes through the plurality of Fresnel prisms just as it is and travels upward is observed and appears (this unnecessary light causes a problem different from that caused by the unnecessary light OUT2 of FIG. 10).

In the case of both a small margin (Ex. 1) and a large margin (Ex. 2), the above-mentioned glitch cannot be observed and good results have been obtained in both of the cases.

Since the relational expression of the ratio of similitude l of each of the total reflection prisms is normalized with the period m of the total reflection Fresnel prisms, it is not dependent upon the period (i.e., the pitch m) of the total reflection prisms.

Actually, for either of the two types of total reflection Fresnel prisms which have been formed with their periods (i.e., the pitch m) of the prisms being set to 112 μm and 156 μm, respectively, good results have been obtained.

Although no mention was made in particular, it is understood that images can be displayed in a high resolution when the pitch m of the plurality of Fresnel prisms is made finer than the pixels of the screen.

In particular, measurements have been carried out paying attention to the unnecessary light OUT2 of FIG. 10 (corresponds to display of a white image on a black background of FIG. 35). FIGS. 36 and 37 show observation results in the case of the incidence angle $\theta_0$=75 degrees.

FIG. 36 shows an observation result when viewed from the direction of the normal to the screen, and FIG. 37 shows an observation result when viewed from a slanting downward direction which is inclined at an angle of about 60 degrees with the screen.

In a conventional plurality of total reflection Fresnel prisms, unnecessary light (corresponds to OUT2 of FIG. 10) having a contrast ratio of about 155:1 appears at a location which is distant by about twice the total thickness of the Fresnel optical element 2 and the base 11 (i.e., the distance A in FIG. 10) from the original image. In contrast, when the plurality of total reflection prisms are similarly reduced (in the case of Ex.0 to Ex.2), the optical path of unnecessary light changes to OUT4 of FIG. 11, and it becomes impossible for the viewer to recognize the unnecessary light when viewing from the front of the screen (>673:1).

When the optical path thus changes, the viewer can recognize such unnecessary light as long as he or she is viewing the screen from a slanting downward direction. However, in normal times, since the viewer is not viewing the screen from a slanting downward direction which is inclined at an angle of 60 degrees with the front surface of the screen, no problem arises.

The basic measure (a) has been explained above. Then, combinations of the measures (a) to (d) will be explained hereafter.

FIG. 38 shows an example in which the measures (a) and (c) are combined. In this case, each of the plurality of total reflection prisms is similarly reduced while the prism apex angle $\tau$ of each of the plurality of total reflection prisms is varied from location to location on the screen, i.e., according to the incidence angle $\theta_0$ of a light ray incident upon each of the plurality of total reflection prisms.

For example, in a case where the emergence angle is $\theta_{refl}$=0 (i.e., the direction of the normal to the screen), the refractive index of the air is $n_0$=1.0, the refractive index of the medium of which the plurality of total reflection prisms are made is $n_1=1.55$, and the incidence angle is $\theta_0=70$ degrees, unnecessary light OUT2 of FIG. 10 appears when the prism apex angle is $\tau=45$ degrees. When then changing the prism apex angle to $\tau=53$ degrees, the optical path of the unnecessary light OUT2 of FIG. 10 changes as shown by that of unnecessary light OUT6 of FIG. 18.

On the other hand, when the ratio of similitude l of each of the total reflection prisms is reduced (l=about 0.4), the optical path of the unnecessary light OUT2 of FIG. 10 changes as shown by that of unnecessary light OUT4 of FIG. 11.

For example, when the ratio of similitude l cannot be reduced enough to completely remove the unnecessary light for reasons for the process of manufacturing the plurality of total reflection prisms, it becomes possible to reduce the unnecessary light OUT2 which emerges toward the direction of the front of the screen by using such a combination of the measures.

Figure 39:
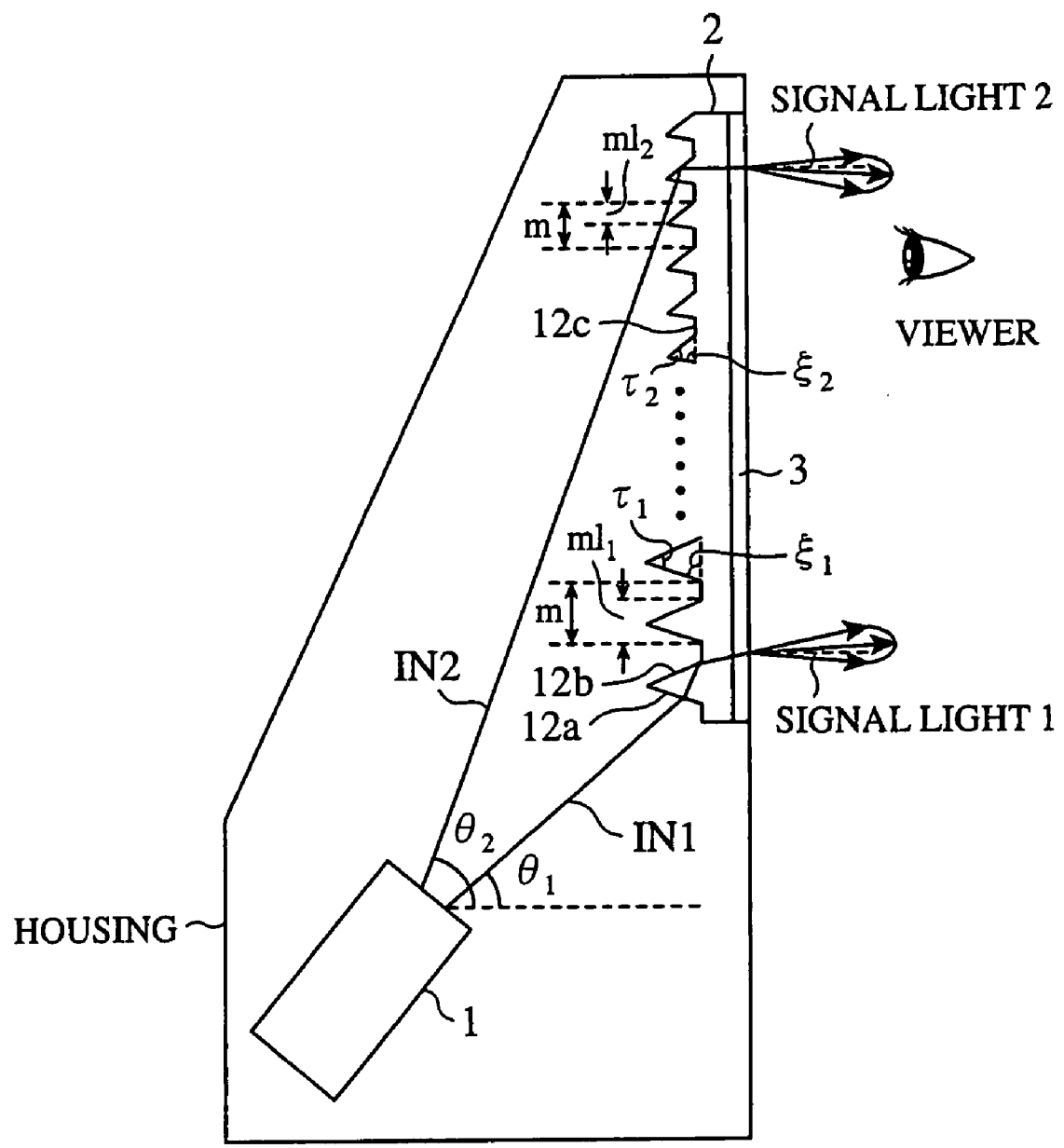
FIG. 39 is an explanatory diagram showing an example in which measures (a) and (c) are combined.

FIG. 39 shows an example in which the measures (a) and (c) are combined. In this case, each of the plurality of total reflection prisms is similarly reduced while the prism apex angle $\tau$ of each of the plurality of total reflection prisms is varied from location to location on the screen, i.e., according to the incidence angle $\theta_0$ of a light ray incident upon each of the plurality of total reflection prisms.

In this case, although the emergence angle is set to $\theta_{refl}=0$ (i.e., the direction of the normal to the screen), the emergence angle can be inclined toward the center of the screen depending on purposes. For example, the emergence angle $\theta_{refl}$ is set so as to satisfy the following inequality: $\theta_{refl}>0$ in the vicinity of the optical axis, $\theta_{refl}$ is set to 0 in the vicinity of the center of the screen, and the emergence angle $\theta_{refl}$ is set so as to satisfy the following inequality: $\theta_{refl}<0$ in a region distant from the optical axis.

In FIG. 39, the emergence angle $\theta_{refl}$ of a light ray incident upon each of the plurality of total reflection prisms is set to an angle indicating a substantially-horizontal downward direction in the upper portion of the screen, whereas the emergence angle $\theta_{refl}$ of a light ray incident upon each of the plurality of total reflection prisms is set to an angle indicating a substantially-horizontal upward direction in the lower portion of the screen.

Figure 40:
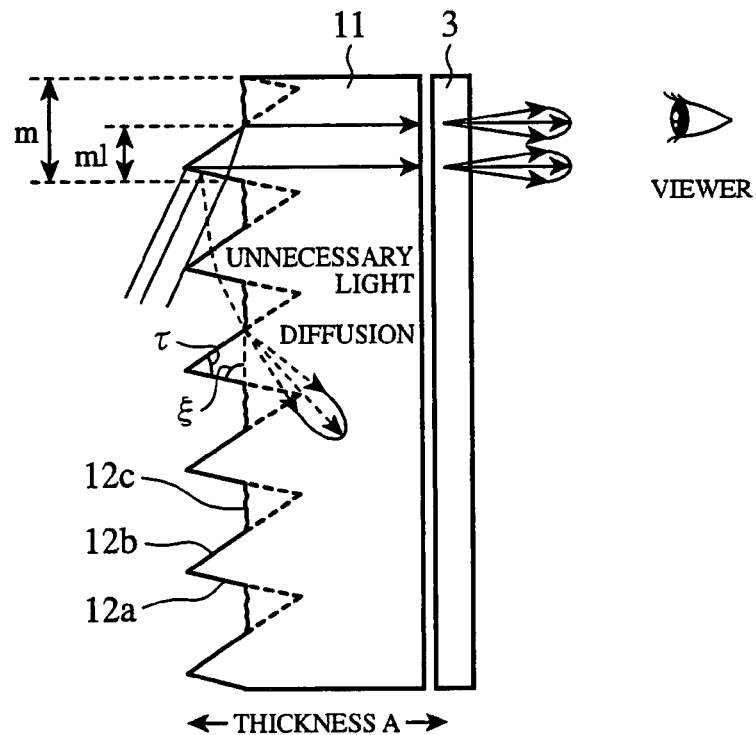
FIG. 40 is an explanatory diagram showing an example in which measures (a) and (b) are combined.

FIG. 40 shows an example in which the measures (a) and (d) are combined and the non-light incidence surface 12c of each of the plurality of total reflection prisms is roughened or the non-light incidence surface 12c is provided with an optical diffusing function.

When each of the plurality of total reflection prisms is similarly reduced, the optical path of the unnecessary light OUT2 of FIG. 10 changes to that oriented in a direction where the viewer is not looking, which is similar to that of the unnecessary light OUT4 of FIG. 11.

Since this unnecessary light OUT4 is diffused and spreads depending upon the total thickness A of the Fresnel optical element 2 and the base 11, it becomes possible to make the unnecessary light harder to be conspicuous.

There has been provided a prototype of the plurality of total reflection prisms in which the emergence angle is $\theta_{refl}=0$ (i.e., the direction of the normal to the screen), the refractive index of the air is $n_0=1.0$, the refractive index of the medium of which the plurality of total reflection prisms are made is $n_1=1.55$, the prism apex angle is $\tau=45$ degrees, the pitch is m=112 μm, and the non-light incidence surface 12c of each of the plurality of total reflection prisms is roughened. This prototype is referred to as Ex.3 from here on, and observation results are shown in FIGS. 36 and 37.

Since the plurality of total reflection prisms are reduced in size and therefore unnecessary light whose optical path changes toward a downward direction appears, the viewer does not recognize the unnecessary light when viewing the screen from the direction of the normal to the screen (refer to FIG. 36), but can recognize the unnecessary light when viewing the screen from a slanting downward direction (refer to FIG. 37).

However, in most case, since the viewer is not viewing the screen from a slanting downward direction which is inclined at an angle of 60 degrees with the front surface of the screen, no problem arises. In the case where the non-light incidence surface of each of the plurality of total reflection prisms is roughened (i.e., in the case of Ex.3), even if the viewer is viewing the screen from a slanting downward direction, the viewer cannot recognize the unnecessary light since the unnecessary light diffuses and spreads.

Figure 41:
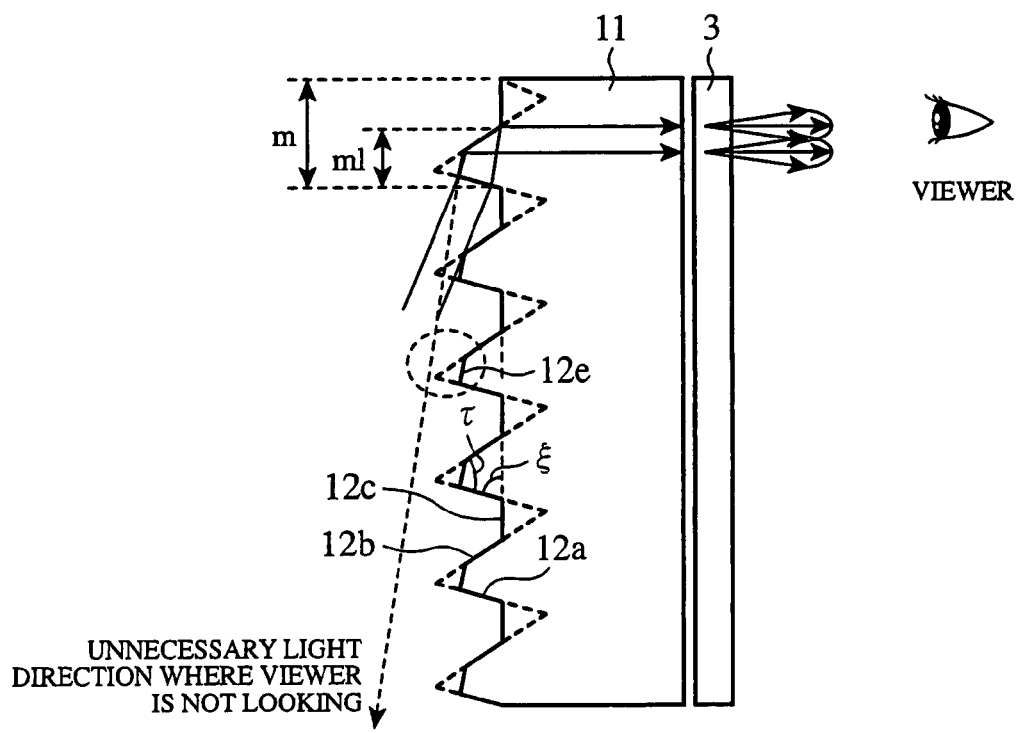
FIG. 41 is an explanatory diagram showing an example in which measures (a) and (d) are combined.

FIG. 41 shows an example which the measures (a) and (d) are combined. In this case, when the emergence angle is $\theta_{refl}=0$ (i.e., the direction of the normal to the screen), the refractive index of the air is $n_0=1.0$, the refractive index of the medium of which the plurality of total reflection prisms are made is $n_1=1.55$, the incidence angle is $\theta_0=70$ degrees, the prism apex angle is $\tau=45$ degrees, a margin is provided to the ratio of similitude l of each of the plurality of total reflection prisms, and, for example, the ratio of similitude l is set to a bit larger value (l=about 0.5). By chipping only a part of the leading end portion of each of the plurality of prisms, which corresponds to the margin and is defined in shape by l=about 0.1, the unnecessary light can be reduced.

In this case, the efficiency of the signal light depends upon the angle of the chipped leading end portion 12e and is reduced by only a value corresponding to an area occupied by the chipped leading end portion 12e when viewed from the direction of the incident light.

It is preferable that the leading end portion 12e of each of the plurality of total reflection prisms is formed so that the angle of the leading end portion 12e is substantially parallel to the incidence angle $\theta_0$ of light incident upon each of the plurality of total reflection prisms.

Actually, since the chipped leading end portion 12e is simply formed by cutting the corresponding leading end of a cutting tool that is used for machining the metallic mold, the amount of chips is constant for each of the upper portion and lower portion of the screen in most cases.

Furthermore, in most cases, even if the leading end portion of each of the plurality of total reflection prisms is not chipped intentionally, the leading end portion may be rubbed and wear out or may be rounded during a process of pouring resin into the metallic mold so as to form the leading end portion for reasons of the manufacturing method.

There has been provided a prototype of the plurality of total reflection prisms in which the emergence angle is $\theta_{refl}=0$ (i.e., the direction of the normal to the screen), the refractive index of the air is $n_0=1.0$, the refractive index of the medium of which the plurality of total reflection prisms are made is $n_1=1.53$, the prism apex angle is l=45 degrees, the pitch is m=156 μm, and the leading end portion of each of the plurality of total reflection prisms is chipped.

Figures 42, 43:
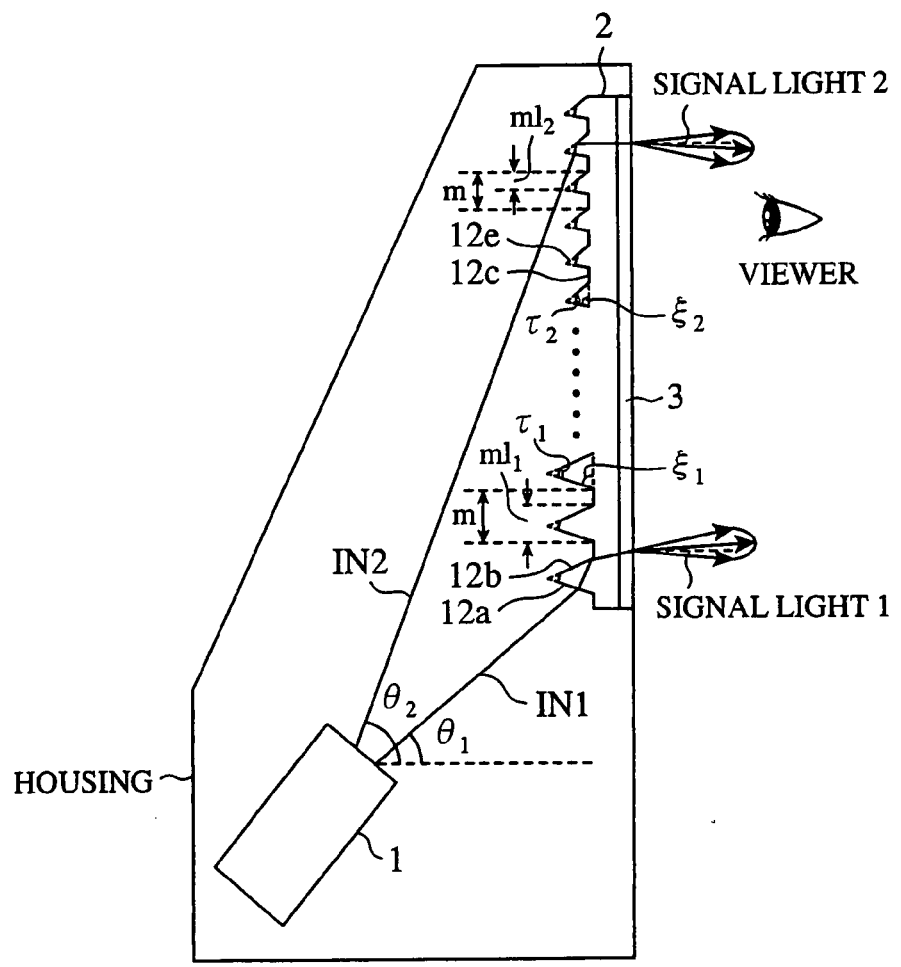
FIG. 42 is an explanatory diagram showing observation results in a case where the incidence angle is $\theta_0=75$ degrees.
FIG. 43 is an explanatory diagram showing an example in which measures (a), (c), and (d) are combined.

Measurements have been carried out with visual observations and a luminance meter by using a projection optical system, the plurality of total reflection Fresnel prisms, and a lenticular lens screen. FIG. 42 shows the results of the measurements.

In the case where the ratio of similitude of each of the plurality of total reflection prisms has a small margin (i.e., in the case of Ex.1), the leading end portion of each of the plurality of total reflection prisms is chipped by only a part thereof corresponding to a ratio of similitude of total reflection prisms l=0.02 (=26). In this case, no bad influence is exerted upon the signal light, and good results have been obtained.

FIG. 43 shows an example which the measures (a), (c), and (d) are combined, and the leading end portion of each of the plurality of total reflection prisms is chipped while the prism apex angle τ is varied from location to location on the screen, i.e., according to the incidence angle $\theta_0$ of light incident upon each of the plurality of total reflection prisms.

Figure 44:
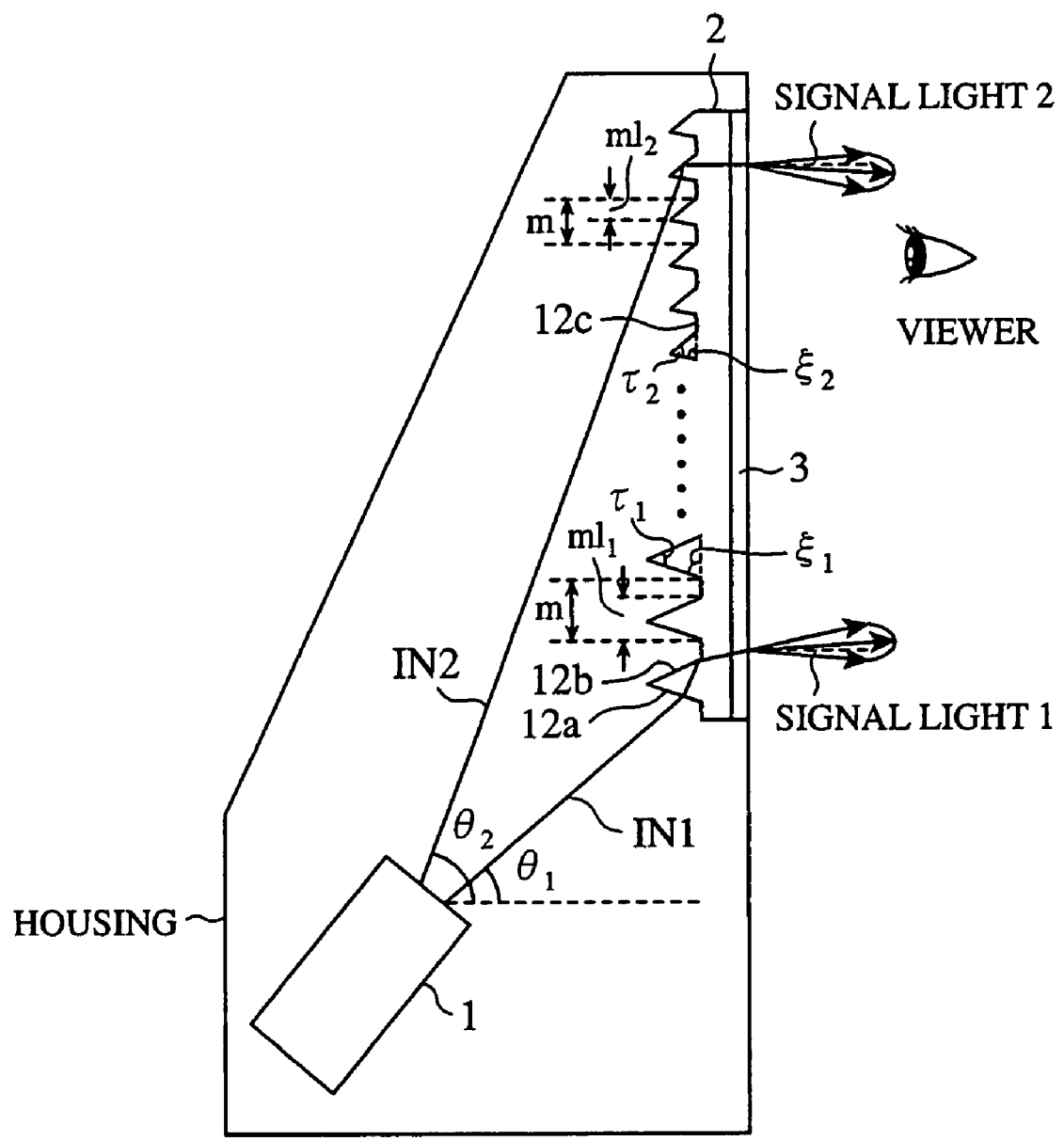
FIG. 44 is an explanatory diagram showing an example in which measures (a), (b), and (c) are combined.

FIG. 44 shows an example which the measure (a), (b), and (c) are combined, and the non-light incidence surface 12c of each of the plurality of total reflection prisms is roughened while the prism apex angle τ is varied from location to location on the screen, i.e., according to the incidence angle $\theta_0$ of light incident upon each of the plurality of total reflection prisms.

Figure 45:
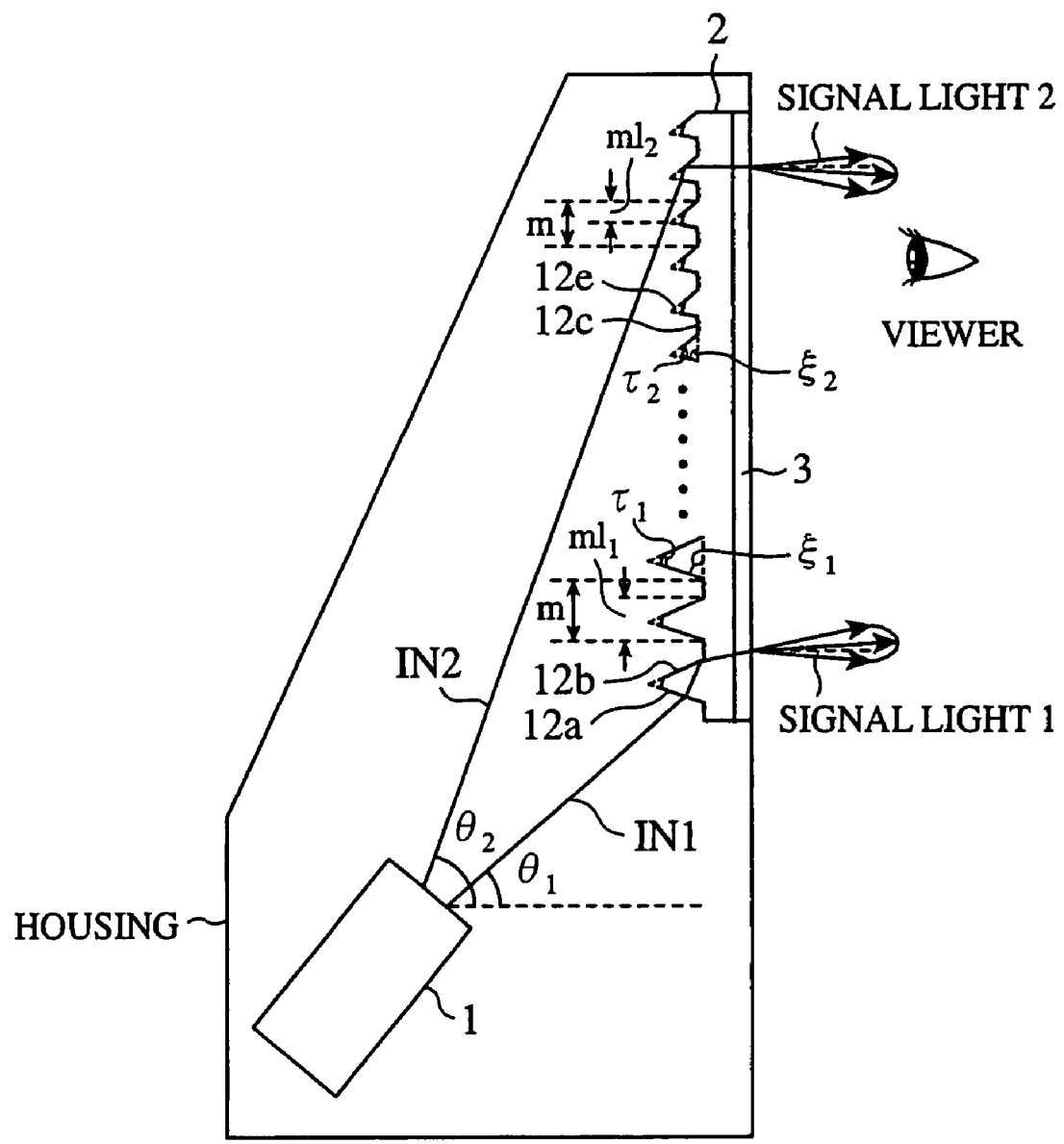
FIG. 45 is an explanatory diagram showing an example in which measures (a), (b), (c), and (d) are combined.

FIG. 45 shows an example which the measure (a), (b), (c), and (d) are combined, and the leading end portion of each of the plurality of total reflection prisms is chipped and the non-light incidence surface 12c of each of the plurality of total reflection prisms is roughened while the prism apex angle τ is varied from location to location on the screen, i.e., according to the incidence angle $\theta_0$ of light incident upon each of the plurality of total reflection prisms.

In FIGS. 39 and 43 to 45, the ratio of similitude l of total reflection prisms in the lower portion of the screen with a small incidence angle $\theta_0$ is relatively large, whereas the ratio of similitude $l_2$ of total reflection prisms in the upper portion of the screen with a large incidence angle $\theta_2$ is relatively small (i.e., $l_2 < l_1$).

When the emergence angle is kept constant at $\theta_{refl}=0$ (i.e., the direction of the normal to the screen), and the prism apex angle τ is kept constant, the angle ξ of the light incidence surface of each of the plurality of total reflection prisms increases with distance from the center of the screen, i.e., with increase in the incidence angle from the small incidence angle $\theta_1$ to the large incidence angle $\theta_2$ (i.e., $\xi_2 > \xi_1$).

The optical path of incident light as shown in either of FIGS. 39 and 43 to 45 can be bent on its way to the plurality of total reflection prisms by the reflecting flat mirror 4.

Figure 46:
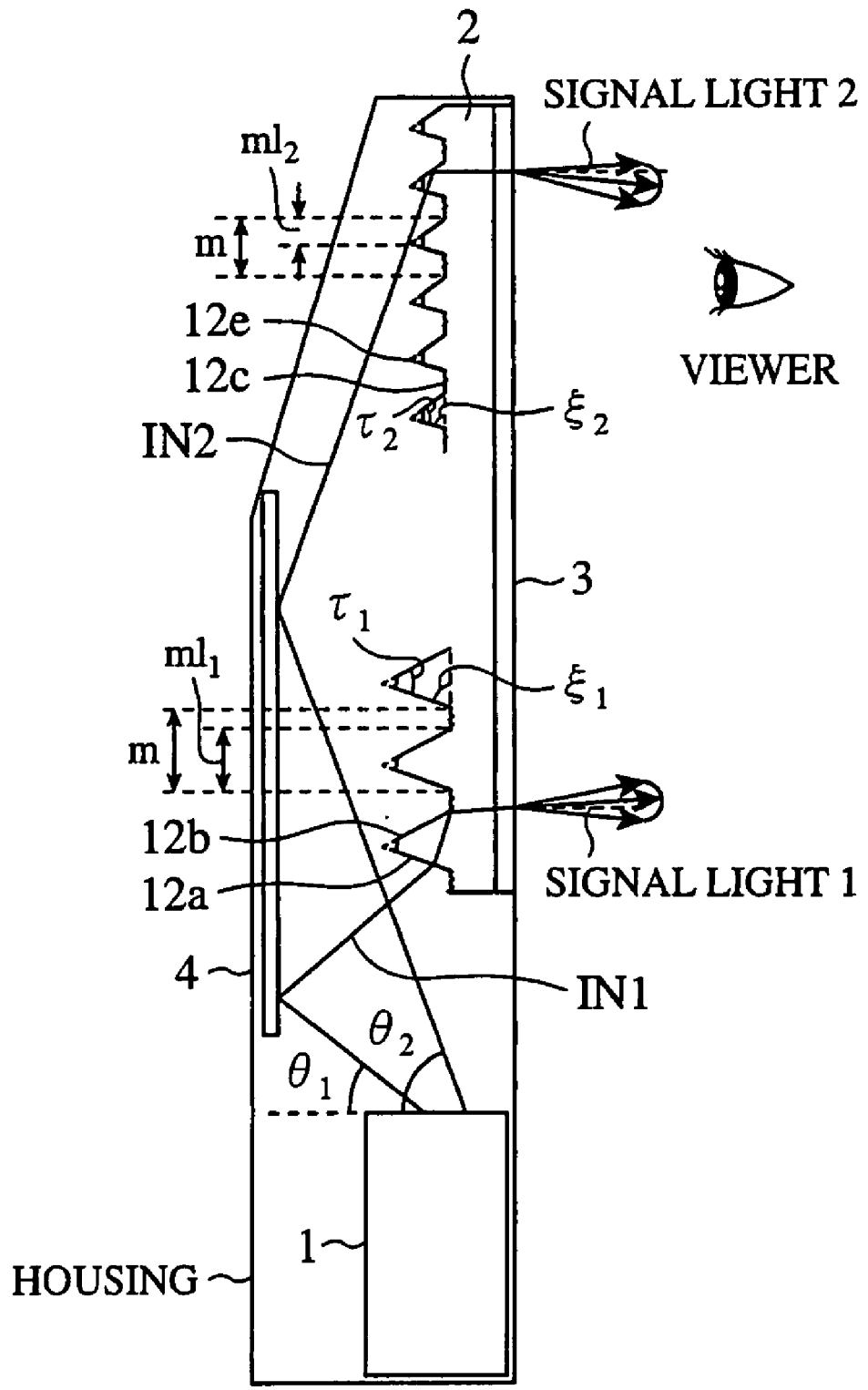
FIG. 46 is an explanatory diagram showing an example of reflection by a reflecting flat mirror 4.

FIG. 46 shows a case where the optical path of the incident light shown in FIG. 45 is bent by the reflecting flat mirror.

By thus bending the optical path of the incident light, the depth of the display apparatus can be reduced.

In FIG. 46, the reflecting flat mirror 4 is arranged so as to be substantially parallel to the screen surface. As an alternative, the reflecting flat mirror 4 can be inclined with respect to the screen surface.

Figure 47:
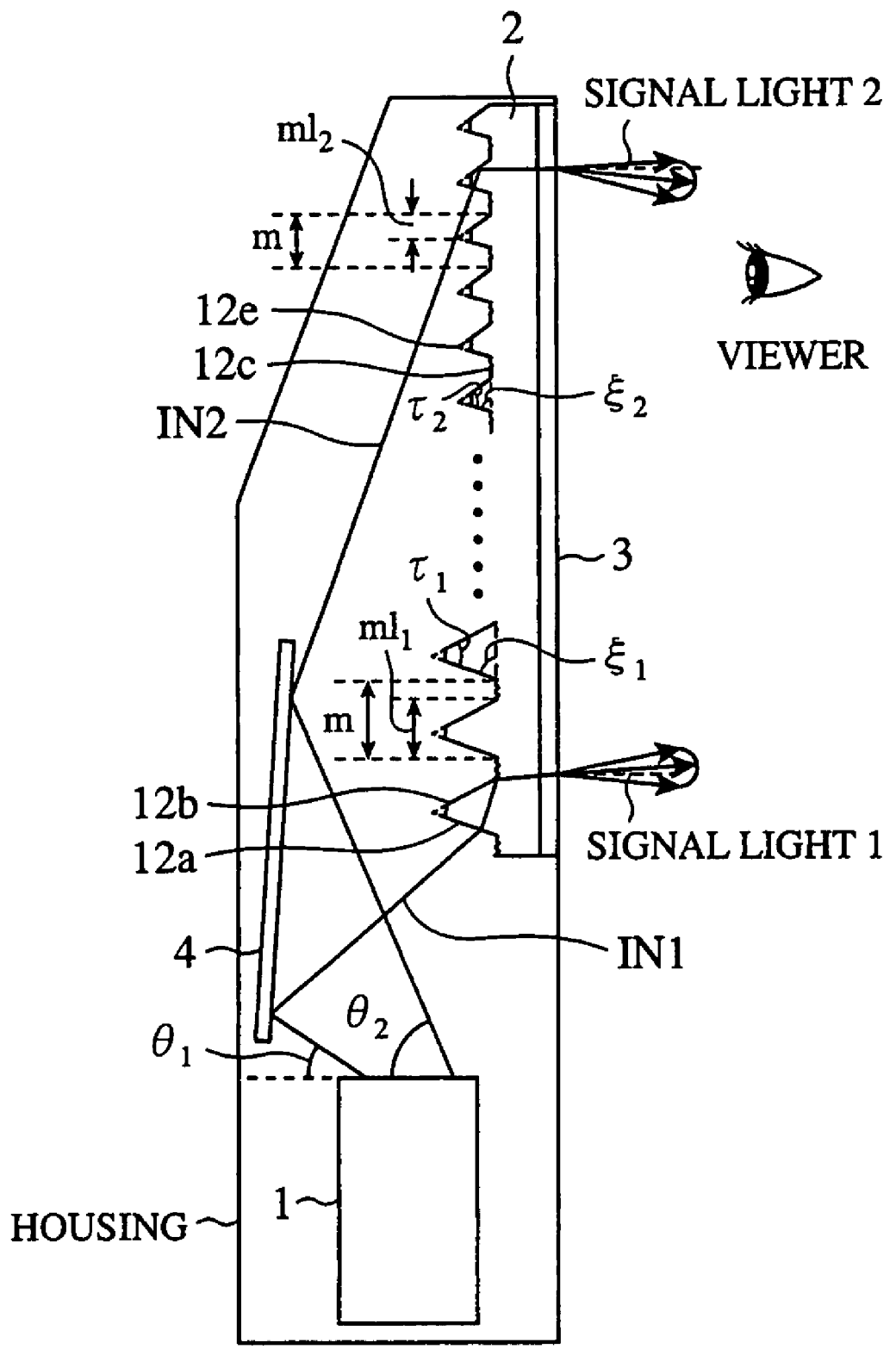
FIG. 47 is an explanatory diagram showing an example of slanting reflection by the reflecting flat mirror 4.

FIG. 47 shows the case where the reflecting flat mirror is inclined with respect to the screen surface.

In this specification, the plurality of Fresnel prisms 2 are arranged concentrically, as previously mentioned. As an alternative, the plurality of Fresnel prisms 2 can be arranged in a line.

In the former case, the center of the concentric circle can be located outside the screen.

It is desirable that the observation-side surface of the plurality of total reflection Fresnel prisms has an image formation/display plate 3 (e.g., a lenticular lens screen) having a function of controlling the light distribution of the signal light which passes through the plurality of total reflection Fresnel prisms, specifically a function of expanding the signal light so as to make it easier for the viewer to view the screen.

The lenticular lens screen is an optical element for controlling the distribution of light incident thereupon. The lenticular lens screen can include a diffuser panel, a bead screen, or a plurality of lenses each having an aspheric surface shape, such as a semicircle, half-ellipse, or secondary or higher-order curve, in cross section and having a length in a single-dimensional direction, a plurality of lenses arranged in two dimensions, each of the plurality of lenses having different curvatures in vertical and horizontal cross-sectional directions and an aspheric surface shape, such as a semicircle, half-ellipse, or secondary or higher-order curve, in every cross section, or a plurality of reflection optical elements each having a trapezoidal shape in cross section.

As an alternative, the lenticular lens screen can consist of a combination of the above-mentioned optical elements, such as a combination of a plurality of lenses located on a side of the light source and a diffuser panel located on a side of the viewer.

In order to reduce the influence of the ambient light, the lenticular lens screen can include a light absorption layer that is formed in the non-lens portion of the lenticular lens screen in addition to the above-mentioned optical elements.

For the same purpose, the lenticular lens screen can include an anti-reflection layer for reducing reflection of light can be formed thereon.

In addition, an anti glare layer for suppressing screen glare, an antistatic layer for preventing the adhesion of dust to the screen due to static electricity, and a hard coating layer for protecting the screen surface can be formed on the lenticular lens screen.

In this embodiment, although the plurality of total reflection Fresnel lenses and the lenticular lens screen can be independently disposed in order to make the structure of the plurality of total reflection Fresnel lens and that of the lenticular lens screen intelligible, they can be integrally formed as one element.

Figure 48:
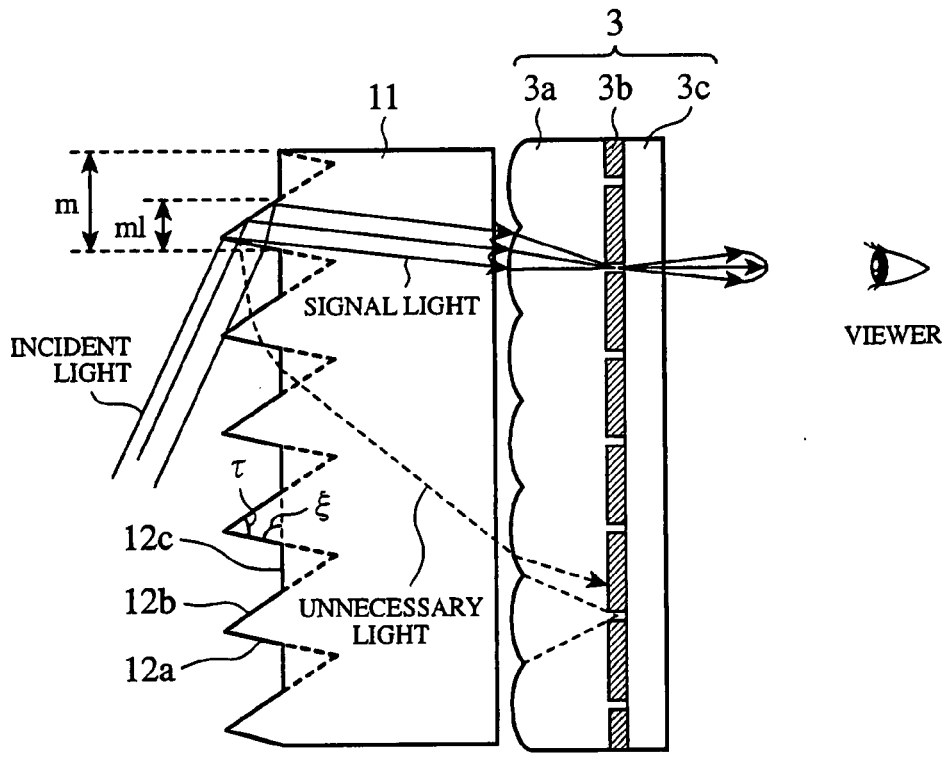
FIG. 48 is an explanatory diagram showing an example of the structure of an image formation/display plate 3.

FIG. 48 shows a case where as the image formation/display plate 3, a plurality of lenses 3a are arranged on a side of the light source, a plurality of light absorption layers 3b are formed in the non-lens portion of the image formation/display plate, and a diffuser panel 3c is disposed on a side of the viewer. In this structure, since unnecessary light indicated by a dashed line is finally absorbed by the light absorption layer 3b, it is not visible to the viewer. That is, it can be understood that the display apparatus can display a high-quality image having no unnecessary light.

Figure 49:
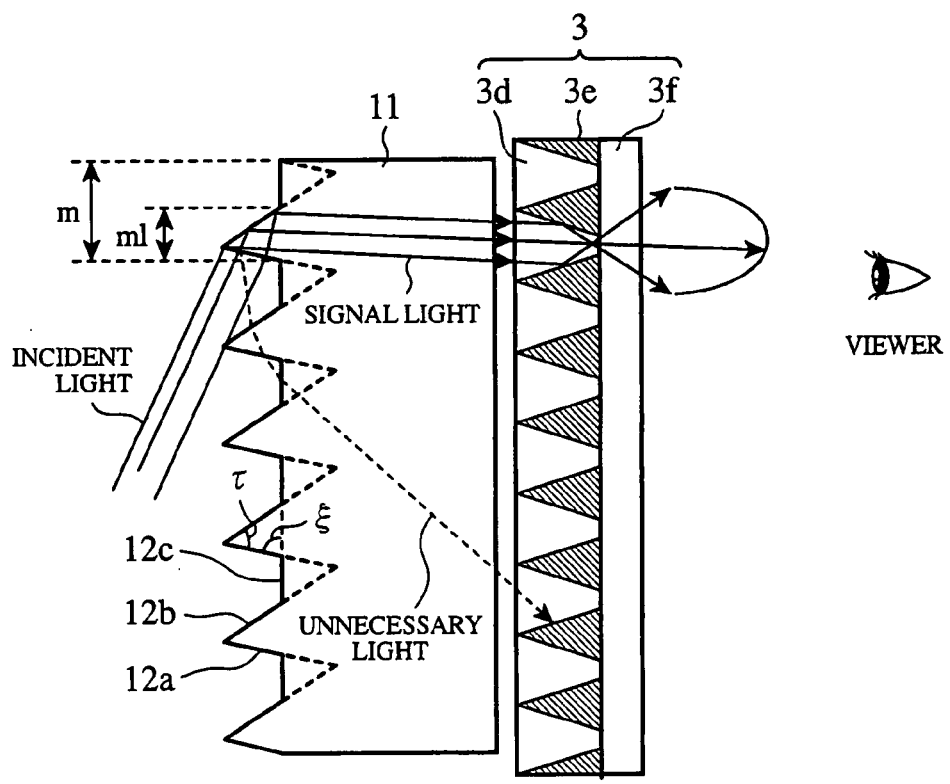
FIG. 49 is an explanatory diagram showing another example of the structure of the image formation/display plate 3.

In FIG. 49, a plurality of reflection optical elements 3d each having a trapezoidal shape in cross section, a plurality of optical absorbers 3e, and a diffuser panel 3f are disposed as the image formation/display plate 3. Even in this structure, unnecessary light indicated by a dashed line can be effectively removed.

The display apparatus can further include either of a housing, a maintenance mechanism, a screen reinforcement, an air conditioner, a light source, an illuminating optical system, an projection optical system, an optical path bending mirror, an optical system maintenance and adjustment mechanism, a speaker, a television stand, a remote controller, a control circuit, a power supply, a color correction mechanism, and a geometrical correction mechanism.

Embodiment 18

Figure 50:
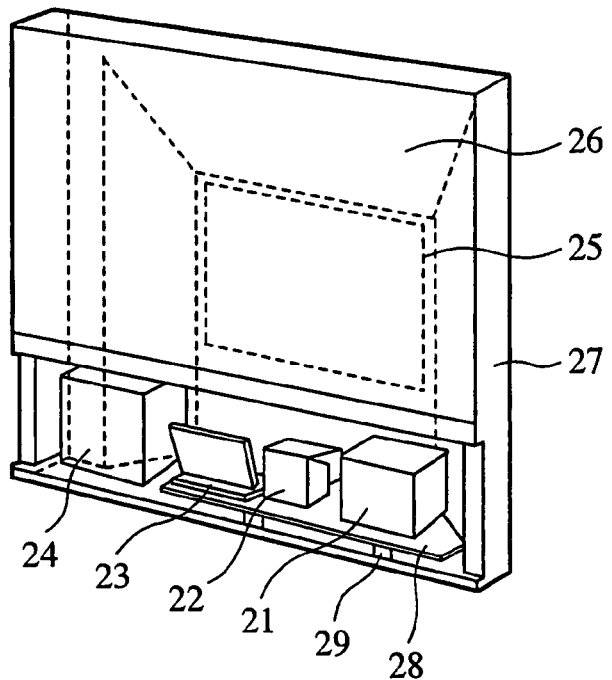
FIG. 50 is a perspective view showing a projection display apparatus in accordance with embodiment 18 of the present invention.

FIG. 50 is a perspective view showing a projection display apparatus in accordance with embodiment 18 of the present invention. In this figure, a lamp 21 which is a light source emits light. An optical unit 22 which is an optical system integrally includes an illuminating optical system for making uniform the light emitted out of the lamp 21, a color wheel for coloring the light made uniform by the illuminating optical system, a light valve for intensity-modulating the light colored by the color wheel so as to generate an image, and a lens for projecting the image generated by the light valve onto a reflecting unit 23. The reflecting unit 23 reflects the image projected thereonto by the optical unit 22.

While an electrical circuit 24 controls the light valve and so on of the optical unit 22 according to control information about the system and image information, the electrical circuit 24 carries out output of a sound signal to the speaker and so on.

A projector 1 which is a light emitting body includes the lamp 21, the optical unit 22, the reflecting unit 23, and the electrical circuit 24.

In this example, the projector is constructed of the single plate type light valve. When a three plate type light valve is used, a color separating/combining optical system can be simply used instead of the color wheel. In this example, the lamp 21 is used as the light source. As an alternative, an LED or laser can be used as the light source instead of the lamp 21.

A reflecting mirror 25 reflects the image (rays of light) reflected by the reflecting unit 23 toward a screen 26.

The screen 26 includes a Fresnel optical element 2 (which is the Fresnel optical element explained in either of above-mentioned embodiments 1 to 17), and an image formation/display plate 3. The screen 26 can be reinforced with a reinforcing plate in order to improve the flatness thereof and to strengthen the protection thereof.

A housing 27 accommodates the projector 1 which consists of the optical unit 22 and so on while securing the screen 26 thereto. Since the image is distorted if the housing 27 cannot secure the screen 26 thereto without impairing the flatness of the screen, the housing 27 is molded of a high-precision and high-rigidity material.

An optical absorption material (e.g., black paint) is provided to inner walls of the housing 27 so as to absorb light (i.e., stray light) which leaks from the lamp 21, the optical unit 22, and the reflecting unit 23. Especially, provision of a cover for shading the whole of the projector 1 offers a great advantage of being able to prevent diffusion of stray light.

An optical plate 28 is disposed so that the optical unit 22 and the reflecting unit 23 are located in a substantially-central part of the lower portion of the screen 26, and the lamp 21 is disposed so as to be located in a right-hand end part of the lower portion of the screen 26.

An adjustment mechanism 29 adjusts a relative positional relationship and inclination relationship between the screen 26 and the optical plate 28.

In order to achieve a slimming down of the projection display apparatus, it is necessary to make an appropriate arrangement of the electrical circuit 24, the lamp 21, etc., as well as to perform appropriate design of optical paths for the optical system.

In accordance with this embodiment 18, as shown in FIG. 50, the reflecting unit 23 is arranged in the vicinity of the center of the lower portion of the screen 26.

As a result, since the image projected by the optical unit 22 is reflected by the reflecting unit 23 located in the vicinity of the center of the lower portion of the screen and is then reflected by the reflecting mirror 25, and the image travels an optical path which extending upward in the direction of the screen 26, no optical path exists in the left-hand and right-hand end parts of the lower portion of the screen 26. Therefore, there is relatively large space in the vicinity of both the right-hand and left-hand end parts of the lower portion of the screen 26.

So, in accordance with this embodiment 18, the electrical circuit 24 is arranged in the left-hand end part and the lamp 21 is arranged in the right-hand end part when viewed from the front of the screen 26, so that the display apparatus can be slimmed down.

In order to display a distortion-free and blurring-free image on the screen, it is necessary to position the lamp 21, the optical unit 22, and the reflecting unit 23 very correctly. To this end, the lamp 21, the optical unit 22, and the reflecting unit 23 are secured onto the optical plate 28.

The adjustment mechanism 29 for adjusting the position and inclination of the optical plate 28 is mounted to the optical plate 28. The adjustment mechanism 29 adjusts a relative positional relationship and inclination relationship between the optical plate 28 and the screen 26.

Figure 51:
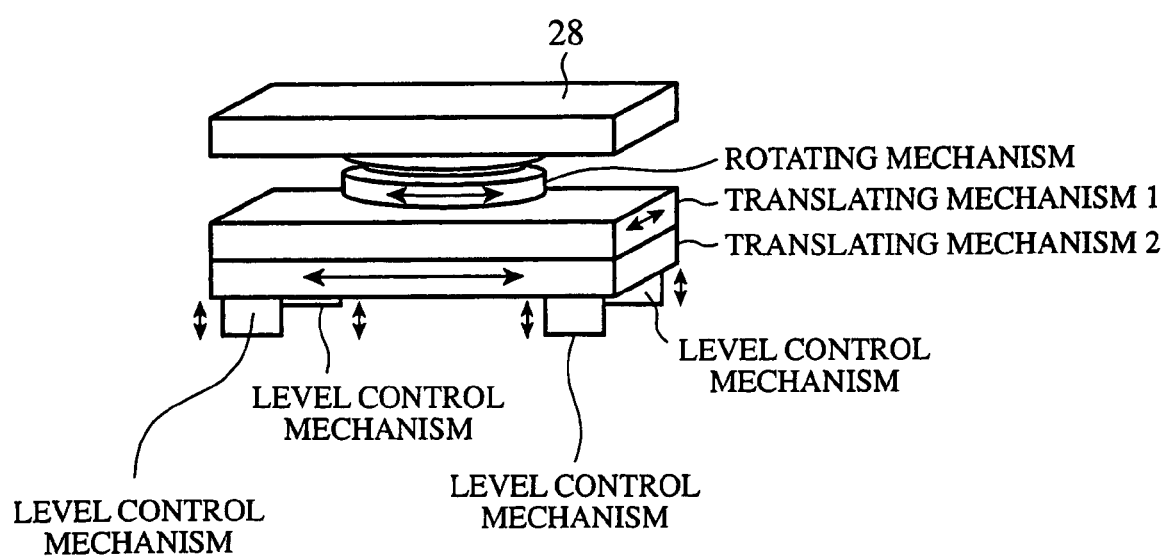
FIG. 51 is a perspective view showing an adjustment mechanism 29.

A 6-axis adjustment mechanism as shown in FIG. 51 is disposed as the adjustment mechanism 29, for example, and can adjust translations of the optical plate 28 in both the X and Y axes, the rotation of the optical plate 28, and the level of the optical plate 28.

Figure 52:
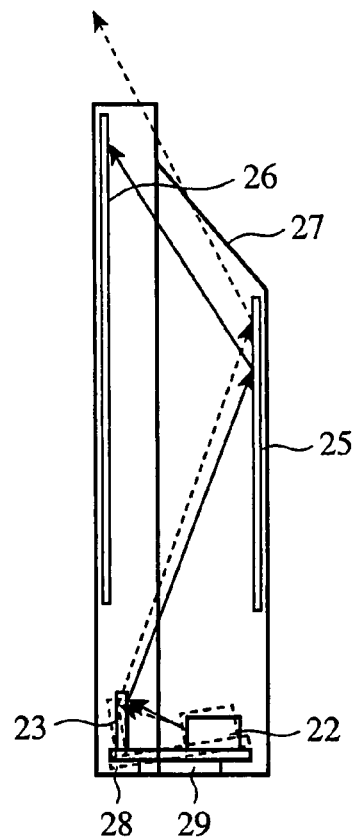
FIG. 52 is an explanatory diagram showing the optical path of signal light in the projection display apparatus in accordance with embodiment 18 of the present invention.

In order to achieve a slimming down of the projection display apparatus, the projection display apparatus is constructed so that light emitted from the optical unit 22 and the reflecting unit 23 is aslant incident upon the screen 26 at an acute angle with the screen 26, as shown in FIG. 52.

In FIG. 52, a solid line shows a state in which the adjustment mechanism 29 has adjusted the position and inclination of the optical plate 28 in order to obtain a desired image, and a dashed line shows a state in which the adjustment mechanism 29 has not performed any adjustment yet.

Even when neither the position nor inclination of the optical plate 28 is slightly adjusted as shown by an optical path indicated by an arrow of a dashed line, a large displacement in the optical path occurs at the upper end portion of the screen 26 having a tight incidence angle with the screen 26. For this reason, the projection display apparatus needs the high-precision adjustment mechanism 29 when slimmed down.

As can be seen from the above description, in accordance with this embodiment 18, the optical unit 22 and the reflecting unit 23 are arranged in a substantially-central part of the lower portion of the screen 26, and the lamp 21 and the electrical circuit 24 are arranged in right-hand and left-hand end parts of the lower portion of the screen 26, respectively. Therefore, the present embodiment offers an advantage of being able to achieve a slimming down of the projection display apparatus.

In addition, in accordance with this embodiment 18, the projection display apparatus includes the adjustment mechanism 29 for adjusting the relative position and relative angle of the optical plate 28 with respect to the screen 26. Therefore, the present embodiment offers another advantage of being able to display a distortion-free and blurring-free image.

Embodiment 19

In this embodiment 19, a method of ensuring the flatness of the screen 26 will be explained.

Figure 53:
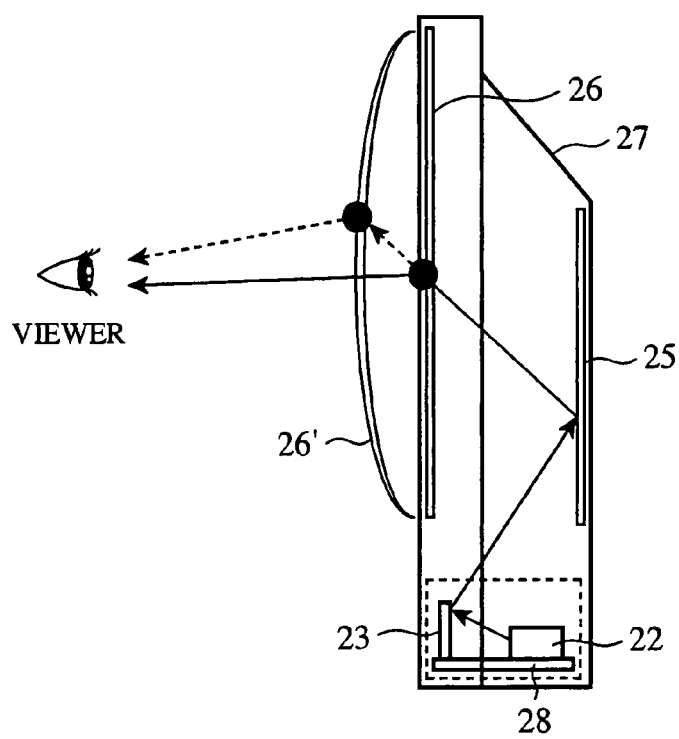
FIG. 53 is an explanatory diagram for explaining bending of the screen and a change in an image caused by the bending of the screen.

FIG. 53 is an explanatory diagram for explaining bending of the screen 26 and change in an on-screen image caused by the bending of the screen. In the figure, reference numeral 26' denotes a bent screen.

A solid line of FIG. 53 shows an optical path in a case where the screen 26 has no bending and high flatness, and a dashed line of FIG. 53 shows an optical path in the case of the bent screen 26'.

As can be seen from the figure, in the case of the bent screen 26', the viewer can view an image (in this case, a black dot in the figure) which appears at a position different from a normal position.

Figure 54:
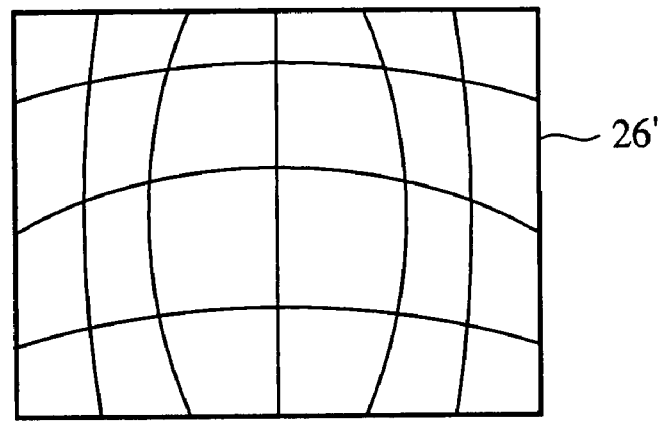
FIG. 54 is an explanatory diagram showing a state in which a lattice pattern is displayed on a bent screen 26'.

FIG. 54 shows a state in which a lattice pattern is displayed on the bent screen 26' in order to make easy to understand deformation which appears in the image and is caused by the bent screen 26'.

If the screen 26' bends by 1 mm and the incidence angle of light incident upon the screen 26' is 70 degrees, the amount of displacement of the image on the screen is 1 mm×tan (70 degrees)=2.74 mm and the sensitivity to bending increases by about 3 times.

Figure 55:
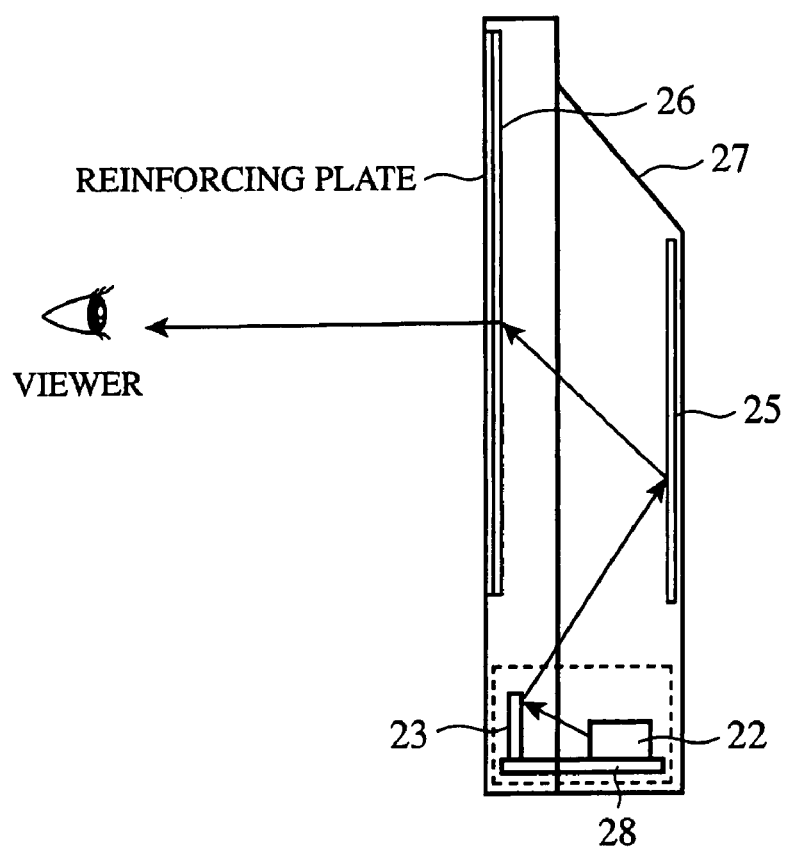
FIG. 55 is an explanatory diagram showing a state where the screen is reinforced with a reinforcing plate.

For example, in the case of a display apparatus in which each pixel is projected onto a dot of 1 mm×1 mm, it is necessary to reduce the amount of bending to about 0.33 mm in order to suppress the influence of bending such that a range under the influence of bending falls within 1 pixel when the sensitivity to bending increases by about 3 times. In order to make the amount of bending that appears in a large screen fall within the above-mentioned range, the plurality of Fresnel prisms 12 have only to be arranged on the base 11 that is made of a high-rigidity material with high flatness such as glass. As an alternative, a glass plate or synthetic resin board can be arranged, as a reinforcement, along the plurality of Fresnel prisms 12 formed on the screen 26 so that the flatness of the screen 26 is ensured, as shown in FIG. 55.

Embodiment 20

Figure 56:
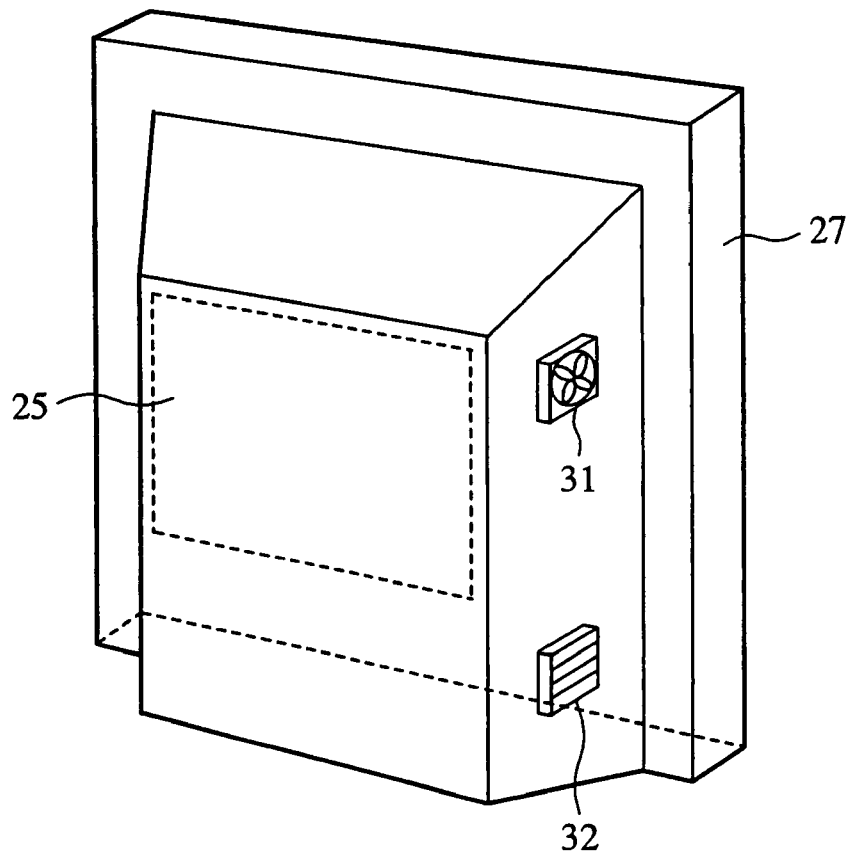
FIG. 56 is a perspective view showing a projection display apparatus in accordance with embodiment 20 of the present invention.

FIG. 56 is a perspective view showing a projection display apparatus in accordance with embodiment 20 of the present invention, and, in this figure, since the same reference numerals as shown in FIG. 50 denote the same components as those of FIG. 50 or like components, the explanation of these components will be omitted hereafter.

While a ventilation fan 31 inhales air into the interior of a housing 27 via an inlet 32, it exhausts air in the housing 27. A dustproof filter is attached to the inlet 32. A ventilation means includes the ventilation fan 31 and the inlet 32.

When the internal temperature and humidity of the housing 27 change violently, the screen 26 also expands or contracts greatly in response to changes in the temperature and humidity of the housing.

When the temperature or humidity of the housing 27 increases and the screen 26 therefore expands remarkably, bending arises on the screen 26 even if the housing 27 is made of a high-precision high-rigidity material, and deformation appears in the image, as mentioned previously.

In contrast, in accordance with this embodiment 20, in order to reduce changes in the internal temperature and humidity of the housing 27, the ventilation fan 31 ventilates the interior of the housing 27.

A drying agent can be inserted into the interior of the housing in order to maintain the interior of the housing at a still higher dry state. In an environment where the ambient temperature and humidity change largely, such as at the time of transportation of the display apparatus, by inserting a drying agent between an outer packaging for transportation and the housing, bending that remains at the time of unpacking after transportation can be suppressed.

As an alternative, a seal cover that does not permit the passage of air can be attached to the housing so that the display apparatus cannot touch with the open air during transportation. In this case, bending can be suppressed without inserting any drying agent between an outer packaging for transportation and the housing.

The dustproof filter is attached to the inlet 32 so as to prevent the ventilation fan 31 from inhaling fine dust when the ventilation fan 31 inhales air via the inlet 32.

Thereby, the adhesion of dust onto the screen 26 can be prevented, and therefore any lack of the image caused by the adhesion of dust can be prevented.

As mentioned above, since the incidence angle of light incident upon the screen 26 is tight, even if small dust adheres to the screen 26, it casts a shadow which is greatly expanded over the screen.

Figure 57:
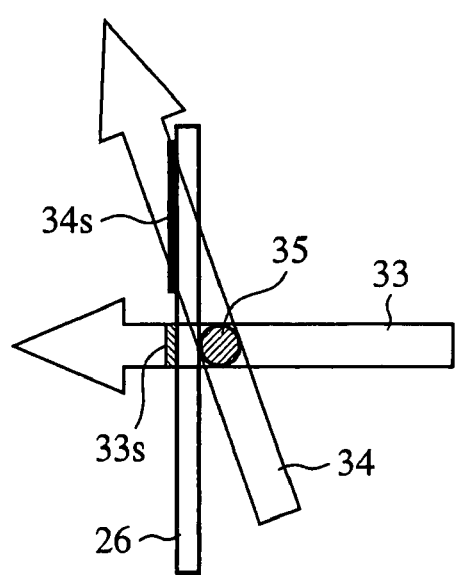
FIG. 57 is an explanatory diagram showing an influence of dust upon the screen.

FIG. 57 is an explanatory diagram showing influence of dust. In this figure, reference numeral 33 denotes a flux of light which enters the screen 26 at a right angle, and reference numeral 34 denotes a flux of light which enters the screen 26 at an acute angle.

Reference symbol 33$s$ denotes a shadow caused by dust 35 adhered to the screen 26 and the flux of light 33 incident upon the dust 35, and reference symbol 34$s$ denotes a shadow caused by the dust 35 adhered to the screen 26 and the flux of light 34 incident upon the dust 35.

As can be seen from the figure, the shadow 34$s$ is several times as large as the shadow 33$s$. Thus, it is important to provide a protection-against-dust function of preventing the adhesion of dust to the screen 26 for the thin projection display apparatus.

Embodiment 21

Figure 58:
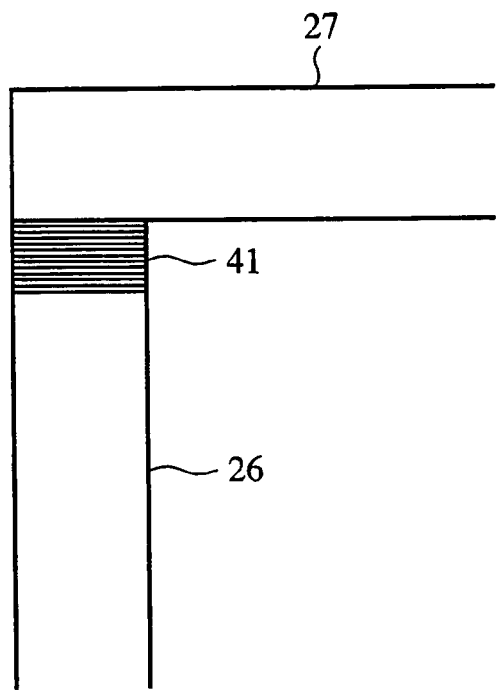
FIG. 58 is an explanatory diagram showing a state where the screen 26 is attached to a housing 27 by way of a member 41 having an internal stress.

In accordance with above-mentioned embodiment 18, the housing 27 is molded of a high-precision and high-rigidity material, and the screen 26 is mounted to the housing 27, as previously mentioned. In contrast, in accordance with this embodiment, the screen 26 is mounted to the housing 27 via a member 41 having an internal stress, as shown in FIG. 58.

Thus, when the screen 26 is mounted to the housing 27 via the member 41 having an internal stress, a tension can be applied to the front surface of the screen 26 so as to prevent occurrence of bending.

There is provided, as a tension mechanism, a method of securing the screen 26 to the housing 27 while applying a stress to the member 41 which is fixed to an edge of the screen 26.

A tension can be applied to the front surface of the screen by using an elastic body, such as a rubber, as the member 41. Since the screen 26 does not need to be a standalone rigid body when using the tension mechanism, the screen 26 can be formed in a thin sheet shape.

Embodiment 22

Figure 59:
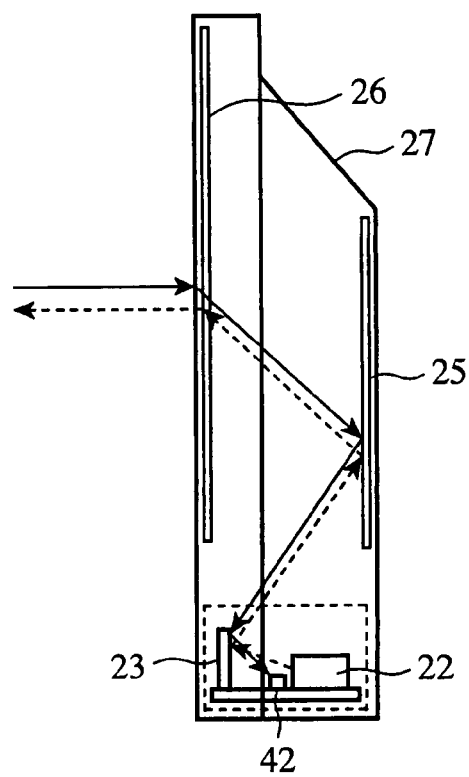
FIG. 59 is an explanatory diagram showing the optical path of signal light in a projection display apparatus in accordance with embodiment 22 of the present invention.

In accordance with above-mentioned embodiment 18, the optical unit 22 and the reflecting unit 23 are placed on the optical plate 28, as previously mentioned. In accordance with this embodiment, a photo detector 42 for a remote controller is placed next to the optical unit 22, as shown in FIG. 59.

In other words, an image (i.e., rays of light) projected by the optical unit 22 is reflected by the reflecting mirror 25 and then reaches the screen 26 after being reflected by the reflecting unit 23, as shown by a dashed line of the figure.

As a result, although the viewer can view the image (i.e., the rays of light) which has reached the screen 26, when the viewer points light (e.g., infrared rays of light) emitted from the remote controller which the viewer has toward the screen 26, the light travels an optical path which is completely contrary to the optical path of the rays of light which have reached the viewer, as shown by a solid line of the figure.

In accordance with this embodiment, since the photo detector 42 for the remote controller is disposed in the vicinity of the optical unit 22, it can receive light emitted out of the remote controller with high sensitivity.

Embodiment 23

Figure 60:
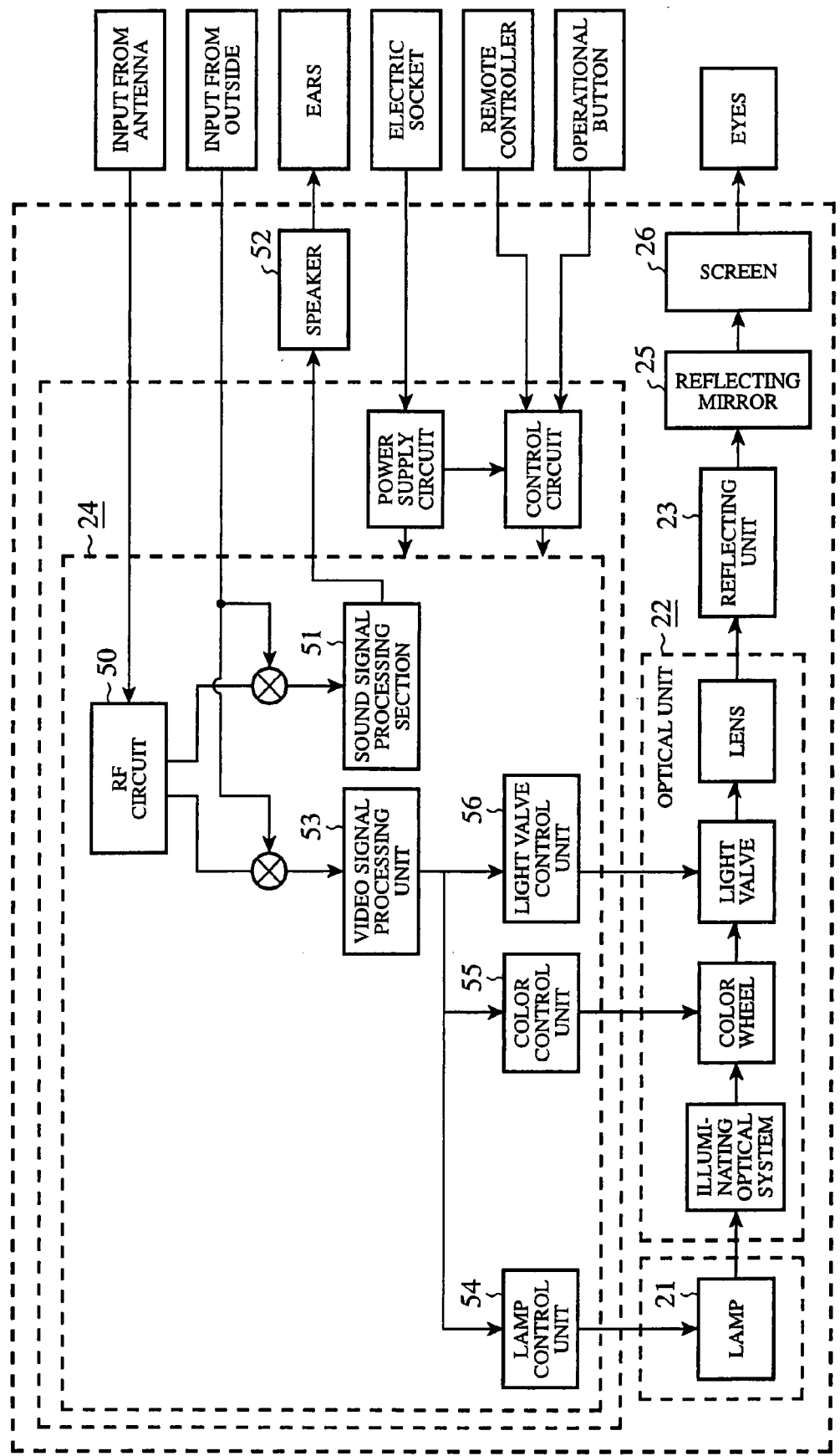
FIG. 60 is a block diagram showing internal circuitry of a projection display apparatus in accordance with embodiment 23 of the present invention.

FIG. 60 is a block diagram showing internal circuitry of a projection display apparatus in accordance with embodiment 23 of the present invention. In the figure, since the same reference numerals as shown in FIG. 50 denote the same components as those of FIG. 50 or like components, the explanation of these components will be omitted hereafter. An RF circuit 50 of the electrical circuit 24 extracts a sound signal and a video signal from an electric wave received via an antenna.

A sound signal processing section 51 of the electrical circuit 24 performs known sound signal processing on the sound signal extracted by the RF circuit 50, and makes a speaker 52 output a corresponding sound.

A video signal processing unit 53 of the electrical circuit 24 performs known video signal processing on the video signal extracted by the RF circuit 50. The video signal processing unit 53 includes a geometric correction circuit (i.e., a geometric correction means) for correcting for deformations that appear on an image formation surface of the screen 26 (i.e., the image formation/display plate 3), and a color correction circuit (i.e., a color correction means) for correcting for the color of the image formation surface.

A lamp control unit 54 controls light emitted out of the lamp 21 according to an instruction from the video signal processing unit 53.

A color control unit 55 controls the color wheel of the optical unit 22 according to an instruction from the color correction circuit of the video signal processing unit 53. When the projection display apparatus is provided with a 3 board type light valve, since color control is performed by each light valve, the projection display apparatus does not need any color wheel.

A light valve control unit 56 controls the light valve of the optical unit 22 according to an instruction from the geometric correction circuit of the video signal processing unit 53.

Next, the operation of the projection display apparatus in accordance with this embodiment of the present invention will be explained.

An electric wave inputted via the antenna or from outside the projection display apparatus is delivered to the RF circuit 50, and the RF circuit 50 extracts a sound signal and a video signal from the electric wave.

The sound signal processing section 51 performs known sound signal processing on the sound signal extracted by the RF circuit 50.

As a result, a corresponding sound is outputted from the speaker 52 and then reaches the viewer's ear.

The video signal processing unit 53 performs known video signal processing on the video signal extracted by the RF circuit 50 so as to control the lamp control unit 54, the color control unit 55, and the light valve control unit 56.

The lamp control unit 54 controls the light emitted out of the lamp 21 according to an instruction from the video signal processing unit 53.

The light emitted out of the lamp 21 is colored by the color wheel according to an instruction from the color control unit 55 if needed, after being made uniform by an illuminating optical system of the optical unit 22. When a 3 board type light valve is used, a color separating optical system is used instead of the color wheel.

The light colored by the color wheel is intensity-modulated and is formed into an image by the light valve according to an instruction from the light valve control unit 56.

The image generated by the light valve is projected onto the reflecting unit 23 by a lens.

The reflecting unit 23 reflects the image projected thereonto when receiving the projection of the image from the optical unit 22.

The reflecting mirror 25 reflects the image (i.e., rays of light) reflected by the reflecting unit 23 toward the screen 26.

The screen 26 includes the Fresnel optical element 2 and the image formation/display plate 3. The Fresnel optical element 2 bends the rays of light reflected by the reflecting mirror 25 toward the direction of the normal to the screen, and then forms the rays of light on the image formation/display plate 3.

As a result, the image reaches the viewer's eyes.

Since the screen 26 has slight coloring, a distribution of transmission efficiency of light, etc., the color control unit 55 and the light valve control unit 56 appropriately make a color correction to the image according to an instruction from the color correction circuit of the video signal processing unit 53 so that the image complies with predetermined standards, and then displays the image uniformly in appropriate colors.

It can be assumed that the projection display apparatus is used at a place under various conditions, such as at a bright place, a dark place, or a place illuminated by colored light. Therefore, by allowing the viewer to adjust the degree of correction using the remote controller or a manual operation button, the projection display apparatus can respond to various environments with high adaptability.

In hostile environments from the viewpoint of temperature and humidity, the screen 26 may slacken. When the screen 26 slackens, the light valve control unit 56 electrically corrects for deformations that appear in the image according to an instruction from the geometric correction circuit of the video signal processing unit 53.

The above-mentioned color correction and geometric correction can be carried out by only using known correcting methods disclosed in the following references, for example. Concrete examples of the correcting methods will be omitted hereafter.

The color correction method -> WO 99/55074

The geometric correction method -> JP,2004-153322,A

As can be seen from the above description, in accordance with this embodiment 23, the projection display apparatus is so constructed as to have the geometric correction circuit for correcting for deformations that appear in the image formation surface of the screen 26. Therefore, the present embodiment offers an advantage of being able to cancel the deformations that appear in the image formation surface of the screen 26.

In accordance with this embodiment 23, the projection display apparatus is so constructed as to have the color correction circuit for correcting for the color of the image formation surface of the screen 26. Therefore, the present embodiment offers another advantage of being able to implement uniform display of colors.

Embodiment 24

In accordance with above-mentioned embodiment 18, the projection display apparatus includes the adjustment mechanism 29 for adjusting the relative position and relative angle of the optical plate 28 with respect to the screen 26, as previously mentioned. In contrast, a projection display apparatus in accordance with this embodiment includes an adjustment mechanism (i.e., an electric tilting mechanism 61 and an electric rotating mechanism 62) for adjusting the angle of the housing 27 to which the screen 26 is secured, as shown in FIGS. 61 and 62.

Figure 61:
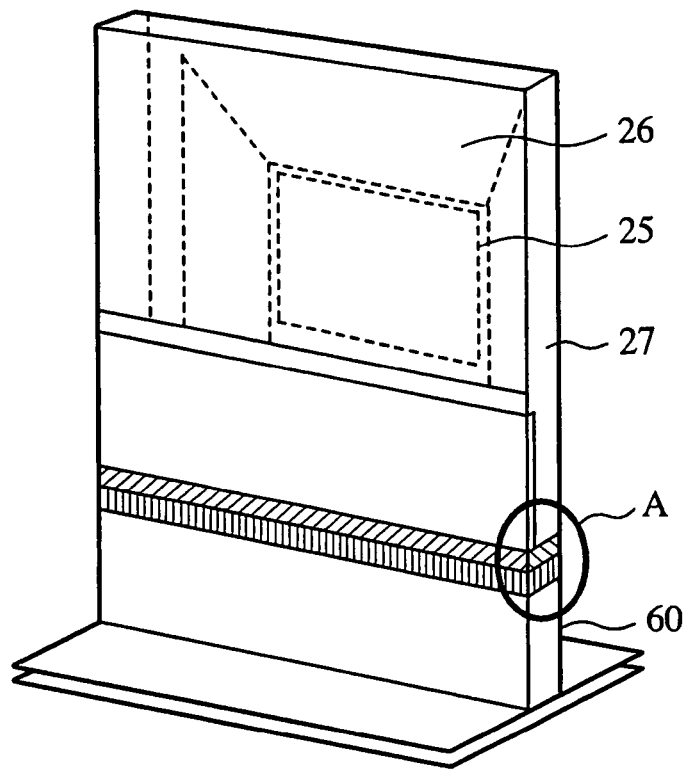
FIG. 61 is a perspective view showing a projection display apparatus in accordance with embodiment 24 of the present invention.
Figure 62:
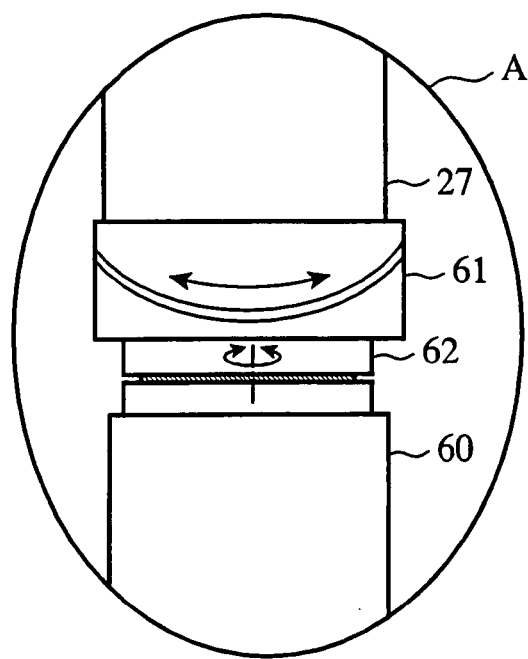
FIG. 62 is an enlarged view showing a main part of FIG. 61.

As shown in FIGS. 61 and 62, the electric tilting mechanism 61 and the electric rotating mechanism 62 are disposed on a base 60 on which the display apparatus is placed so that full use can be made of visual field characteristics.

In general, the projection display apparatus is designed so as to show the most brightness in the direction of the normal to the screen 26. For this reason, when viewing and listening at a location which is not along the direction of the normal to the screen, the viewer views and listens the on-screen image whose brightness falls. Especially, it is a common practice to set the intensity distribution of outgoing light (referred to as directional distribution from here on) for light emergence angles in the vertical direction of the display to be narrower than the directional distribution for light emergence angles in the horizontal direction of the display.

In accordance with this embodiment 24, since the electric tilting mechanism 61 is disposed, the tilt angle of the display apparatus is adjusted using the electric tilting mechanism 61 even when the viewer is viewing and listening the on-screen image from a location which is not along the direction of the normal to the screen so that the viewer can view the image with the brightness of the screen being ensured.

Especially, when the electric tilting mechanism 61 and the electric rotating mechanism 62 are so constructed as to operate in response to a signal from the remote controller, the viewer's convenience can be markedly improved.

Figure 63:
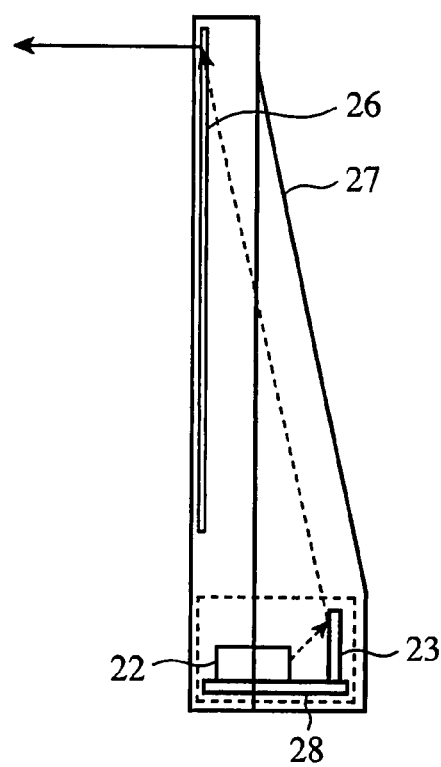
FIG. 63 is a perspective view showing another example of the projection display apparatus in accordance with embodiment 24 of the present invention.
Figure 64:
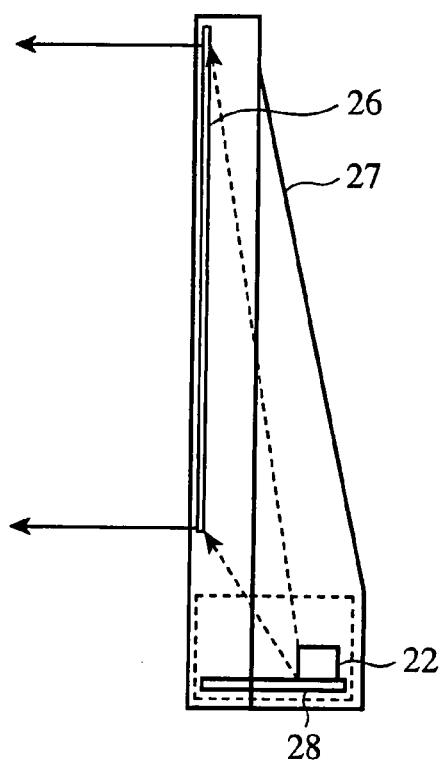
FIG. 64 is a perspective view showing another example of the projection display apparatus in accordance with embodiment 24 of the present invention.

In accordance with either of above-mentioned embodiments 18 to 24, the reflecting mirror 25 is disposed in the thin projection display apparatus, as previously explained. As shown in FIGS. 63 and 64, either of above-mentioned embodiments 18 to 24 can be similarly applied to a thin projection display apparatus having no reflecting mirror 25.

In accordance with either of above-mentioned embodiments 18 to 24, the reflecting unit 23 is disposed on the optical plate 28, as previously explained. As an alternative, the reflecting unit 23 can be secured to the housing 27. Similarly, the reflecting unit 23 of FIG. 63 can be also secured to the housing 27.

INDUSTRIAL APPLICABILITY

As mentioned above, the Fresnel optical element in accordance with the present invention is suitable for a projection display apparatus which, when reflecting rays of light emitted out of a light emitting body, such as a projector, toward a predetermined direction, needs to prevent unnecessary light which results from reflection of a light ray at a part of the refractive surface of each prism from emerging toward the direction of the viewer so as to avoid display of any ghost image.

The invention claimed is:

1. A Fresnel optical element having a plurality of Fresnel prisms arranged on a surface of a base faced a light emitting body,
    each of said plurality of Fresnel prisms having a first surface for receiving a part of an incident light ray emitted from a light emitting body, a second surface faced the first surface each other, and a third surface placed between the first surface and the second surface,
    wherein the third surface is transparent, and has an optical absorbing function of absorbing an incident light ray.

2. A Fresnel optical element having a plurality of Fresnel prisms arranged on a surface of a base faced a light emitting body,
    each of said plurality of Fresnel prisms having a first surface for receiving a part of an incident light ray emitted from a light emitting body, a second surface faced the first surface each other, and a third surface placed between the first surface and the second surface,
    wherein the second surface receives at least a part of the incident light ray passing through the first surface, and
    wherein the third surface is transparent, and has an optical diffusing function of diffusing an incident light ray.

3. The Fresnel optical element according to claim 2, wherein the third surface is substantially flat.

4. The Fresnel optical element according to claim 2, wherein the third surface is substantially parallel to the surface of the base.

5. A Fresnel optical element having a plurality of Fresnel prisms arranged on a surface of a base faced a light emitting body,
    each of said plurality of Fresnel prisms having a first surface for receiving a part of an incident light ray emitted from said light emitting body, a second surface faced the first surface each other, and a third surface placed between the first surface and the second surface,
    wherein the second surface receives at least a part of the incident light ray passing through the first surface, and
    wherein the third surface is transparent and has an optical absorbing function of absorbing an incident light ray.

6. A Fresnel optical element having a plurality of Fresnel prisms arranged on a surface of a base faced a light emitting body,
    each of said plurality of Fresnel prisms having a first surface for receiving a part of an incident light ray emitted from a light emitting body, a second surface faced the first surface each other, and a third surface placed between the first surface and the second surface,
    wherein the second surface reflects at least a part of the incident light ray passing through the first surface to the surface of the base, and
    wherein the third surface is transparent, and has an optical diffusing function of diffusing an incident light ray.

7. The Fresnel optical element according to claim 6, wherein the third surface is substantially flat.

8. The Fresnel optical element according to claim 6, wherein the third surface is substantially parallel to the surface of the base.

9. A Fresnel optical element having a plurality of Fresnel prisms arranged on a surface of a base faced a light emitting body,
    each of said plurality of Fresnel prisms having a first surface for receiving a part of an incident light ray emitted from a light emitting body, a second surface faced the first surface each other, and a third surface placed between the first surface and the second surface,
    wherein the second surface reflects at least a part of the incident light ray passing through the first surface to the surface of the base, and
    wherein the third surface is transparent, and has an optical absorbing function of absorbing an incident light ray.

10. A Fresnel optical element having a plurality of Fresnel prisms arranged on a surface of a base faced a light emitting body,
    each of said plurality of Fresnel prisms having a first surface for receiving a part of an incident light ray emitted from said light emitting body, a second surface faced the first surface each other, and a third surface placed between the first surface and the second surface,
wherein the third surface has an optical diffusing function of diffusing an incident light ray.

11. The Fresnel optical element according to claim 10, wherein the third surface is substantially flat.

12. The Fresnel optical element according to claim 10, wherein the third surface is substantially parallel to the surface of the base.

* * * * *